United States Patent [19]

Shimoda et al.

[11] Patent Number: 5,784,526
[45] Date of Patent: Jul. 21, 1998

[54] MULTISYSTEM SIGNAL PROCESSING APPARATUS HAVING SPECIFIC HIERARCHICAL CODING

[75] Inventors: Kenji Shimoda, Yokohama; Hideo Tsurufusa, Tokyo; Shinji Yoda; Kazuyoshi Fuse, both of Yokohama, all of Japan

[73] Assignee: Kabushiki Kaisha Toshiba, Kawasaki, Japan

[21] Appl. No.: 332,268

[22] Filed: Oct. 31, 1994

Related U.S. Application Data

[63] Continuation of Ser. No. 89,565, Jul. 12, 1993, Pat. No. 5,394,249.

[30] Foreign Application Priority Data

Nov. 18, 1992 [JP] Japan ................. 4-308986

[51] Int. Cl.$^6$ .................. H04N 5/76; H04N 5/917
[52] U.S. Cl. ............. 386/109; 386/112; 386/124; 386/111; 348/397; 348/408; 348/474
[58] Field of Search .................. 358/335, 310; 348/384, 408, 423, 473, 474, 396, 397, 398; 360/33.1; 386/46, 109, 112, 124, 111; H04N 5/76, 5/917

[56] References Cited

U.S. PATENT DOCUMENTS

| | | | |
|---|---|---|---|
| 4,849,810 | 7/1989 | Ericsson | 348/384 |
| 5,050,230 | 9/1991 | Jones et al. | 348/384 |
| 5,060,285 | 10/1991 | Dixit et al. | 382/56 |
| 5,065,259 | 11/1991 | Kubota et al. | 358/310 |
| 5,111,292 | 5/1992 | Kuriacose et al. | 348/384 |
| 5,136,391 | 8/1992 | Minami | 358/310 |
| 5,260,783 | 11/1993 | Dixit | 348/415 |
| 5,414,469 | 5/1995 | Gonzales et al. | 348/408 |
| 5,446,495 | 8/1995 | Tourtier et al. | 348/398 |

FOREIGN PATENT DOCUMENTS

| | | |
|---|---|---|
| 0 148 378 | 7/1985 | European Pat. Off. |
| 0 469 892 | 2/1992 | European Pat. Off. |
| 0469861 | 2/1992 | European Pat. Off. |

(List continued on next page.)

OTHER PUBLICATIONS duWith et al, "Date Compression Systems for Home-Use Digital Video Recording", IEEE Journal on Selected Areas in Communications, vol. 10, No. 1, Jan. 1992.

Gonzales et al, "A Proposal for MPEG-1 Coding with Scalable Extensions", ISO-IEC/JTC1/SC2/WG 11 N Nov. 8, 1991.

Denpa Shinbun, Jan. 9, 1990.

(List continued on next page.)

*Primary Examiner*—Khoi Truong
*Attorney, Agent, or Firm*—Cushman Darby & Cushman IP Group of Pillsbury Madison & Sutro LLP

[57] ABSTRACT

When the low bit rate coding is effected in a recording system 1A, a signal is coded and recorded in a hierarchical structure. On the reproduction side, the type of a recorded signal (the low bit rate coded signal of the hierarchical structure, non-hierarchical structure, conventional analog recording or the like) is determined by a determination system 1E and the operation modes of a digital signal processing system 1G and an analog signal processing system 1F are set. The analog signal processing system processes a reproduced signal when it is analog signal. The digital signal processing system processes a reproduced signal when it is a digital signal or when a reproduced output from the analog signal processing system is processed in a digital manner. Further, hierarchical decoding G30 and inverse converting G40 are provided, a signal processed in the hierarchical structure can be restored to an original form, and the restored reproduced signal can be processed by use of system conversion G60 and converted to a desired system and output. As a result, various types of input video signals can be recorded in a preset form and various forms of recorded video signals can be reproduced and output in a desired form. Further, an analog recorded signal can be reproduced and output after converted to a desired form.

7 Claims, 36 Drawing Sheets

FOREIGN PATENT DOCUMENTS

| | | |
|---|---|---|
| 0 495 480 | 7/1992 | European Pat. Off. . |
| 54-32240 | 3/1979 | Japan . |
| 61-96469 | 8/1986 | Japan . |
| 3108975 | 5/1991 | Japan . |
| 461523 | 2/1992 | Japan . |
| 479681 | 3/1992 | Japan . |
| 479688 | 3/1992 | Japan . |
| 479696 | 3/1992 | Japan . |
| 491587 | 3/1992 | Japan . |
| 91/16790 | 10/1991 | WIPO . |
| 91/18481 | 11/1991 | WIPO . |
| 92/04802 | 3/1992 | WIPO . |
| 93/26118 | 12/1993 | WIPO . |

OTHER PUBLICATIONS

Patent Abstracts of Japan, vol. 13, No. 129 (P-849) 30 Mar. 1989 & JP-A-63 298 865 (Canon) 6 Dec. 1988 * abstract *.

Patents Abstracts of Japan, vol. 13, No. 129 (P949) 30 Mar. 1989 & JP-A-93 298 863 (Canon) 6 Dec. 1988 * abstract *.

Patent Abstracts of Japan, vol. 15, No. 326 (E1102) 20 Aug. 1991 & JP-A-03 121 865 (Hitachi) 23 May 1991 * abstract *.

C. Durfour et al., "A HDTV compatible coding scheme for distribution purposes," Signal Processing of HDTV, III, Proceedings of the Fourth International Workshop on HDTV and Beyond, 4 Sep. 1991, Amsterdam, NL, pp. 353–360, XP379972.

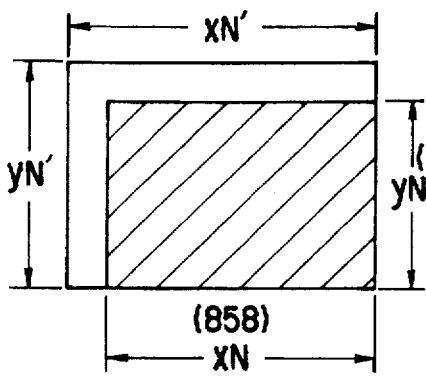
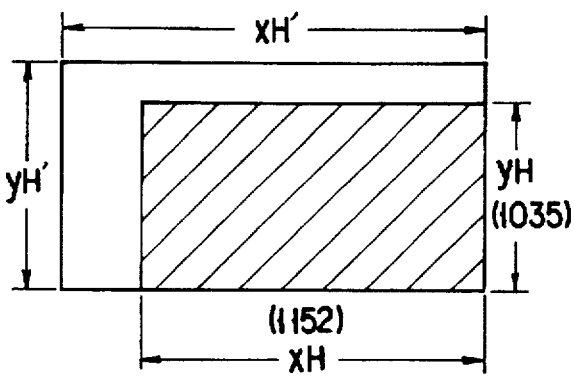
FIG. 2A    FIG. 2B
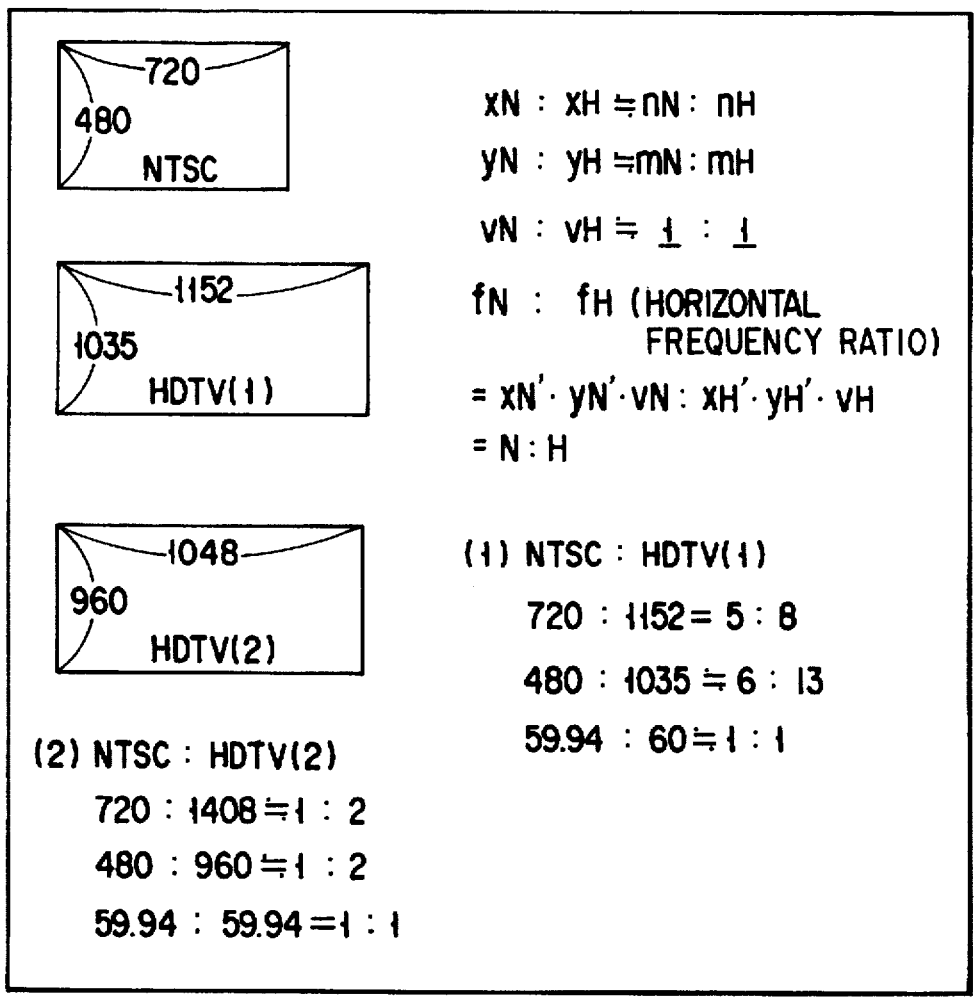
FIG. 2C

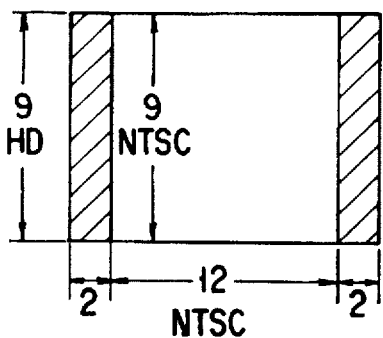
DISPLAY OF
NTSC IMAGE BY
HDTV MONITOR
F I G. 3A
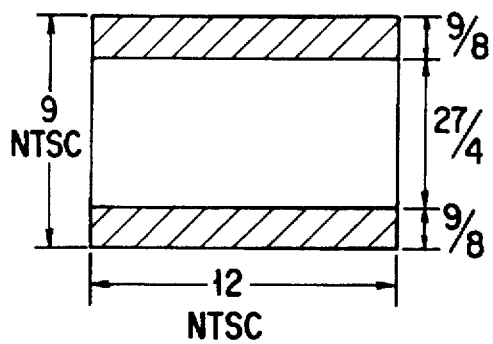
(DISPLAY (LETTER BOX))
(OF HDTV BY NTSC MONITOR)
(VARIATION IN EFFECTIVE AREA
 IS DERIVED BY USE OF
 THE NUMBER 480 OF EFFECTIVE
 SCANNING LINES)
$$480 \div \left(9 \div \frac{27}{4}\right) = 360$$
THAT IS $3/4$ TIMES
F I G. 3B
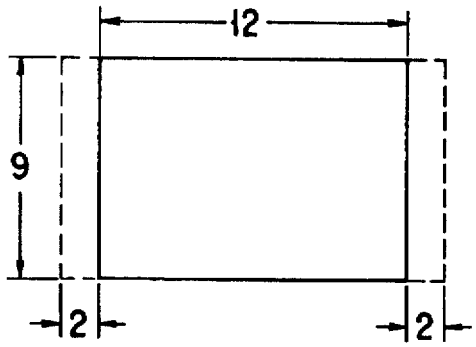
DISPLAY (SIDE CUT) OF HDTV BY
NTSC MONITOR
THE NUMBER OF EFFECTIVE
HORIZONTAL PIXELS IS
DERIVED AS FOLLOWS
$1152 \times \frac{3}{4} = 864$ PIXELS
F I G. 3C (1) DERIVE $(x_N, y_N, v_N, f_N)$ ··· NTSC AND $(x_H, y_H, v_H, f_H)$ ··· HDTV FROM EFFECTIVE PIXELS / SAMPLING FREQUENCY OF NTSC / HDTV, $x_N, x_H$ ARE THE NUMBER OF HORIZONTAL EFFECTIVE PIXELS, $y_N, y_H$ ARE THE NUMBER OF VERTICAL EFFECTIVE PIXELS, $v_N, v_H$ ARE FRAME FREQUENCY, AND $f_H$ IS SIGNAL FREQUENCY SAMPLING FREQUENCY (2) DERIVE $(m_N', n_N', v_N')$ ··· NTSC AND $(m_H', n_H', v_H')$ ··· HDTV FROM (1) (INTEGRAL RATIO)

(3) DETERMINE BASIC BLOCK SIZE $m \times n$ (FOR EXAMPLE, 8 × 8) OF DCT (4) $m_H, n_H$ ARE DETERMINED IF BASIC BLOCK SIZE OF SIGNAL OF ONE SYSTEM (FOR EXAMPLE, HDTV)

(5) TEMPORARY $m_N$, TEMPORARY $n_N$ ARE DERIVED AND CORRECTED ACCORDING TO DISPLAY FORMAT TO DETERMINE FINAL $m_N, n_N$ (6) SYSTEM DETERMINATION OF FIRST LEVEL $(m_N \times n_N)$, SECOND LEVEL (8 × 8) OF HIERARCHICAL STRUCTURE. ALTERNATIVELY, $x_N$ AND THE LIKE OF (1) MAY BE DETERMINED IN A REVERSE ORDER OF THE ABOVE CASE TO OBTAIN DESIRED $m_N \times n_N$

F I G. 4

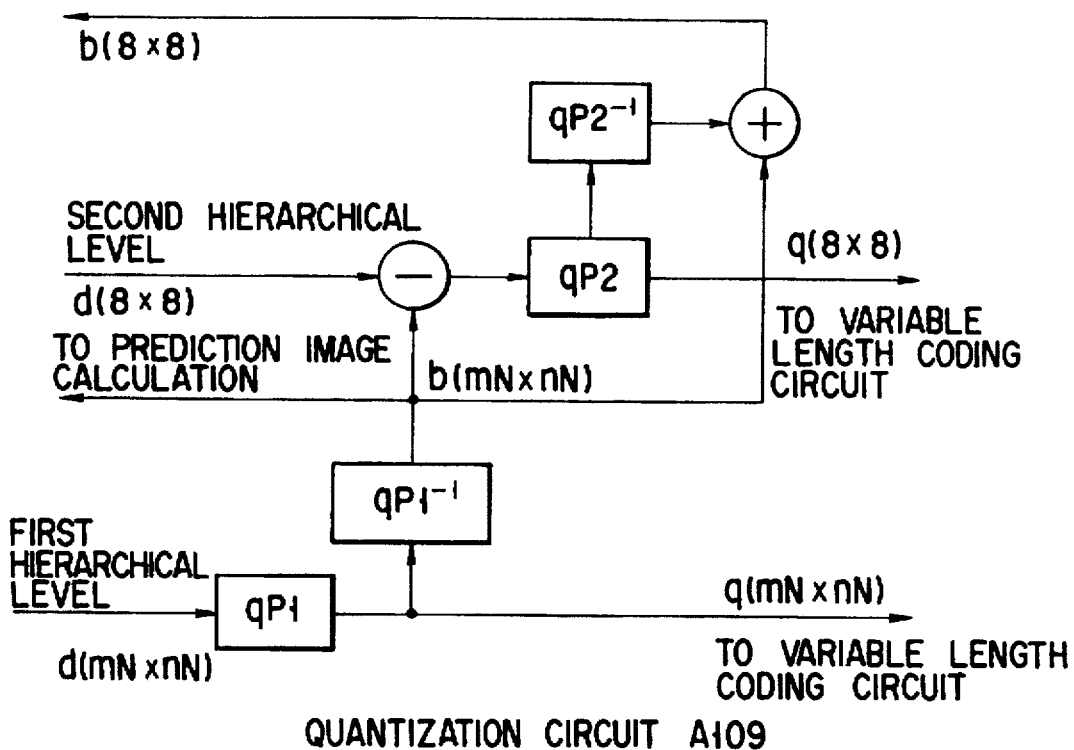
F I G. 6A
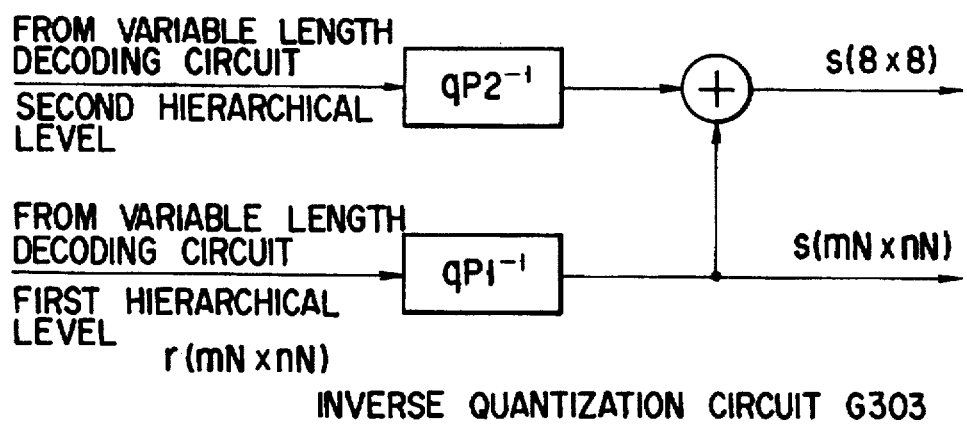
F I G. 6B

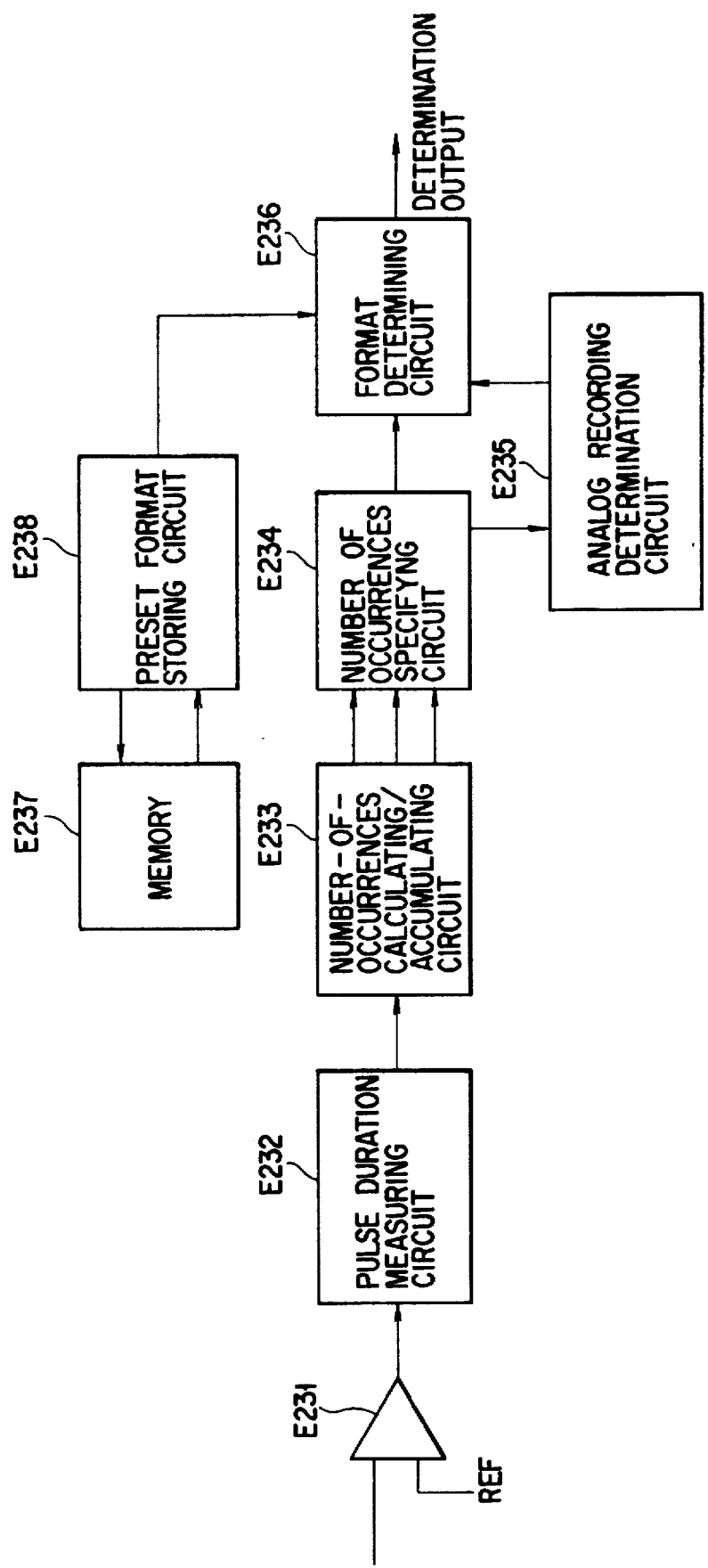
F I G. 11

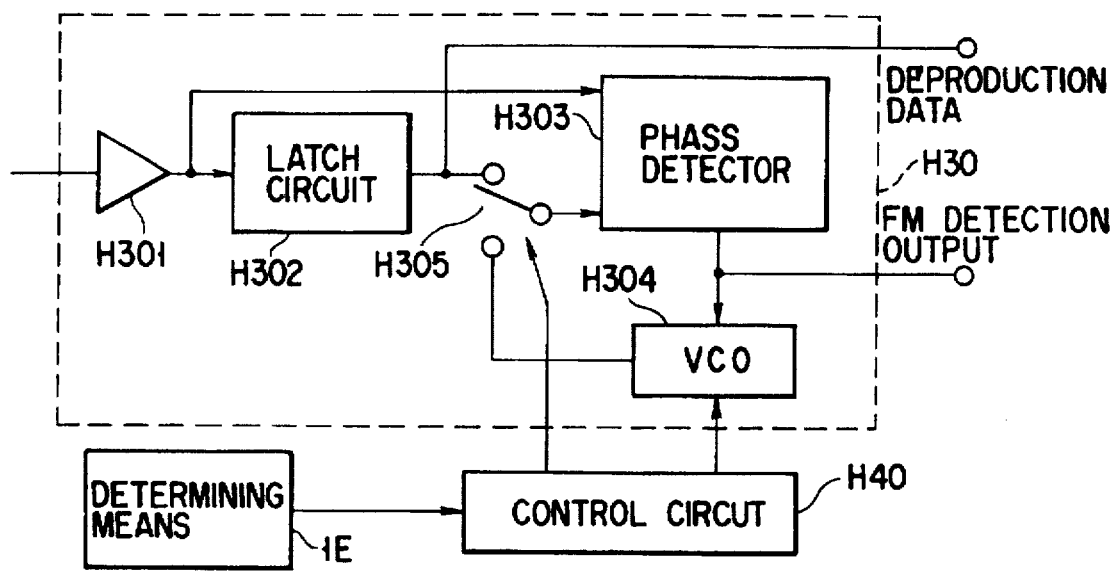
F I G. 14A
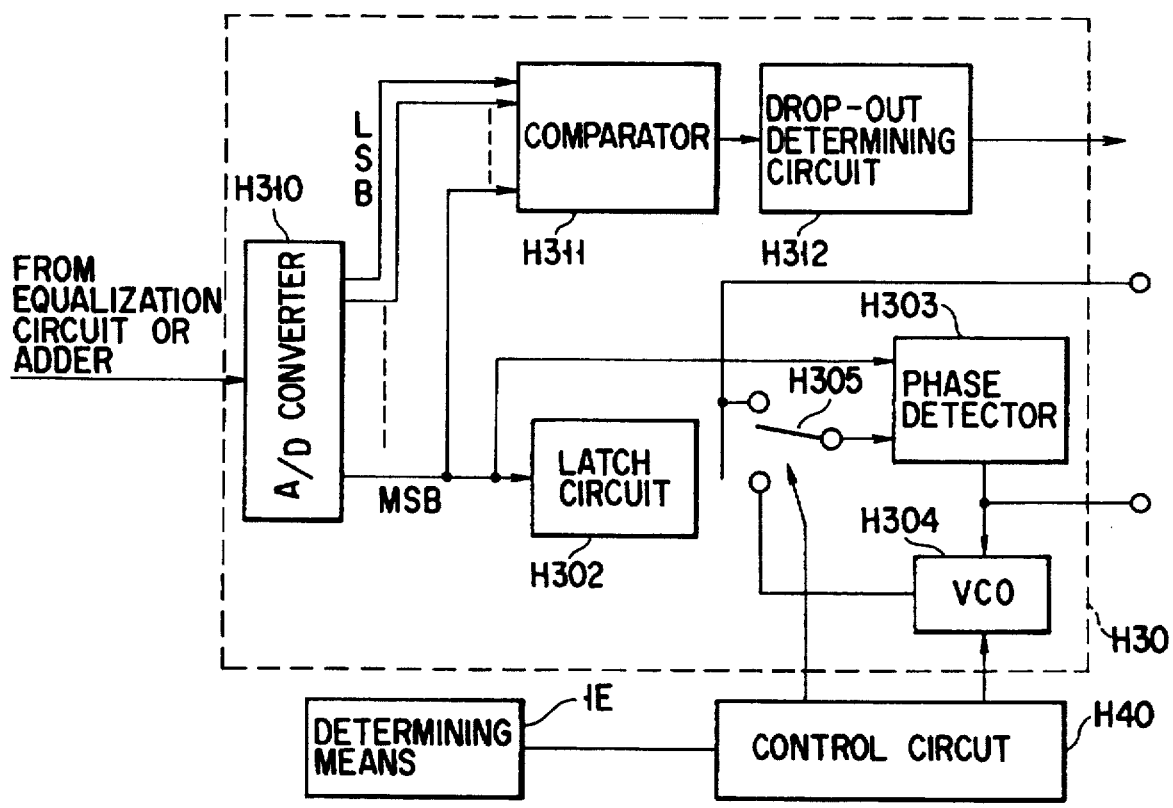
F I G. 14B

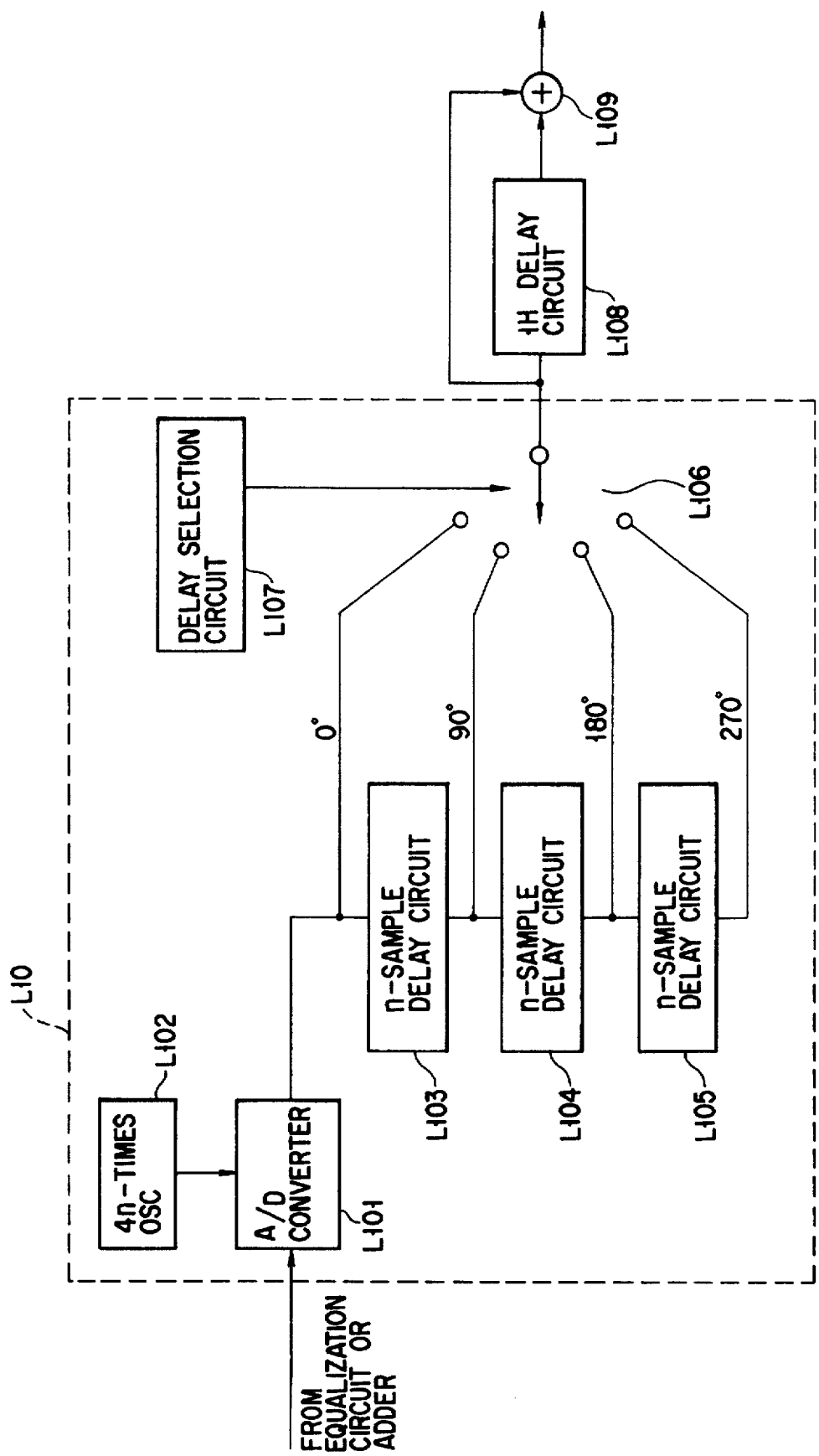
F I G. 17

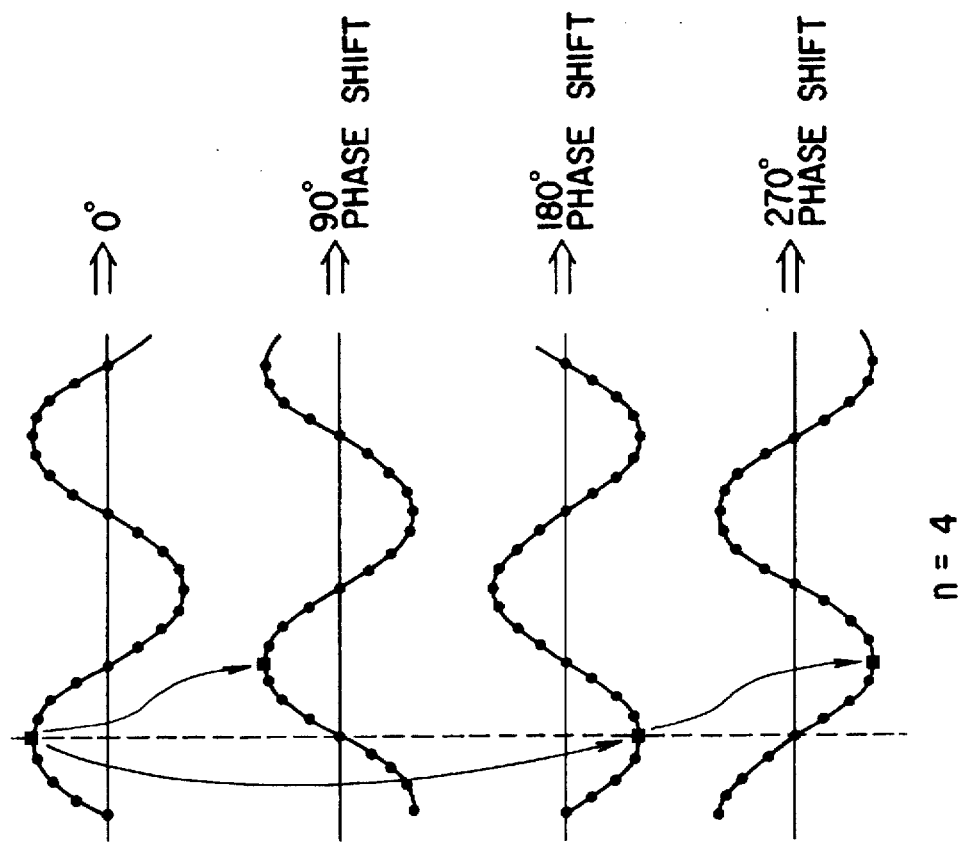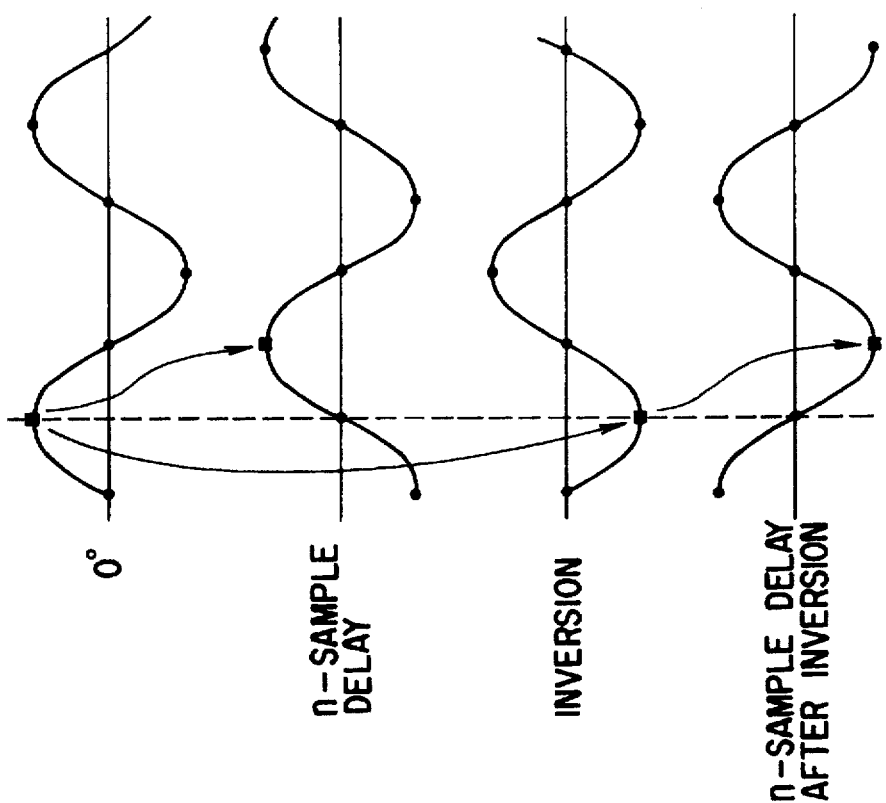
FIG. 20

F I G. 21 TIME BASE CORRECUITION CIRCUIT

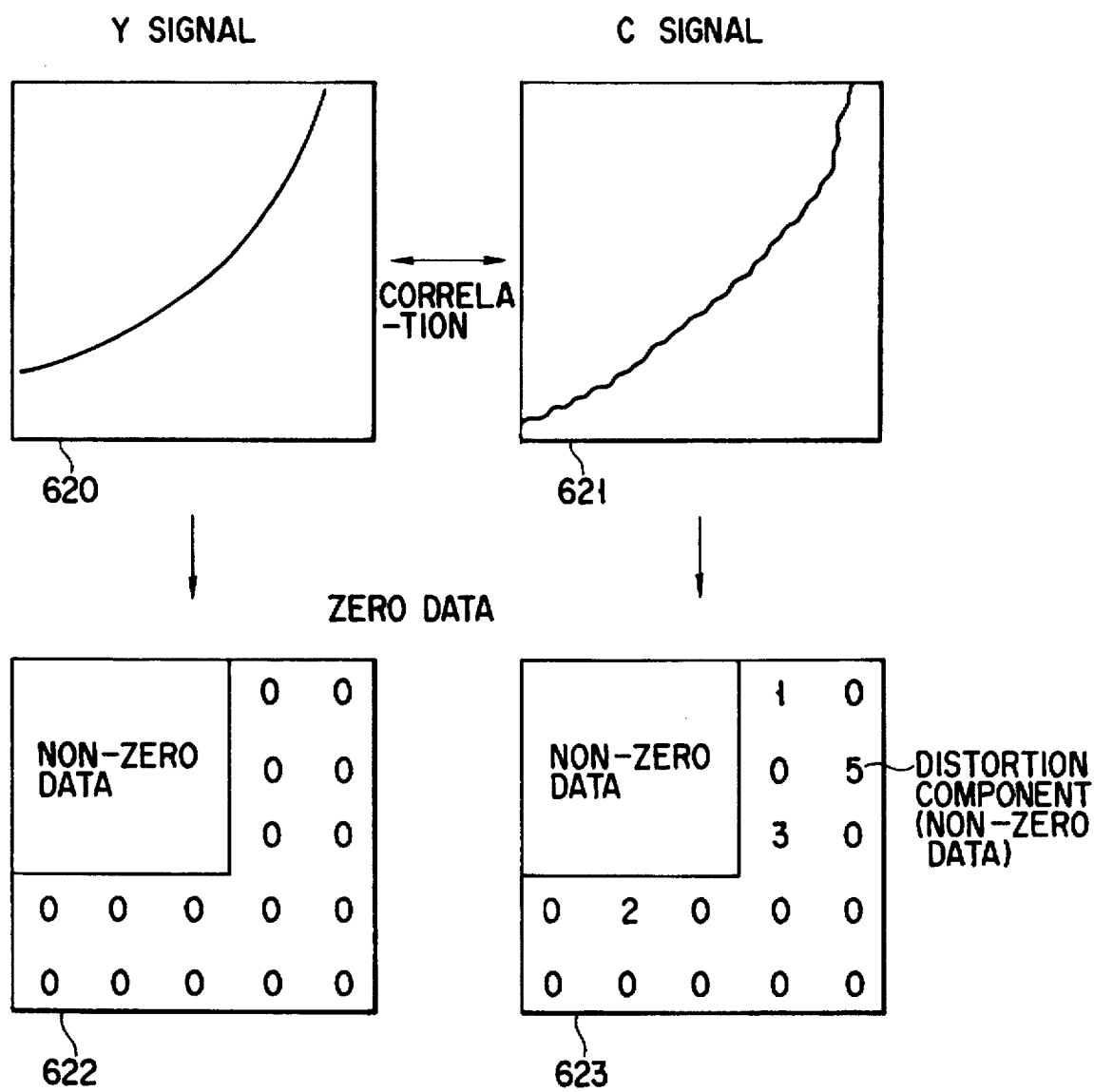
F I G. 23

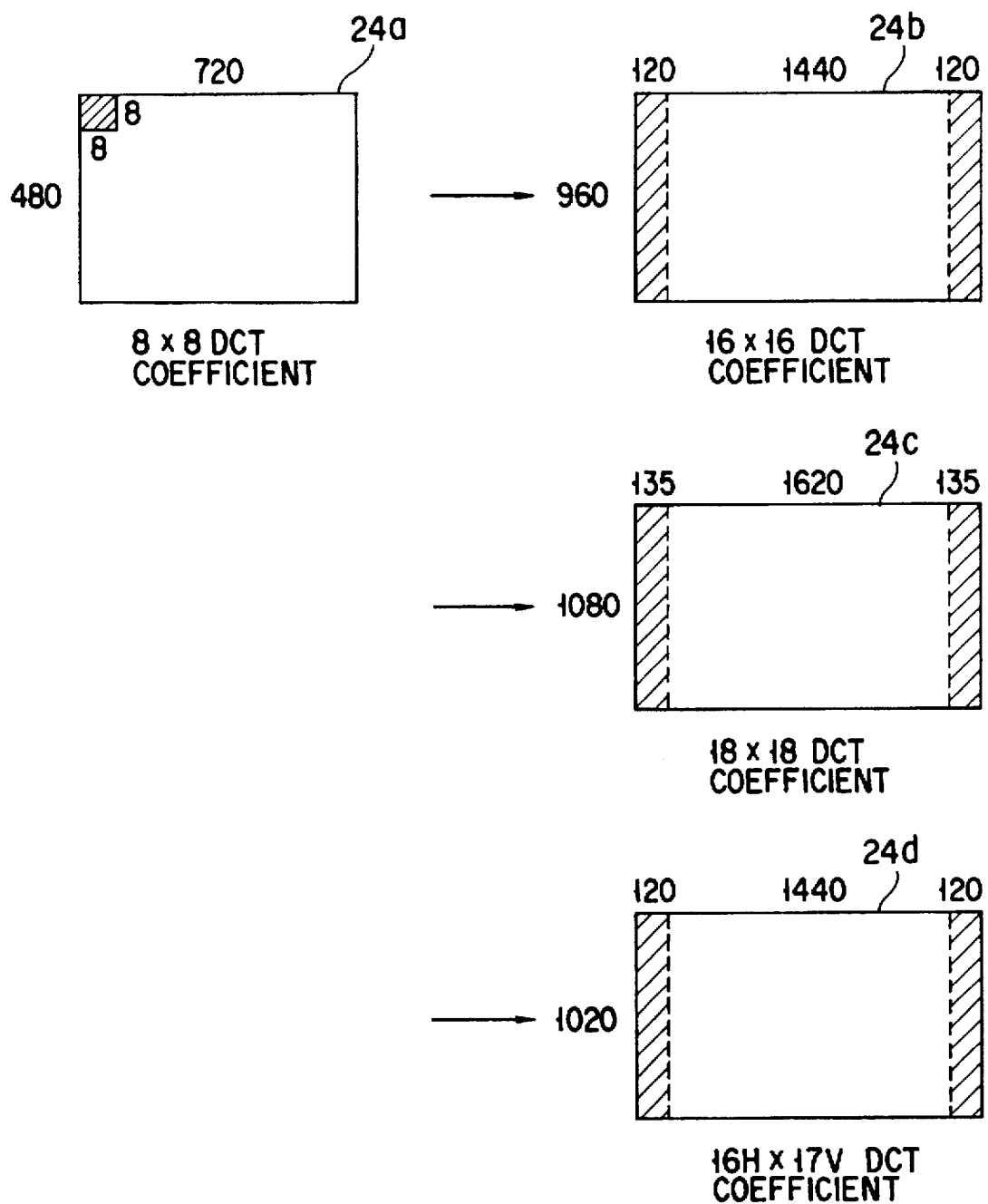
F I G. 24

SYSTEM CONVERSION OF HDTV → NTSC

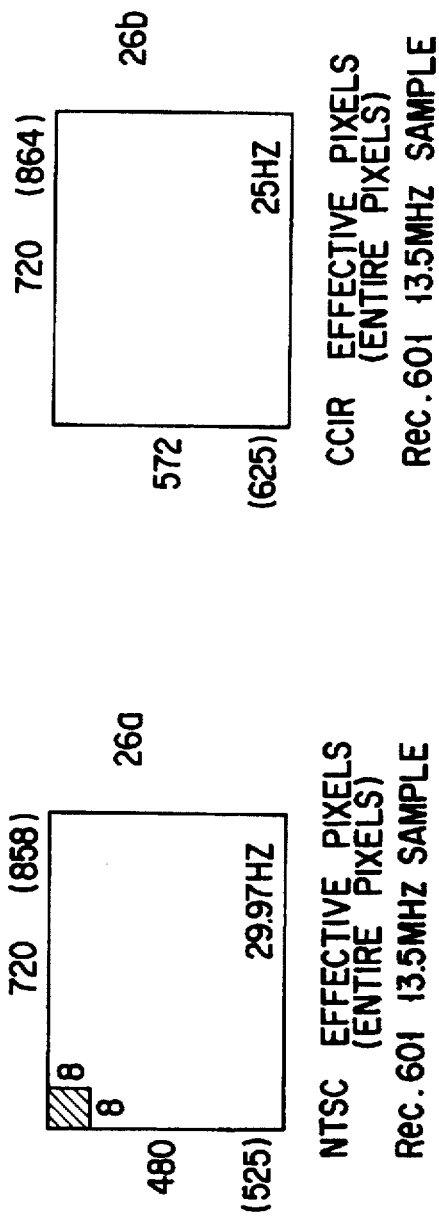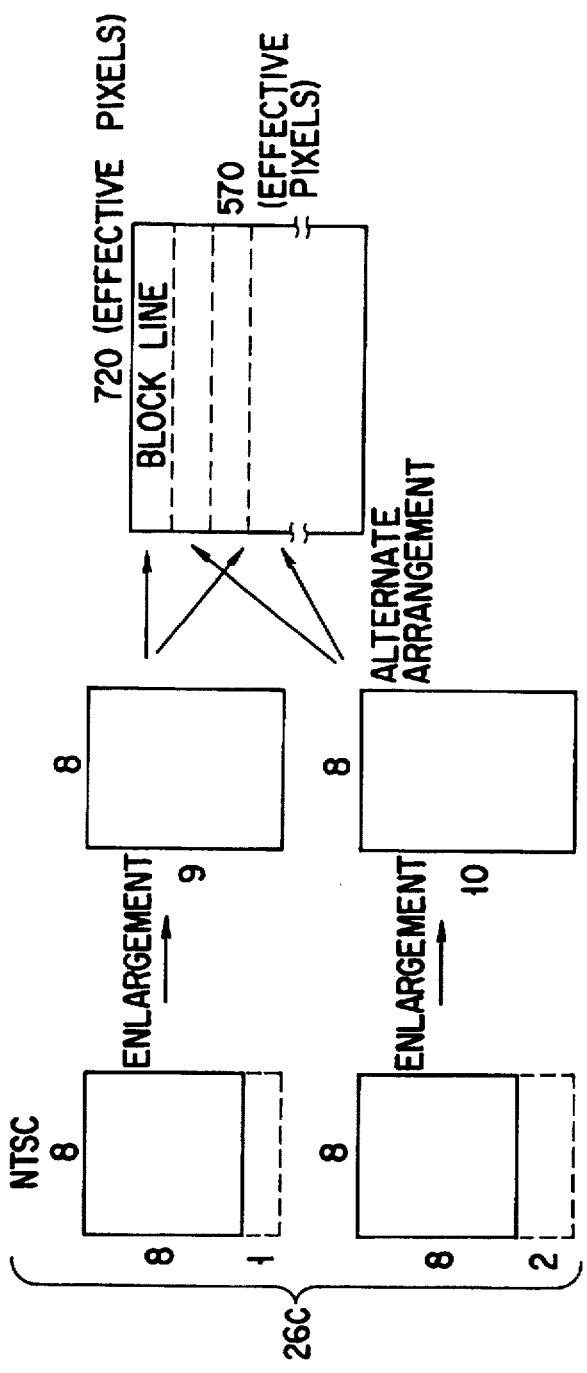
FIG. 26

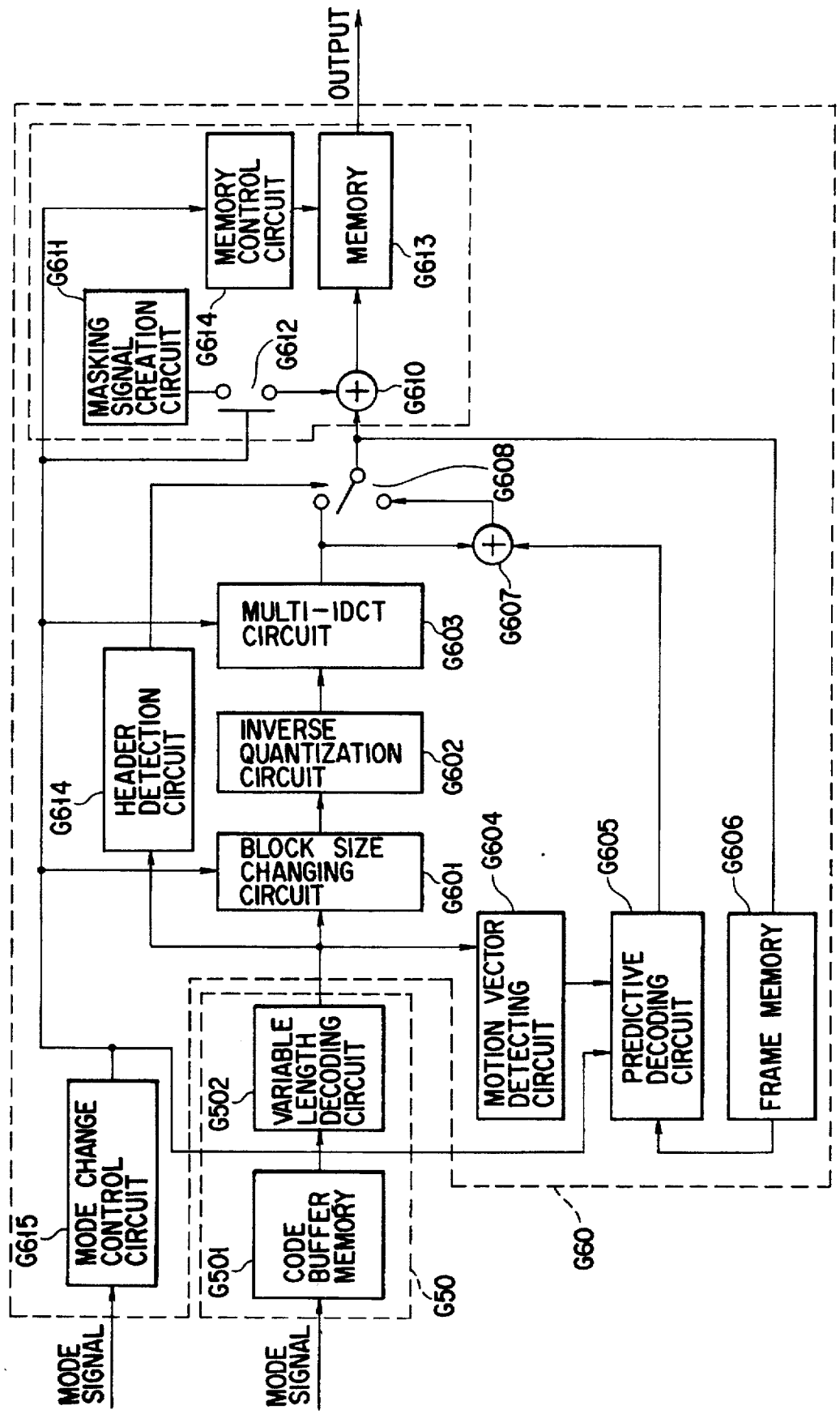
F I G. 29

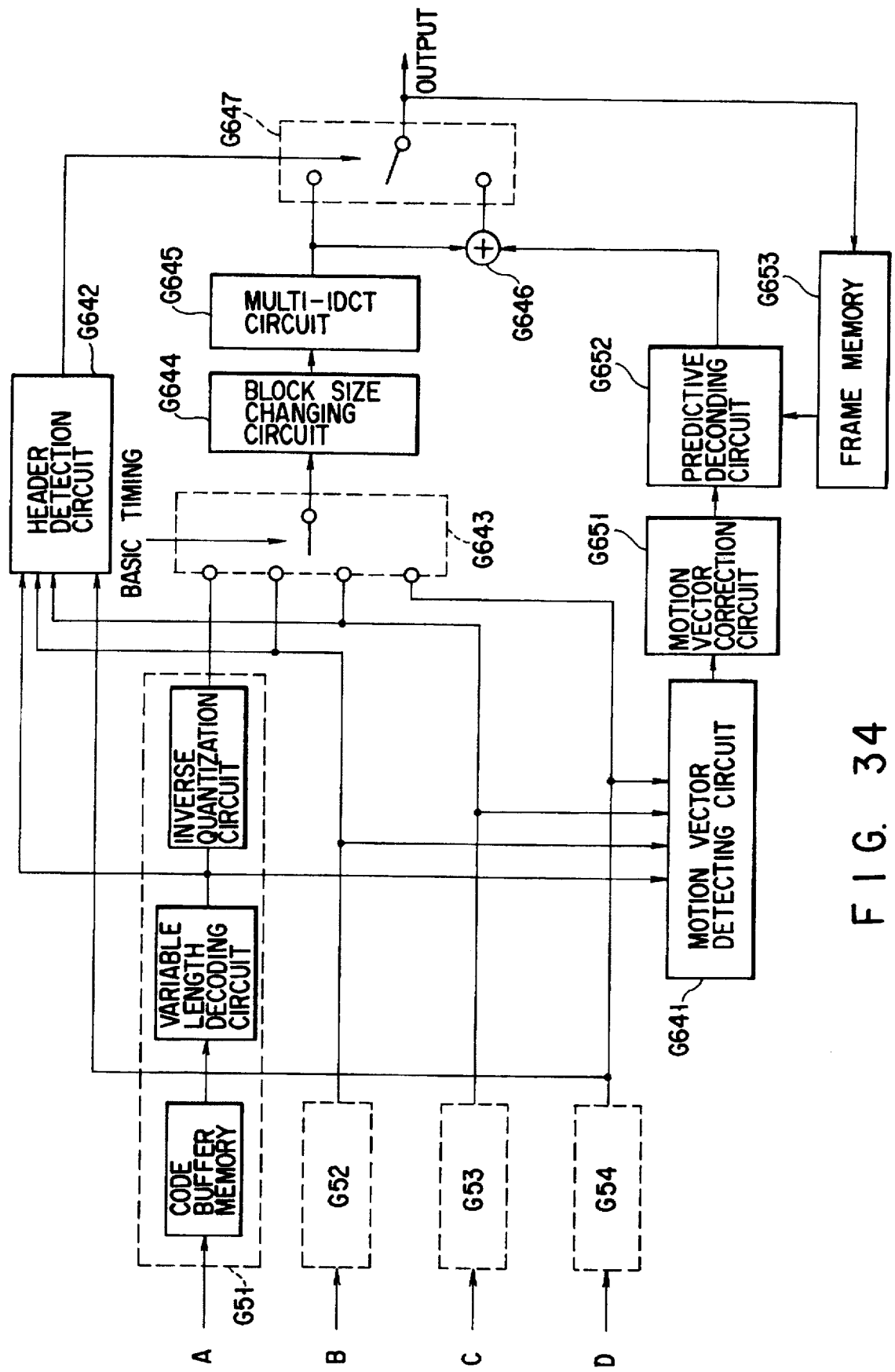
F I G. 34

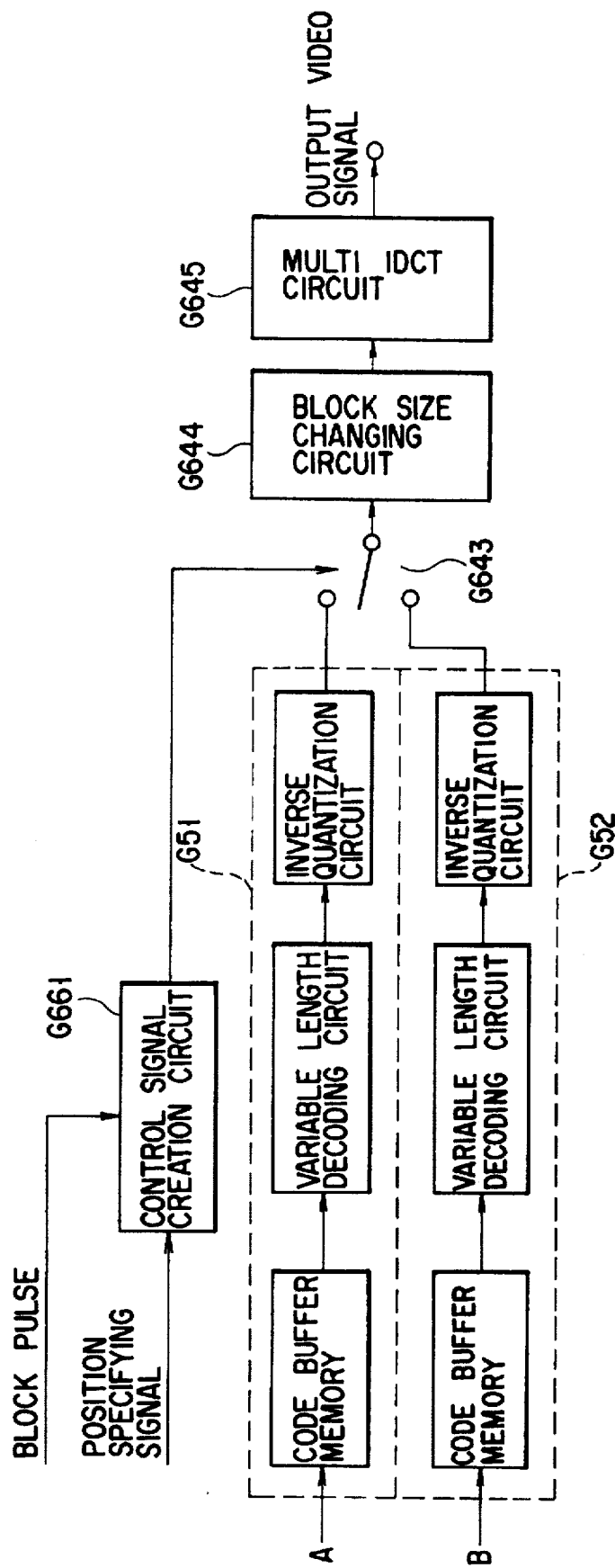
F I G. 35

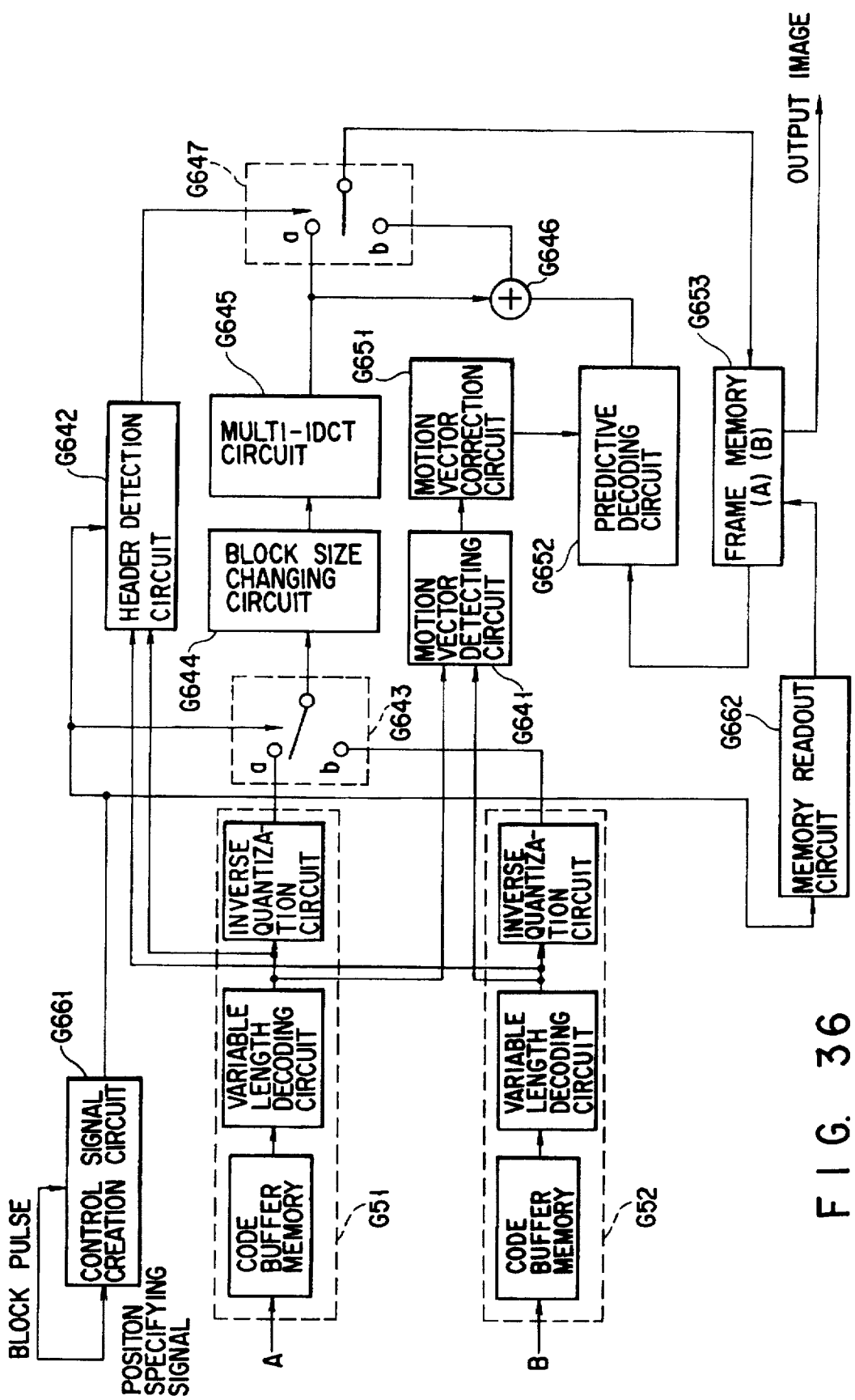
F I G. 36

MULTISYSTEM SIGNAL PROCESSING APPARATUS HAVING SPECIFIC HIERARCHICAL CODING

This is a division of application Ser. No. 08/089,565, filed Jul. 12, 1993 now U.S. Pat. No. 5,394,249.

BACKGROUND OF THE INVENTION

1. Field of the Invention

This invention relates to a multisystem adaptable type signal processing and recording/reproducing apparatus capable of recording various types of input signals and obtaining output signals in various systems in a field of, for example, video tape recorders (which are hereinafter referred to as VTRS) in which various types of recording/reproducing systems are standardized.

2. Description of the Related Art

VTRs for magnetically recording image signals on a magnetic tape including home VTRs may be divided into analog recording systems widely used and digital recording systems developed for broadcasting. In the digital recording system, an amount of information is large and information is generally subjected to the signal compression before the recording operation so as to be used for the home VTR.

As one example of the conventional VTR, analog recording type and digital recording type signal processing systems are described below.

First, the analog recording type signal processing system is explained. VTRs using the analog recording system are roughly divided into several systems including the VHS system and 8 mm system as home VTRs which are now widely used.

A recording signal is picked up from a magnetic tape by use of a reproducing head and amplified by a pre-amplifier. The low-frequency color signal component of an output signal of the pre-amplifier is removed by a high-pass filter (HPF) and separated as an FM luminance signal. The thus separated FM luminance signal is demodulated by an FM demodulation circuit after the level fluctuation in the amplitude thereof is suppressed by a limiter circuit. The frequency of the demodulated luminance signal is restored to the original frequency by a de-emphasis circuit and then the luminance signal is input to a noise compensation circuit for improving the S/N ratio via a drop-out correction circuit. After this, the luminance signal whose S/N ratio is improved is input to a luminance-color (YC) mixing circuit and mixed with a color signal described below.

An output signal of the pre-amplifier is input to a low-pass filter (LPF) and separated as a color signal component. The level fluctuation of the color signal is suppressed by an ACC circuit and then the frequency thereof is restored to a frequency band near the frequency 3.58 MHz of the original color signal by means of a frequency converting circuit and band-pass filter (BPF). After this, the color signal is subjected to a process using a 1H-delay circuit to eliminate the crosstalk, then input to the YC mixing circuit, combined with the luminance signal, and output as a video signal.

The digital recording system includes two types of standards called D-1 and D-2 for broadcasting. When an image signal is recorded in a digital manner, an amount of information is large if the signal is recorded without converting the above standard, and therefore, it becomes necessary to use a tape of large capacity and a large-scale hardware for processing the tape. Thus, an amount of information of image data must be reduced. The method therefor is disclosed in, for example, Japanese Patent Disclosure Nos. H.4-61523, H.4-79696, H.4-79681, H.4-91587, H.4-79688, Japanese Patent Disclosure No. S.54-32240, and Japanese Patent Disclosure No. S.61-196469.

Next, an example of a digital VTR system having an image compression processing function is explained.

An analog input signal is converted into a digital signal by an analog/digital (A/D) converter and divided for each block (which is constructed by 8 pixels in the horizontal direction and 8 lines in the vertical direction) which is a unit used for two-dimensional orthogonal transform by a formatter. Then, a data stirring process called a data shuffling process for each block unit or for each unit of preset number of blocks is effected by use of a buffer memory (Japanese Patent Disclosure Nos. H.4-61523, H.4-79696). After this, the memory output is converted from the time base to the frequency base by means of an orthogonal transforming means (Japanese Patent Disclosure No. H.4-79688), subjected to the quantization process in which it is divided by use of a desired threshold value for each block unit by a quantizing means, and then converted into a variable length code such as a Huffman code by a variable-length coding means (Japanese Patent Disclosure No. H.4-91587). For example, several macro-blocks of the variable-length coded data are stored into three sinks by a data re-arranging means. Important data is collectively stored in one of the three sinks (Japanese Patent Disclosure No. H.4-79681). Additional information (called a parity) which is necessary for error correction in the reproducing operation is added to data subjected to the data re-arrangement by an error correction coding means (Japanese Patent disclosure No. S.54-32240), and then the data is subjected to the digital modulation such as 8–14 modulation by a modulation means (Japanese Patent Disclosure No. S.61-196469) and output to a recording system.

In the reproducing mode, a reproduction signal from the reproducing system is demodulated by the demodulation means, subjected to the error correction by an error correction decoding means so as to be converted into correct data, and then decoded by a variable length decoding means. The decoded data is inversely quantized by an inverse quantization means and is further converted from the frequency base to the time base by an inverse orthogonal transform means. Then, the data is subjected to the process which is an inverse process of the shuffling in a memory, subjected to the process which is an inverse process of the formatting effected at the time of recording by the formatter, converted into an analog signal by a D/A converter and output.

As described above, the analog recording type and digital recording type VTRs are provided, but a VTR which is a combination of the analog recording type and digital recording type VTRs such as a digital recording/reproducing apparatus which can reproduce an analog reproducing tape recorded in a different system (format) is not provided, for example. Therefore, there may occur a problem that when a digital recording type VTR is made for home use, an analog recording tape cannot be reproduced by use of the digital recording type VTR. Further, various standards are provided for video signals and television receivers of different standards are provided.

SUMMARY OF THE INVENTION

An object of this invention is to provide a multisystem adaptable type signal processing and recording/reproducing apparatus which can record a signal in a preset form even if various types of input video signals are input and reproduce and output a signal in a desired form even if video signals of various forms are recorded on a recording medium.

An apparatus of this invention includes means for effecting the coded signal processing and decoded signal processing by use of the hierarchical structure in low bit rate coding means and low bit rate decoding means.

Further, an apparatus of this invention includes means for recording a signal processed according to the hierarchical structure for each hierarchical level and reproducing signals of low hierarchical level and/or reproducing signals of all of the hierarchical levels in the reproducing mode.

Further, an apparatus of this invention includes means for determining a tape format by detecting the number of tracks which the reproducing head for scanning the magnetic tape at a preset angle covers.

Further, an apparatus of this invention includes a demodulation section using a phase-locked loop and means capable of variably setting the band limiting characteristic of the reproducing signal so as to demodulate either the analog reproducing signal or digital reproducing signal to obtain a reproducing signal.

Further, an apparatus of this invention includes means which utilizes the characteristic occurring when the luminance signal and color signal are respectively converted with the same size of blocks onto the frequency base and which is used to remove a color signal component from the luminance signal block and improve the noise characteristic when the color signal component is present in a region corresponding to a portion in which the luminance signal is zero data.

An apparatus of this invention includes means for changing and controlling the block size when the low bit rate coding process or low bit rate decoding process is effected.

By use of the above means, a plurality of video signals of different forms can be recorded, and a reproducing output video signal of a corresponding form or a video signal of low hierarchical level can be reproduced in the reproducing mode. Further, the image quality can be improved and various systems can be converted according to a specification of the reproduced output.

BRIEF DESCRIPTION OF THE DRAWINGS

FIGS. 2A, 2B are diagrams for illustrating image planes for NTSC and HDTV signals;

FIG. 2C is a diagram showing the number of pixels of the NTSC signal together with the number of pixels of the HDTV signal;

FIGS. 3A to 3C are diagrams for illustrating a method for determining the image plane structure when the low bit rate coding process for the television signal is effected based on the hierarchical structure;

FIG. 4 is a diagram for illustrating a procedure for determining the block size in the process of the hierarchical structure;

FIGS. 6A, 6B are diagrams for explaining the functions of a quantization circuit of FIG. 5 and an inverse quantization circuit corresponding to the quantization circuit;

FIG. 11 is a block diagram showing another example of a recording signal determining circuit;

FIGS. 14A, 14B are block diagrams respectively showing other examples of the common reproducing circuit;

FIG. 17 is a block diagram showing an example of the phase shifting circuit;

FIG. 20 is a signal waveform diagram for illustrating the operation of the phase shifting circuit of FIG. 19;

FIG. 23 is a diagram for illustrating the operation of the image quality improving circuit of FIG. 22;

FIG. 24 is a diagram for illustrating an example of the system conversion of television signals;

FIG. 26 is a diagram for illustrating still another example of the system conversion of television signals;

FIG. 29 is a block diagram showing an example of a system conversion circuit of television signals;

FIG. 34 is a block diagram showing an example of a circuit for effecting the multiple image plane display process;

FIG. 35 is a block diagram showing an example of a circuit for effecting the enlargement/reduction display process; and FIG. 36 is a block diagram showing another example of the circuit for effecting the enlargement/reduction display process.

DETAILED DESCRIPTION OF THE PREFERRED EMBODIMENTS

There will now be described an embodiment of this invention with reference to the accompanying drawings.

Figure 1:
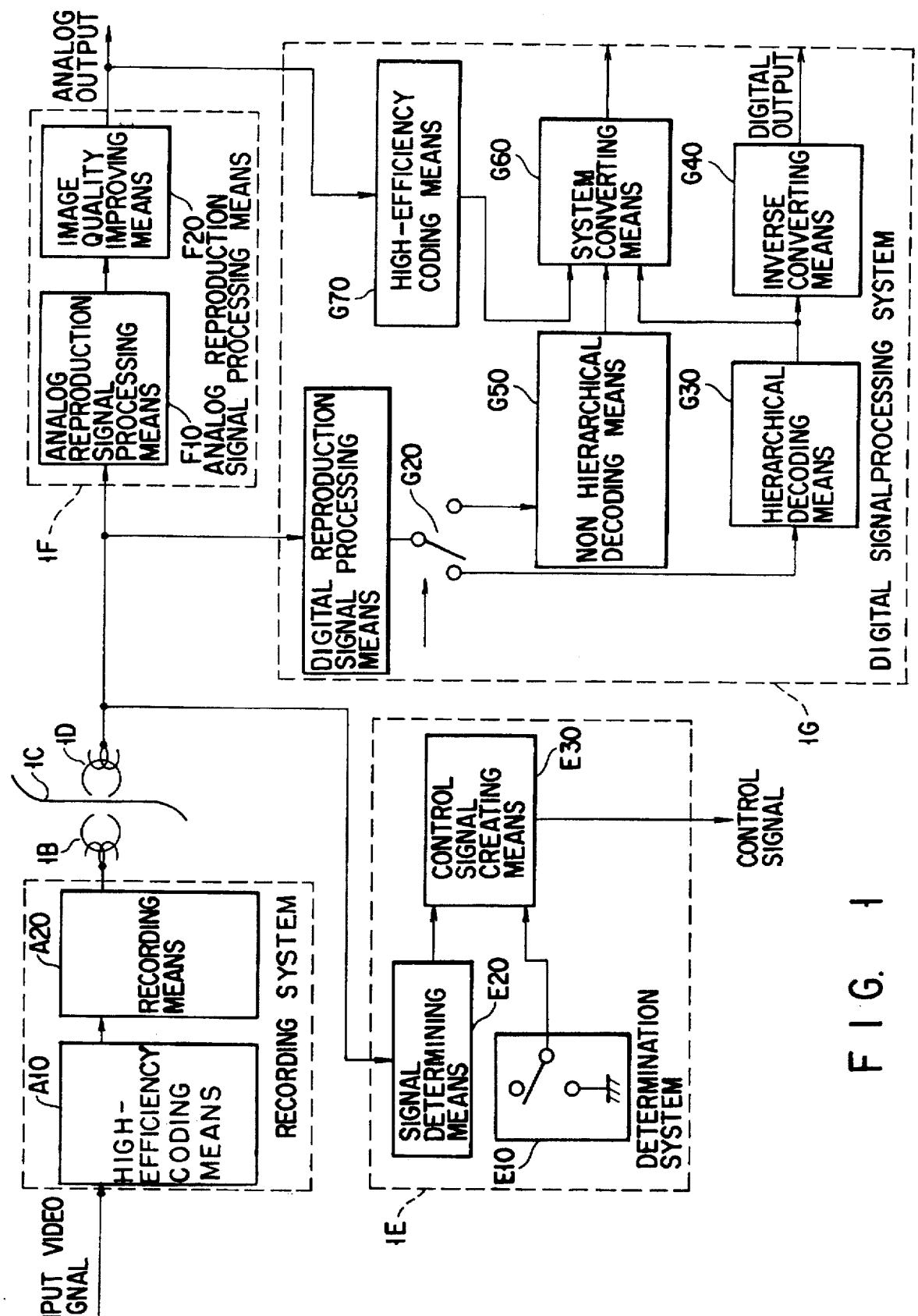
FIG. 1 is a basic block diagram showing the entire structure of one embodiment of this invention.

FIG. 1 is a basic block diagram showing the entire structure of one embodiment of this invention. The explanation for the entire basic block is made below. The system is a system for recording/reproducing a video signal in a digital signal form.

In FIG. 1, 1A denotes a recording system for recording input information signals (video signal and audio signal). The recording system 1A includes a high-efficiency coding means A10 for subjecting the input information signal to the low bit rate coding process and a recording means A20 connected to receive an output of the high-efficiency coding means A10. The high-efficiency coding means A10 can code two or more types of video signals by a preset hierarchical low bit rate coding method. That is, it has first and second hierarchical levels, selectively effects the process only by use of the first hierarchical level or the process by use of a combination of the first and second hierarchical levels according to input video signals having different numbers of pixels in the horizontal and vertical directions or video signals of different types, and outputs the result of the process to the recording means A20.

For example, an HDTV (High Definition TV) signal is input, pixel information constructing an NTSC signal is processed in the first hierarchical level and pixel information of difference between the HDTV signal and NTSC signal is processed in the second hierarchical level to restore the HDTV signal at the later stage (assuming that it is reproduced at a later stage), so as to effect the low bit rate coding process.

Further, in the recording means A20, an error correction signal, synchronization signal, additional signal and the like are added to the coded signal. Even when the recording signal is constructed in the hierarchical structure for the respective types of NTSC signal and HDTV signal, recording heads for the types are separated from each other so that each type of signal can be independently used and the effective signals can be reproduced by either a VTR exclusively used for NTSC or a VTR exclusively used for HDTV.

A to-be-recorded signal is recorded on a tape 1C via a recording head means 1B.

Next, the reproducing signal processing system is explained. A signal is picked up from the tape 1C via a reproducing head means 1D. The reproduced signal is input to a determination system 1E and to an analog signal processing system 1F and digital signal processing system 1G.

The determination system 1E is a means for determining the type and standard of the recorded signal. The determination system 1E includes a switch E10, signal determining means E20 and control signal creating means E30. The switch E10 is drivingly coupled with a mechanical content determining means for generating a signal according to the position of a hole of a tape cassette and the open/close state of the hole and generates a detection signal. The signal determination means E20 receives the envelope of a reproduced signal, determines the type of the signal according to the detected output thereof and outputs a determination signal.

The control signal creating means E30 receives at least one of the determination signal and detection signal, outputs a control signal supplied to various circuits according to the contents thereof, and determines the reproducing state of the system. The control signal is supplied to associated portions, and in FIG. 1, only an output of the control signal creating means E30 is shown for simplifying the drawing.

When the result of determination shows that an analog signal is recorded on the tape, the reproducing signal is input to an analog reproducing signal processing means F10 of the analog reproducing signal processing system.

In an analog signal processing system 1F, a reproducing signal is input to the analog reproduction signal processing means F10 and reproduced according to the standard used at the time of recording. At this time, it has a common circuit portion with the digital processing circuit as will be described later, but the circuit is treated as if it is provided independently here. An output of the analog reproduction signal processing means F10 is processed in an image quality improving circuit F20 to compensate for deterioration in the various signals caused by the analog recording/reproducing operation. Thus, an analog reproducing signal is output.

When it is determined in the determination system 1E that a tape which is now reproduced is a digital recorded tape, a reproducing signal is input to a digital reproduction signal processing means G10 of a digital signal processing system 1G. In this circuit, various processes including the waveform equalization process for converting the reproduced signal into a digital signal, demodulation process for the modulated signal, synchronization, data conversion (corresponding to time base correction (TBC)) from the reproduced clock rate to a clock rate of an internal reference signal, error correction process for errors contained in t he reproduced signal are effected. An output of the digital reproduction signal processing means G10 is input to a signal switching circuit C20. The signal switching circuit G20 selects the signal path according to whether the reproduced signal is a hierarchical coded signal or non-hierarchical coded signal. The reason why the non-hierarchical coded signal is determined is that the system can reproduce a tape which is recorded by use of the conventional system or a tape recorded with a different standard.

When the reproduced signal is a hierarchical coded signal, the variable length signal is restored to fixed length data in a hierarchical decoding means G30 and a process for decomposing the hierarchical structure of hierarchical data is effected in an inverse quantization section. In this case, the hierarchical structure is decomposed partly or entirely according to a specifying signal for specifying one of NTSC and HDTV. That is, when a required reproduced output signal is part of the hierarchical structure, the hierarchical structure is decomposed by use of only the corresponding portion thereof (the hierarchical level of information of the NTSC signal), and when a required reproduced output signal is the entire portion of the hierarchical structure, the hierarchical structure is decomposed by use of the entire hierarchical levels.

When a reproduced signal is not a low bit rate coded signal defined by the hierarchical structure, it is input to a non-hierarchical decoding means G50, subjected to the variable length decoding process and quantization process, and then input to a system conversion means G60.

In the system conversion means G60, a process for changing the block conversion size, the block conversion process for the size and time base adjusting process are effected according to the requirement (specification) for an output signal and then a conversion signal is output.

When a digital signal is recorded in the hierarchical coding state and if the system conversion is necessary, an output of the hierarchical coding means G30 is input to the system conversion means G60 so as to effect the system conversion.

Further, when an analog signal is reproduced, an analog output of the image quality improving means F20 is coded to levels corresponding to the outputs of the decoding means G30 or G50 in a high-efficiency coding means G70 and a coded signal is input to the system conversion means G60 (it is also possible to convert the analog signal to a digital signal, effect the process up to the block conversion process or quantization process and commonly use part of the high-efficiency coding means A10).

Of course, when an output of the same signal form as the recorded signal is required or specified, the operations of the above circuits are not effected.

As described above, this system is a digital recording/reproducing device capable of reproducing analog recording tape recorded in a different system (format) and a video signal of different signal system can be converted into a desired signal system. Further, it is possible to selectively output an NTSC signal or HDTV signal according to the specification of the reproduced output form by previously processing and recording a signal by use of the hierarchical structure.

As described above, this system can record and reproduce two or more different types of signals such as HDTV and NTSC signals which have different bandwidths and are of different systems when they are broadcasted.

In this system, the reproducing operation is also fully taken into consideration. That is, since television receivers which are used when signals are reproduced are respectively provided exclusively for NTSC signals and HDTV signals, a special consideration is taken at the time of recording so that the reproduced signal can be easily processed by either type of the television receivers.

For this purpose, in the high-efficiency coding means for HDTV (high bit rate) signals, a block unit HD for deriving an HDTV (high bit rate) signal and a block unit NT corresponding to the pixel construction of NTSC (low bit rate) signals are defined. There is provided a hierarchical coding means for determining the sampling frequency and block unit ratio (HD/NT) such that the relation between the block units HD and NT can be expressed by the integral ratio in the horizontal and vertical directions, and setting NT in the first hierarchical level and setting HD in the second hierarchical level.

If the signal is coded in the above-described manner and when a reproduced signal is decoded, an NTSC signal can be output by reproducing only the signal of first hierarchical level in the reproducing device for HDTV signals, and an HDTV or NTSC signal can be output by reproducing signals of the first and second hierarchical levels. Further, in the reproducing device for NTSC signals, an NTSC signal of the first hierarchical level can be reproduced.

Next, the high-efficiency coding means A10 is explained in detail. This means is closely related to the content of the digital signal processing system 1G.

First, the concept of this invention is explained with reference to the schematic diagram of one image plane shown in FIG. 2.

For example, when an image plane of one frame of an NTSC signal is considered, the number of vertical scanning lines is 525 and the horizontal frequency is 15.734 KHz. When a video signal is converted into a digital form, the sampling frequency is set to 13.5 MHz according to the CCIR Rec.601 recommendations, and if this sampling frequency is used, the number of pixels is set to 858 in the horizontal direction and 525 in the vertical direction. The pixels of the effective image plane are 720 points in the horizontal direction and 480 points in the vertical direction.

As shown in FIG. 2A, xN' and yN' in one frame structure of NTSC signal are respectively set to 858 and 525 pixels and xN and yN of the effective image plane are respectively set to 720 and 480 pixels. In the following explanation, since only the effective pixel portion is treated as a portion used at the time of low bit rate (high-efficiency) coding process in most cases, the portion is described as the effective pixel portion if no mention is made.

FIG. 2B shows an HDTV signal of one frame structure. the effective pixel portions xH and yH are respectively set to 1152 and 1035 pixels.

In FIG. 2C, specific numerals are used and the relation between the NTSC signal and HDTV signal in the horizontal (x) direction, vertical (y) direction and time base (v) direction is shown. The NTSC signal is set as described before and the pixel construction of the HDTV signal obtained in a case where the sampling frequency is 44.55 MHz is shown as HDTV(1). Also, the pixel construction obtained in a case where the sampling frequency is 53.65 MHz is shown as an HDTV(2) signal.

When the NTSC signal is compared with the HDTV(1) signal, the ratio in the horizontal direction is approx. 5:8, the ratio in the vertical direction is approx. 6:13, and the ratio in the time base direction is approx. 1:1.

When the NTSC signal is compared with the HDTV(2) signal, the ratio in the horizontal direction is approx. 4:8, the ratio in the vertical direction is approx. 4:8, and the ratio in the time base direction is 1:1.

As described above, in order to form an NTSC signal by use of part of the HDTV signal, the pixel construction must be easily converted for obtain a multi-hierarchical structure. Then, there occurs a problem that the number of pixels must be changed and the bandwidth must be reduced. In this system, the sampling frequencies of the NTSC signal and HDTV signal are so determined that the pixel construction ratio can be kept constant, and the HDTV signal is subjected to the high-efficiency coding process for each hierarchical level under the thus determined relation. The drawing shows a concrete example of the ratio.

Like the conventional high-efficiency coding apparatus, data is restored to the original size by subjecting data which has been coded by subjecting the data to the DCT (discrete cosine transform) of 8×8 to the inverse DCT of 8×8 at the decoding time.

However, the original image plane size can be restored with the original precision kept unchanged if one block is sequentially coded with the sizes of 2×2, 4×4 and 8×8 for each hierarchical level at the coding time and data of 2×2, 4×4 and 8×8 is decoded at the decoding time respectively, but if only the data of 2×2 is subjected to the inverse DCT of 8×8, the original size can be restored but the original precision cannot be attained. This is because a difference between data of 2×2 and data of 8×8 may be regarded as being omission of high frequency band components when data of 2×2 is subjected as it is to the inverse DCT by use of the size of 8×8.

On the other hand, if the data of 2×2 is subjected as it is to the inverse DCT by use of the size of 2×2, the image plane size becomes ¼ times the original value in both of the horizontal and vertical directions for each DCT block. Thus, the method of forming the hierarchical structure and the method of decoding the same are extremely important from the viewpoint of the image plane size and frequency band.

Therefore, the necessity for setting the pixel ratio in the horizontal and vertical directions in the integral relation was described before. It is easily understood that if the pixel ratio is set as described above, an NTSC signal can be created by forming the HDTV signal to satisfy the above pixel ratio in the hierarchical structure and extracting part of the HDTV signal.

An additional explanation is made for reference.

The low bit rate coding and decoding processing system is a system of input image→DCT→IDCT→output image. In the DCT process, a block of 8 pixels in the horizontal direction and 8 pixels in the vertical direction is two-dimensionally extracted and subjected to the DCT process. Outputs obtained after the transformation are same with frequency-converted coefficients and eight coefficients are present in the horizontal and vertical directions. The output is subjected to the quantization process and variable length coding process to lower the transmission rate, and on the decoding side, the variable length is converted to the fixed length, and then data is inversely quantized to be set into the DCT coefficient state and then subjected to the IDCT (inverse DCT). If the number of coefficients is not changed, the same number of pixels can be obtained when data is restored into the original state. The input and output correspond to the number of pixels and the DCT/IDCT states correspond to the DCT coefficient.

When the number of pixels of the IDCT is changed, the number of pixels obtained after the IDCT is changed. When only a 2×2 component is extracted from data which is subjected to the 8×8 DCT process and it is subjected to the 2×2 IDCT, the number of pixels becomes 2×2. That is, the vertical and horizontal dimensions become ¼ times the original values.

When the image plane size is changed, a problem that an aliasing component will appear if the frequency band is not limited may occur. However, since the 2×2 component is sequentially extracted from the low-frequency component obtained when the DCT process is previously effected at the encoding side as described before, the same effect as that of the bandwidth limitation is attained.

In order to realize the above content, the relation between the DCT of M×N and the IDCT of m×n must be made theoretically clear in the transformation of DCT/IDCT.

Equations [1], [2], [3] express the transformation equations.

The following items (1), (2), (3) indicate three equations, that is, the equation of general square block of N×N, the equation of rectangular block of M×N, and the general equation.

(1) DCT/IDCT of N×N (2) DCT/IDCT of M×N (3) DCT of M×N and IDCT of m×n The DCT of N×N is effected by the following equation (2-1) and the IDCT is effected by the following equation (2-2).

$$F(u, v) = \frac{2}{N} \cdot \sum_{u=0}^{N-1} \cdot \sum_{v=0}^{N-1} \cdot C(u) \cdot C(v) \cdot F(u, v) \times \quad (2-1)$$

$$\cos(\pi/N \times u(j + (1/2))) \cdot \cos(\pi/N \times v(k + (1/2)))$$

where u, v=0, 1, 2, - - - N.

$$f(j, k) = (2/N) \cdot \sum_{u=0}^{N-1} \cdot \sum_{v=0}^{N-1} \cdot C(u) \cdot C(v) \cdot F(u, v) \times \quad (2-2)$$

$$\cos(\pi/N \times u(j + (1/2))) \cdot \cos(\pi/N \times v(k + (1/2)))$$

where i, j=0, 1, 2, - - - N.

The term inside cos, for example, $\pi/N \times u(j+(½))$ is $(j+(½)) \cdot u \cdot \pi/N = (2j+1) \cdot u \cdot \pi/2N$. In this case, C(u) is $1/\sqrt{2}$ when u=0 and it is 1 at the other time, and C(v) is $1/\sqrt{2}$ when u=0 and it is 1 at the other time.

$$\underset{\text{input image}}{\overset{f(j,k)}{\longrightarrow}} DCT \underset{\text{DCT coefficient}}{\overset{F(u,v)}{\longrightarrow}} IDCT \underset{\text{output image}}{\overset{f(j,k)}{\longrightarrow}}$$

(2) DCT/IDCT of M × N

The DCT of M×N is effected by the following equation (2-3) and the IDCT is effected by the following equation (2-4).

$$F(u, v) = \frac{2}{\sqrt{M \cdot N}} \cdot \sum_{u=0}^{M-1} \cdot \sum_{v=0}^{N-1} \cdot C(u) \cdot C(v) \cdot F(u, v) \times \quad (2-3)$$

$$\cos \frac{(j + (1/2)) \cdot u \cdot \pi}{M} \cdot \cos \frac{(k + (1/2)) \cdot v \cdot \pi}{N}$$

where u=0, 1, 2, - - - M and v=0, 1, 2, - - - N.

$$f(j, k) = \frac{2}{\sqrt{M \cdot N}} \cdot \sum_{u=0}^{M-1} \cdot \sum_{v=0}^{N-1} \cdot C(u) \cdot C(v) \cdot F(u, v) \times \quad (2-4)$$

$$\cos \frac{(j + (1/2)) \cdot u \cdot \pi}{M} \cdot \cos \frac{(k + (1/2)) \cdot v \cdot \pi}{N}$$

where i=0, 1, 2, - - - M and j=0, 1, 2, - - - N.

C(u) and C(v) are 1 when u, v=0 and they are $1/\sqrt{2}$ when u, v are not 0.

(3) DCT of M×N and IDCT of m×n

In the case of DCT of M×N, the equation (2-3) is used, and in the case of IDCT of m×n, the following equation (2-5) is used.

The equation (2-5) is obtained by replacing M and N in the equation (2-4) by m and n, respectively.

$$f(j, k) = \frac{2}{\sqrt{m \cdot n}} \cdot \sum_{u=0}^{m-1} \cdot \sum_{v=0}^{n-1} \cdot C(u) \cdot C(v) \cdot F(u, v) \times \quad (2-5)$$

$$\cos \frac{(j + (1/2)) \cdot u \cdot \pi}{m} \cdot \cos \frac{(k + (1/2)) \cdot v \cdot \pi}{n}$$

where u=0, 1, - - - m and j=0, 1, - - - n.

C(u) and C(v) are 1 when u, v=0 and they are $1/\sqrt{2}$ when u, v are not 0.

The DCT of N×N in the item (1) is a general equation of the square type DCT.

The DCT of M×N in the item (2) is an equation of the rectangular type DCT. It is only slightly different from the square type DCT in the coefficient.

The DCT of M×N in the item (3) is a rectangular type DCT and the IDCT of m×n is used in the same manner. In this case, a process such as the coefficient correction is necessary. The case of the item (3) is further explained. The coefficient correction must be effected when the DCT of M×N and the IDCT of m×n are effected.

The dynamic range of the DCT coefficient F(u, v) obtained when subjecting f(j, k) to the DCT process of M×N must be corrected when the IDCT is effected by use of the different size m×n (by cutting off the coefficient and effecting the interpolation). This is because $F(u, v) \leq (2/(MN)^{1/2}) C(u)C(v)MN = 2C(u)C(v)(MN)^{1/2}$ in the DCT of M×N. The equation for the IDCT of M×N is made according to the above dynamic range. Therefore, the IDCT of m×n defines $F(u, v) \leq 2C(u)C(v)(mn)^{1/2}$ and a difference $((mn)^{1/2}/(MN)^{1/2})$ of the dynamic range must be provided. This corresponds to the correction amount.

Next, the display on the HDTV/NTSC monitor is additionally explained with reference to FIG. 3.

It should be noted that the hierarchical ratio is not simply determined only by the relation between the effective number of pixels and the sampling frequency in the process of defining the hierarchical structure explained with reference to FIGS. 2 and 4.

It is necessary to take the relation with respect to the monitor for displaying the image into consideration when the hierarchical ratio is determined.

In FIG. 3A, an example of the display of NTSC image on the HDTV monitor is shown. Since the height/width ratios thereof are respectively 9:16 and 3:4 and different from each other, no signal is present on both sides of the image plane when the NTSC signal is up-converted.

FIGS. 3B and 3C show examples of the display obtained when the HDTV signal is displayed on the NTSC monitor in a case where the image size in the vertical direction is reduced unlike the case of FIG. 3A to display the entire portion of the image in the horizontal direction so as to compensate for the difference in the height/width ratio (FIG. 3B) and in a case where both side portions of the image plane display portion for the HDTV signal are omitted (FIG. 3C). Further, FIG. 3B indicates the number (360 pixels) of the vertical scanning lines after the reduction process in the letter box system. In this case, the ratio of the hierarchical structure in the vertical direction must be ¾ times the original value. FIG. 3C indicates the number of the horizontal pixels after the reduction process in the side cut system. In this case, the hierarchical ratio must be determined by use of the value obtained after the reduction process.

FIG. 4 shows a process of determining the hierarchical structure. The process includes the following six steps (1) to (6).

(1) Determination of the target sampling frequency and number of pixels of the image plane in the NTSC/HDTV.

(2) Calculation of the integral ratio of the number of pixels of the image plane in the NTSC/HDTV.

(3) Determination of the DCT block size of the HDTV signal.

(4) Calculation of the hierarchical size of the NTSC having the hierarchical structure.

(5) Calculation for correction according to the display format.

(6) Final system determination for the first and second hierarchical levels.

Figure 5:
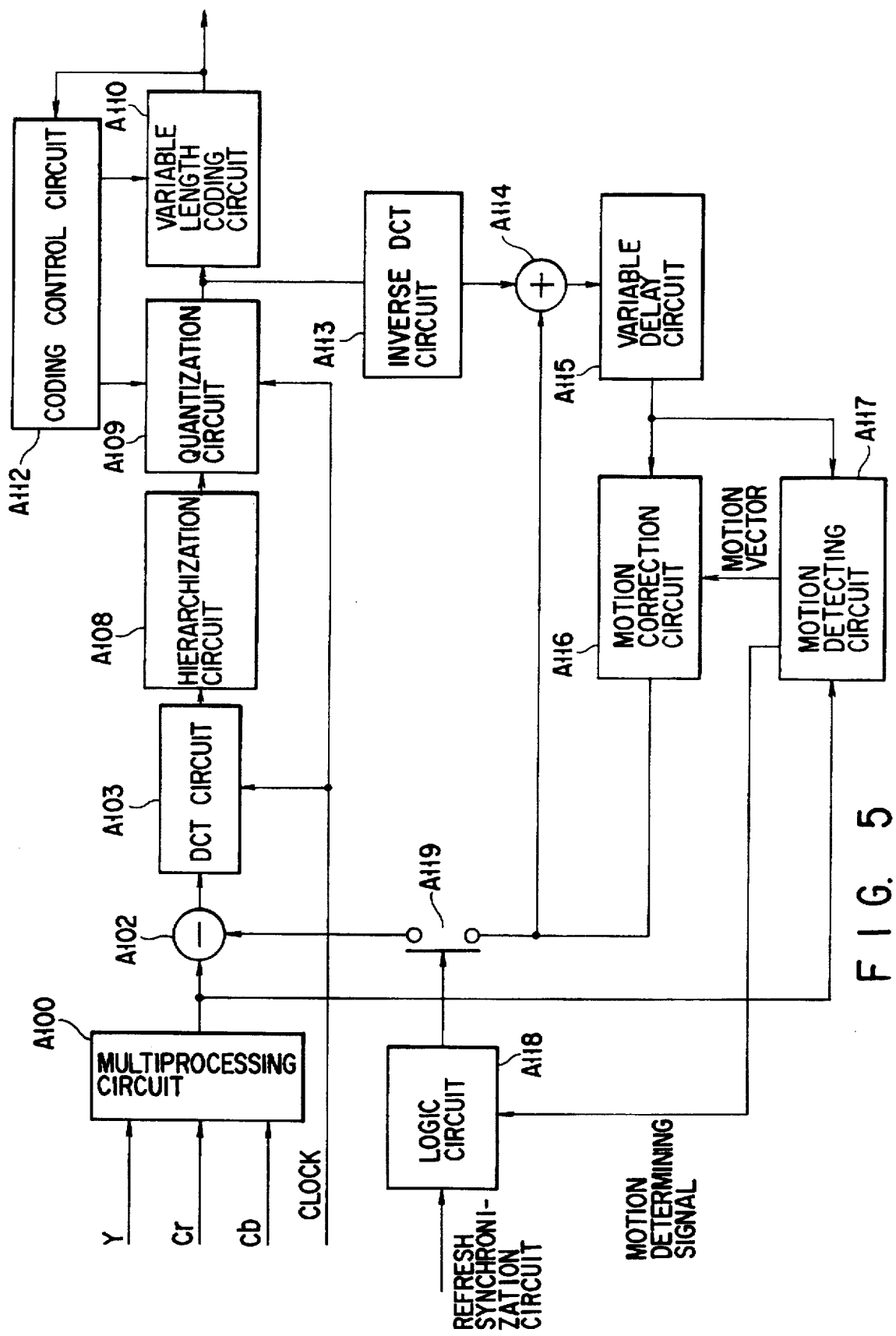
FIG. 5 is a block diagram specifically showing an example of low bit rate coding means of FIG. 1.

FIG. 5 shows an example of the high-efficiency coding means A10. The low bit rate coding means A10 effects the hierarchical structure process. The hierarchical structure process is an important factor of the recording section.

In some cases, the hierarchical structure process is not effected, but this is the case of the system conversion process of the reproducing signal processing section and it is valid irrespective of the presence or absence of the hierarchical structure.

An important point of this invention lies in the method of determining the hierarchical structure. It is different from the case of the conventional hierarchical structure in that the masking process for the image plane and the final output signal at the decoding time can be used the masking process for the image plane being able to cope with a difference between the frame frequencies of the reproducing signal.

FIG. 5 shows an example of the high-efficiency coding means.

A multiprocessing circuit A100 supplies a luminance to a subtracter A102. In the subtracter A102, the input signal and a preceding signal corresponding to a preceding period from a motion correction circuit A116 are subtracted to generate a difference signal, the preceding signal preceding the signal by the one-frame. The difference signal (which is called an interframe prediction signal or interframe compression signal) is supplied to a DCT circuit A103 and subjected to the DCT process. The signal subjected to the DCT process is supplied to a quantization circuit A109 via a hierarchization circuit A108 and subjected to the quantization process. An output of the quantization circuit A109 is supplied to a variable length coding circuit A110 and inverse DCT circuit A113.

An output of the inverse DCT circuit A113 is added to an output of the motion correction circuit A116 in an adder A114. An output of the adder A114 is supplied to the motion correction circuit A116 via a variable delay circuit A115 and stored therein for one frame period. A motion detection circuit A117 detects a motion vector by use of an output of the variable delay circuit A115 and an output of the multiprocessing circuit A100 so as to effect the motion correction of image information of the motion correction circuit A116. When the motion exceeds a correction range (for example, when a scene change has occurred), the motion detection circuit A117 controls a logic circuit A118 to turn off a switch A119. In this case, a difference is not derived from the subtracter A102, that is, the DCT process in the frame (which is called an intra-frame process or intra-frame compression) is effected. The switch A119 is sometimes turned on by a refresh synchronization signal. This is effected to suppress an error of information at the time of decoding to minimum by subjecting entire information of the input information to the DCT process at an adequate interval. The coding control circuit A112 monitors an output of the variable length coding circuit A110 and controls selective setting of the quantization coefficient or the like to set the transmission amount within a preset range.

The hierarchization circuit A108 separates an output of the DCT circuit A103 into coefficients used for coding in respective hierarchical levels, and supplies the coefficients to the quantization circuit A109. Assuming now that the first hierarchical level is mN×nN and the second hierarchical level is 8×8, then the coefficients are separated according to the sizes thereof. The quantization circuit A109 and coding control circuit A112 effect the processes for the respective hierarchical levels since the coefficients take the hierarchical structure.

FIG. 6A shows the quantization circuit A109 in detail.

The first hierarchical level d(mN×nN) of the DCT coefficient is quantized in the quantizing section by using the quantization coefficient qP1 of the first hierarchical level supplied from the coding control circuit A112. After being quantized, the coefficient supplied to the variable length coding circuit A110 as quantization data qP(mN×nN). The quantization data qP(mN×nN) is subjected to the inverse quantization by an inverse quantization circuit $qp1^{-1}$ is and is used as an inverse quantization value b(mN×nN) for quantization of the second hierarchical level and predictive image calculation.

After the transmission data of the first hierarchical level is subtracted from the second hierarchical level d(8×8) in the subtracter, the second hierarchical level is quantized by using a quantization coefficient qP2 and supplied to the variable length coding circuit A110 as q(8×8). Further, in order to derive b(8×8) from q(8×8), q(8×8) is subjected to the inverse quantization in an inverse quantization circuit $qP2^{-1}$ whose output is added to b(mN×nN) in an adder to construct b(8×8). b(8×8) is used for the predictive image calculation of the second hierarchical level.

A signal of the hierarchical structure is decoded in the digital signal processing system 1G of FIG. 1. Next, the hierarchical decoding means G30 and inverse converting means G40 are explained in detail.

Figure 7:
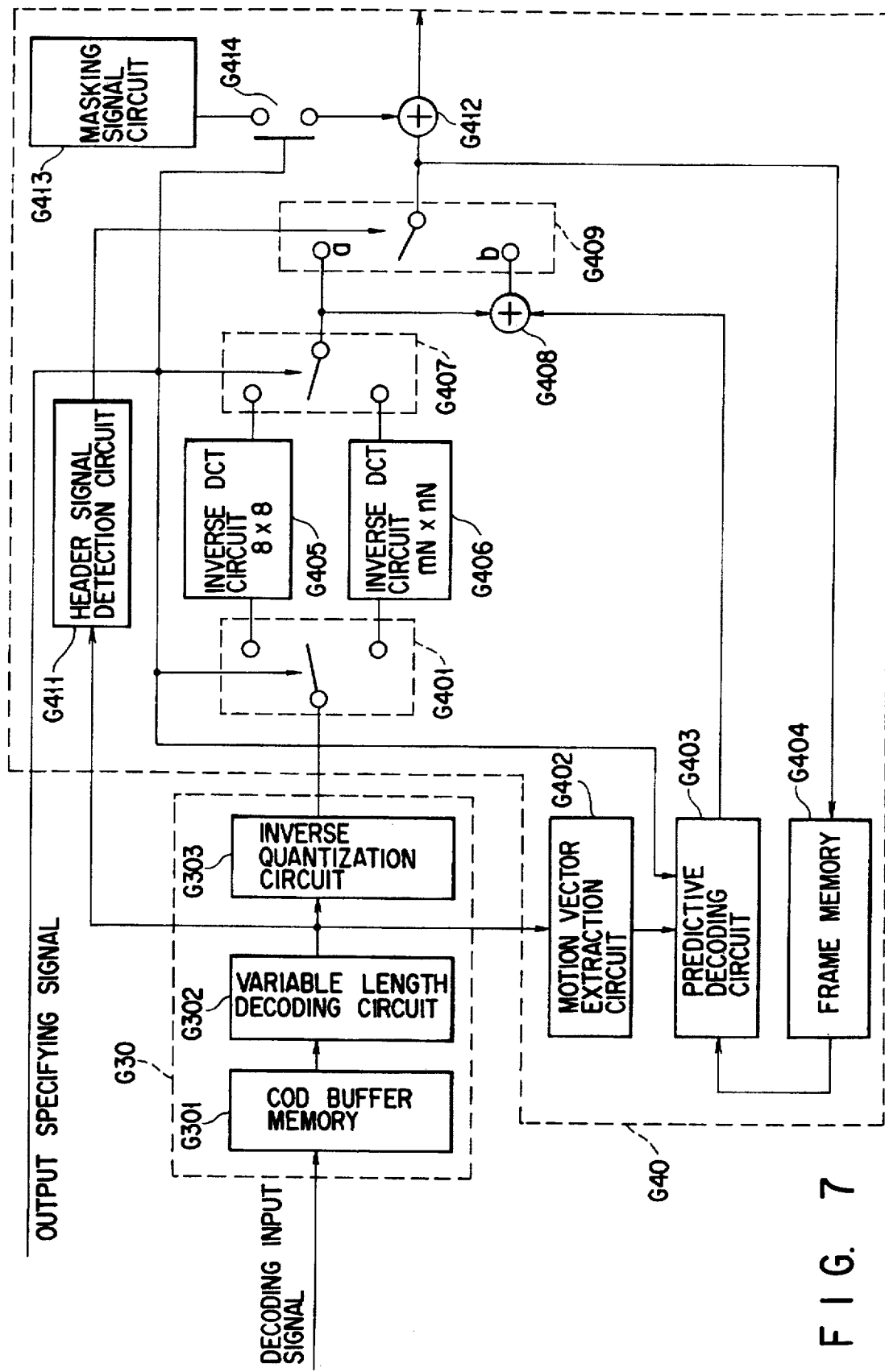
FIG. 7 is a block diagram showing an example of decoding means corresponding to low bit rate coding means of FIG. 5.

FIG. 7 shows an embodiment of the hierarchical decoding means G30.

In the hierarchical decoding means G30, variable length data is temporarily stored in a code buffer memory G301 so as to be successively decoded. A variable length decoding circuit G302 has a function of returning the variable length data to fixed length data. The output is supplied to an inverse quantization circuit G303 and restored based on the hierarchical structure.

FIG. 6B shows the inverse quantization circuit G303 for a coding signal of hierarchical structure. A signal r(mN×nN) of the first hierarchical level of the variable decoding circuit G302 is subjected to the inverse quantization by use of the inverse quantization coefficient $qp1^{-1}$ and derived as s(mN× nN). Likewise, a signal of the second hierarchical level is subjected to the inverse quantization by use of the inverse quantization coefficient $qP2^{-1}$, and added to the DCT coefficient of the first hierarchical level to construct s(8×8).

The thus derived signal is input to a selection circuit G401 of the inverse converting means G40 shown in FIG. 7. The inverse converting means G40 is a circuit for combining the signals of the hierarchical structure into one signal and supplying the combined signal as an HDTV signal or deriving a signal of one hierarchical level (first hierarchical level) as an NTSC signal, and the output state of the circuit is determined by a specifying signal specified by the user. An output of the inverse quantization circuit G303 is input to an inverse DCT circuit (mN×nN) G406 for the first hierarchical level or inverse DCT circuit (8×8) G405 for the second hierarchical level via a switch G401. This portion is described later.

One of the outputs of the inverse DCT circuits G405 and G406 is selected by a switch G407 and input to one of the terminals of a switch G409. The switch G409 takes a different switching position according to whether an input signal is an intra-frame compression signal or interframe compression signal, and selects the switching position a when the input signal is an intra-frame compression signal and selects the switching position b when the input signal is an interframe compression signal.

An output of the variable length decoding circuit G302 is supplied to a header signal detection circuit G411 and motion vector extraction circuit G402 to effect the operation of detecting necessary added data and decoding the data. An output of the switch G409 is input to the interframe prediction decoding circuit G403 via the frame memory G404. The interframe prediction decoding circuit G403 restores a signal of one-frame preceding period according to the motion vector and supplies an output to the adder G408. Therefore, the adder G408 restores an image signal according to the interframe prediction information and interframe difference information. Thus, in the case of the interframe compression, an output of the adder G408 is selected. An output of the switch G409 is supplied to an adder G412. The adder G412 adds an output of the switch G409 to an output of a masking signal generation circuit G413 supplied via a switch G414 which is turned on or off by an output specifying signal.

The concept of the above embodiment is explained.

In the hierarchical coding signal, the first hierarchical level thereof corresponds to an NTSC signal and a combination of the first and second hierarchical levels thereof corresponds to the entire portion of an HDTV signal. It is assumed that when an HDTV signal is input, the signal is subjected to the hierarchization process in the unit of NT= (4×3) blocks for the first hierarchical level and in the unit of HD=(8×8) blocks for the second hierarchical level.

In the reproducing mode, the entire signals are reproduced, and if the entire portions of the signals are included, an inverse DCT circuit corresponding to a desired signal form of NTSC/HDTV is selected according to the output specifying signal so as to output a selected NTSC signal or HDTV signal. That is, when an HDTV signal is output, the hierarchical structure is completely restored to the original state and an inverse DCT circuit corresponding to the block unit HD (=8×8) is used. When an output of NTSC signal is specified, a signal of only the first hierarchical level is used and an inverse DCT circuit corresponding to the block unit NT (=4×3) is used to reduce the pixel number. Thus, the video signal can be output according to the specified NTSC/HDTV signal size.

The reason why an output specifying signal is input to the prediction decoding circuit G403 in addition to an output of the motion vector extraction circuit G402 is that the motion vector reproduced is often constructed by vector information of the original HDTV signal size and is required to be converted to that of the NTSC signal size when an output of the NTSC signal is specified and thus reduction in the vector is required according to the signal size.

Further, two types of inverse DCT circuits are described above, but when an inverse DCT circuit such as a DSP (digital signal processor) having a software function is used, one circuit may be enough to effect the equations described before.

According to the above system, it is possible to select and decode the signal form of a reproduced output according to different types of television receivers on the reproduction output side by previously subjecting an input signal to the hierarchical process and recording the same.

Next, the recording method of recording a signal output from the recording means A20 of FIG. 1 by use of the recording head 1B is explained in detail.

The conventional rotation head device includes an upper rotating cylinder and lower fixed cylinder arranged coaxially with the upper rotating cylinder. Rotating heads are exposed to a gap between the rotating cylinder and the fixed cylinder. The rotating heads are generally arranged in opposite positions of 180° as A head and B head, and alternately define tracks in an oblique direction with respect to the width of the magnetic tape. Thus, a so-called helical scanning type recording/reproducing operation is effected. In this system, the track width (the width of the head) is the same.

However, as described above, the system of this invention effects the coding process by use of the hierarchical structure, a special attention must be paid to the recording/reproducing operation.

Therefore, the system is constructed to include a head means for recording/reproducing a standard (SD) signal (corresponding to the first hierarchical level), a head means for recording/reproducing a high-vision (HD) signal (corresponding to the second hierarchical level), and a rotating cylinder means having the above head means mounted thereon. By use of these means, a recording format is added to a current SD signal recording format to derive an HD signal recording format. Further, when the thus recorded magnetic tape is reproduced by a reproducing device, the HD signal is not received and only the SD signal is reproduced.

Figure 8A:
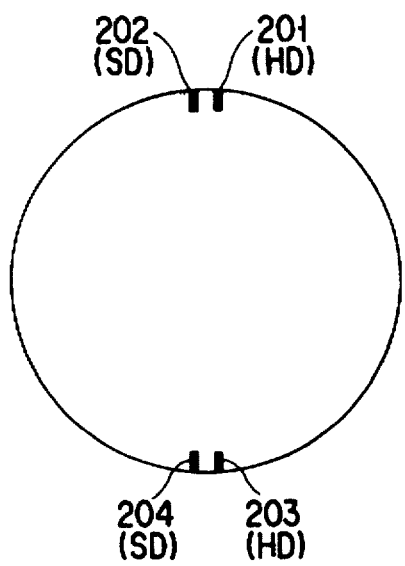
FIGS. 8A, 8B, 8C are diagrams for illustrating a recording head and recording tracks for recording a signal processed according to the hierarchical structure.
Figure 8B:
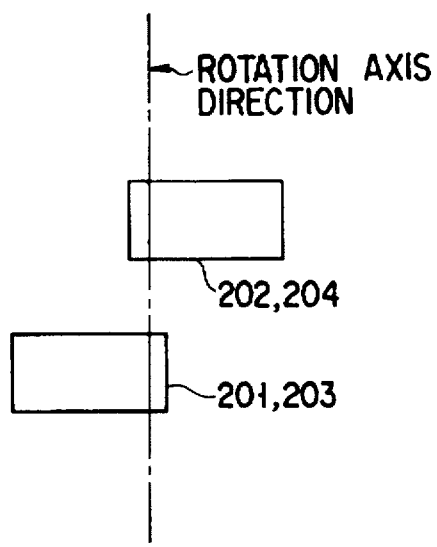

FIG. 8A indicates a rotating cylinder section 1B of the head device associated with the above system. A first SD data recording head 202 and a first HD data recording head 201 which make a pair are mounted on one of two positions of the rotation plate of the rotating cylinder 1B which are separated by 180 from each other and symmetrical with respect to the rotation center and a second HD data recording head 203 and second SD data recording head 204 which make a pair are mounted on the other position. The SD data recording heads 202, 204 and the HD data recording heads 201, 203 are mounted in positions deviated in the rotation axis direction of the head as shown in FIG. 8B. The first SD data recording head 202 and the first HD data recording head 201 are set in the relation of inverted azimuth and the second SD data recording head 204 and the second HD data recording head 203 are also set in the relation of inverted azimuth. Further, the first and second SD data recording heads 202 and 204 are set in the relation of inverted azimuth, and the first and second HD data recording heads 201 and 203 are set in the relation of inverted azimuth. Further, the pitch of a composite track formed by combining two tracks formed by the first SD data recording head 202 and the first HD data recording head 201 (or the pitch of a composite track formed by combining two tracks formed by the second SD data recording head and the second HD data recording head) is set to be equal to the track pitch of SD data in the conventional case. That is, in this system, two tracks for SD data and HD data are formed to correspond to one track of the conventional case.

Figure 8C:
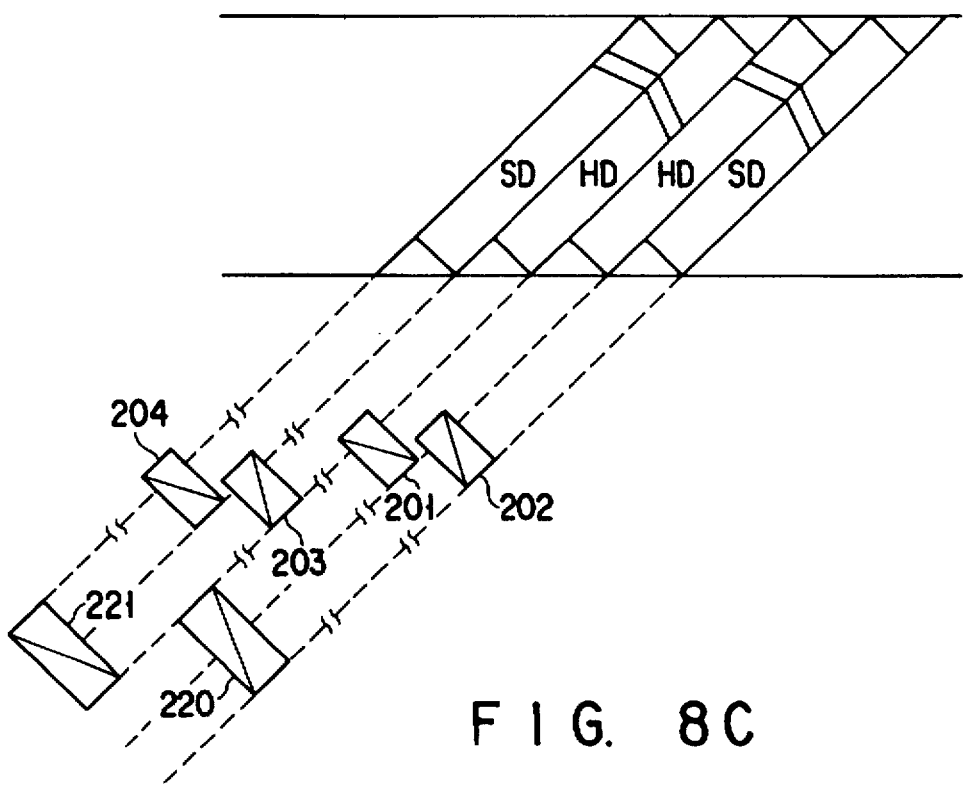

FIG. 8C shows tracks formed on the tape by the above head group. That is, recording tracks for data of SD, HD, HD, SD, SD, HD, - - - in this order are formed and the azimuth of the adjacent tracks is set in the inverted azimuth relation. Further, two tracks correspond to one track of the conventional case.

As a result, SD data can be picked up by the rotating head (heads of the conventional device are denoted by reference numerals 220, 221) and reproduced in a case where the tape recorded in the above-described manner is reproduced by the conventional SD reproducing device exclusively used for SD reproduction. HD data corresponding to the SD data is not contained in the reproduced output or is set at an extremely low level since the two heads are set in the inverted azimuth relation. Thus, even though the HD signal is recorded on the tape, the signal on the tape can be reproduced by use of the conventional SD reproducing device. In a case where a high-vision signal is reproduced in an apparatus having the rotating drum device of FIG. 8A, all of the heads for SD (first hierarchical level) and HD (second hierarchical level) are used. The process for the reproduced output obtained in this case is effected as explained with reference to FIG. 7. In the above embodiment, the SD head and HD head are formed as a pair, but even if SD heads and HD heads are independently mounted on the rotating cylinder, the same track pattern may be formed.

Thus, according to the above embodiment, the SD digital format can be dealt with and a newly added HD format can also be dealt with, and a tape having HD data recorded thereon can be reproduced by use of a reproducing device having only an SD head.

As described above, the system of this invention can record an input signal by effecting the coding process using a special hierarchical structure even when different types of input signals are supplied. Further, the system of this invention is designed to adaptively reproduce a signal even if a recorded signal has a different format.

In order to serve the above purpose, the determination system 1E (FIG. 1) explained below is provided.

First, general VTRs now available are considered. VTRs now widely used are classified into several systems including the VHS system and 8 mm system, but since the tape width, recording format of the systems are different from one another, no compatibility between the systems is attained. Therefore, it is difficult for one conventional recording/reproducing device to cope with the different systems, and even if the recording/reproducing device is designed to cope with the different systems, it is not practical since the cost thereof becomes extremely high.

Digital VTRs (which are hereinafter referred to as DVTRs) having entirely different systems from the above home-use analog VTRs are developed and it is considered that the digital VTRs will be regarded as main VTRs and will supersede the analog VTRs in the future. In this case, a large amount of tapes recorded in the analog format are present and both of the tapes recorded in the analog format and tapes recorded in the digital format are used before the digital VTRs completely supersede the analog VTRs. In order to cope with this condition, it is required for the user to have VTRs of the respective systems, but this imposes a great economical burden on the user, prevents the market of the DVTRS from growing and brings no merits on either the user or the maker. Therefore, it becomes necessary to develop VTRs which can commonly deal with the analog and digital data. However, in this case, it is only necessary to consider the reproduction for the tape recorded in the analog format.

In order to operate the common-use VTR, it is necessary to determine the property of the tape to be reproduced, that is, the system of the tape and the mode in which the tape is recorded. The type of the tape may be determined by detecting the size of the cassette, but recorded signals cannot be determined. It is considered to mount a means such as a magnetic tape for recording information on the cassette half, record information and read out the information so as to determine the recorded signal. However, in this case, an additional circuit must be provided.

As described above, in the conventional VTRs, there is no VTR which can commonly deal with tapes recorded in different systems, and therefore, it is not necessary to determine the recording system at the time of tape reproduction.

In a system of this invention, a determination system capable of determining the recording system of the tape to be reproduced with a simple construction is realized in a VTR which can deal with a plurality of different recording systems.

In order to serve the above purpose, in a helical scanning type magnetic recording/reproducing device for forming recording tracks on the magnetic tape in a direction oblique with respect to the scanning direction, means for detecting the number of tracks covered by the reproducing head when it scans at a preset track angle with respect to the recording track of a desired tape format and means for determining the tape format according to the detected number of tracks are used.

By use of the above means, the tape width and track pitch can be determined, and therefore, the recording system of a tape to be reproduced can be determined with a simple construction by comparing the above information items with corresponding information items of previously registered recording systems.

Figures 9A, 9B:
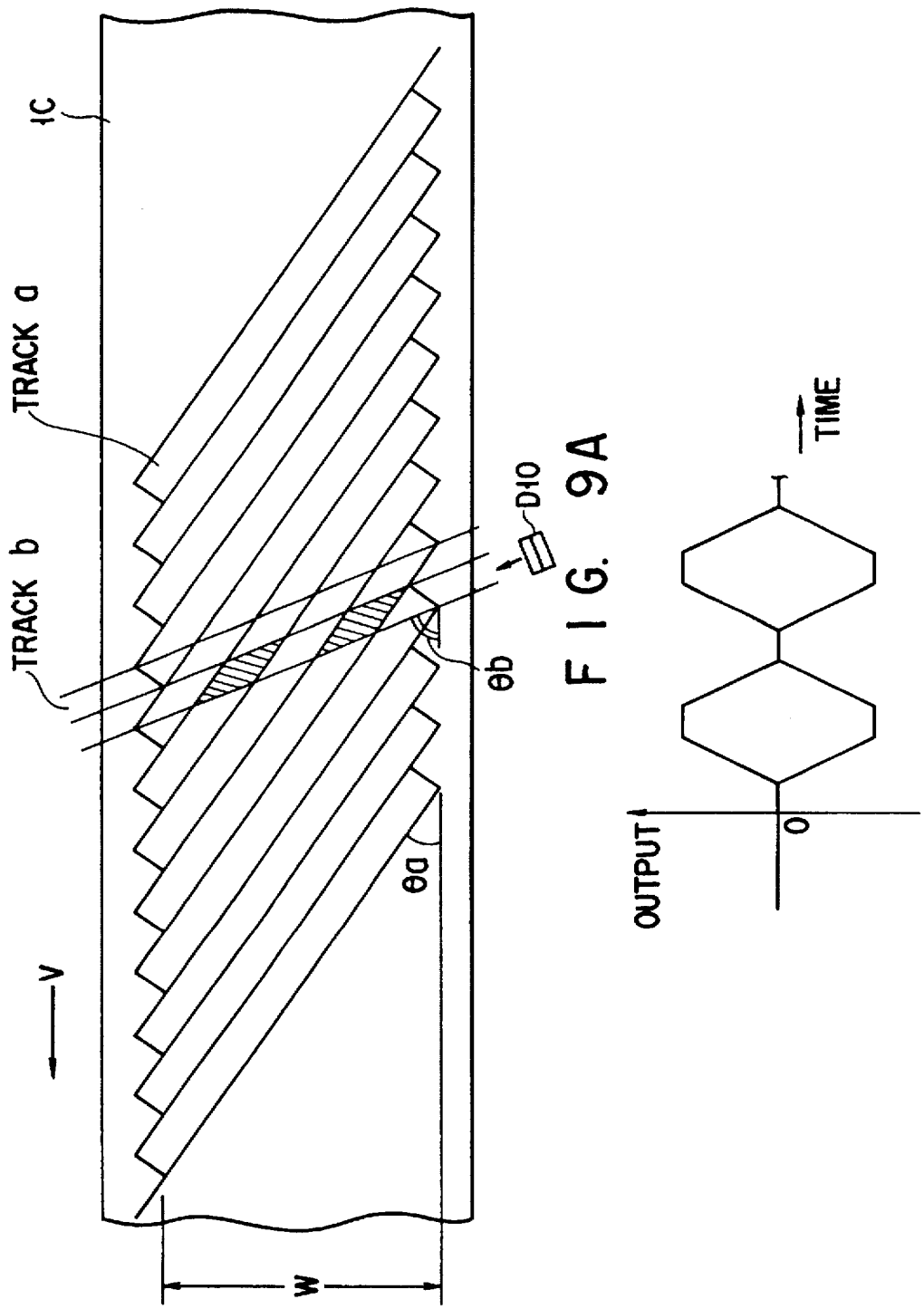
FIGS. 9A, 9B are diagrams for explaining the principle for determining a signal recorded on a tape.

FIG. 9A is a diagram showing the tape format for illustrating the concept of this embodiment. When the tape 1C recorded in the format of track angle $\theta_a$ is reproduced by use of the reproducing head D10 for tracing the tape according to the format of track angle $\theta_b$, the reproduction envelope takes a cross section of beads as shown in FIG. 9B. Such an envelope can be obtained because an output can be derived in or near portions (hatched portions in FIG. 9A) where the azimuth angle of the head coincides with the azimuth angle of the track a when the reproducing head D10 crosses the track a. In this example, since the azimuth angles coincide with each other at two portions (hatched portions), the convex portions (beads) of the envelope appear at two portions. The number of convex portions varies with the track pitch, track length and track angle of the tape to be reproduced when the conditions such as the track angle and speed of the tracing operation by the reproducing head are constant. That is, it varies with the recording systems. Conversely, the number of tracks which the reproducing head crosses and the recording system and mode (standard, long time) of the tape can be determined by setting the initial condition at the time of reproduction to the same condition in each cycle and counting the convex portions of the envelope.

Next, the operation of counting the tracks which the reproducing head crosses is explained. Assuming in FIG. 9A that the tracing speed of the reproducing head is v, then the time t for the reproducing head D10 to cross the entire width w of the video area can be expressed by $t=W/(v \cdot \sin \theta_b)$. Assuming that the tape feeding speed is V and the track pitch of the track a is P, the length X of the tape traveling during the time t can be expressed by $X=V \cdot t$. Since the number N of tracks crossed may be considered as the number of tracks a lying in the length X, N can be expressed by $N=X/(P/\sin \theta_a)=(V \cdot W \cdot \sin \theta_a/(v \cdot P \cdot \sin \theta_b))$. If, in the reproducing mode, v, V, $\theta_b$ are constant, N depends only on the recorded tape format. Therefore, if the number N is previously calculated for the VHS system or 8 mm system whose format is previously known, the system can be determined by comparing the number N with the number of convex portions of the envelope obtained in the reproducing operation (the number of convex portions×2=approx. N).

In the above explanation, the entire width of the video area on the tape to be reproduced is considered, but in practice, in order to avoid the instability of the envelope on the tape entrance and exit sides of the drum device, it is preferable to set a preset portion in the video area and compare the number of tracks crossed in the preset portion with the preset number.

Figure 10A:
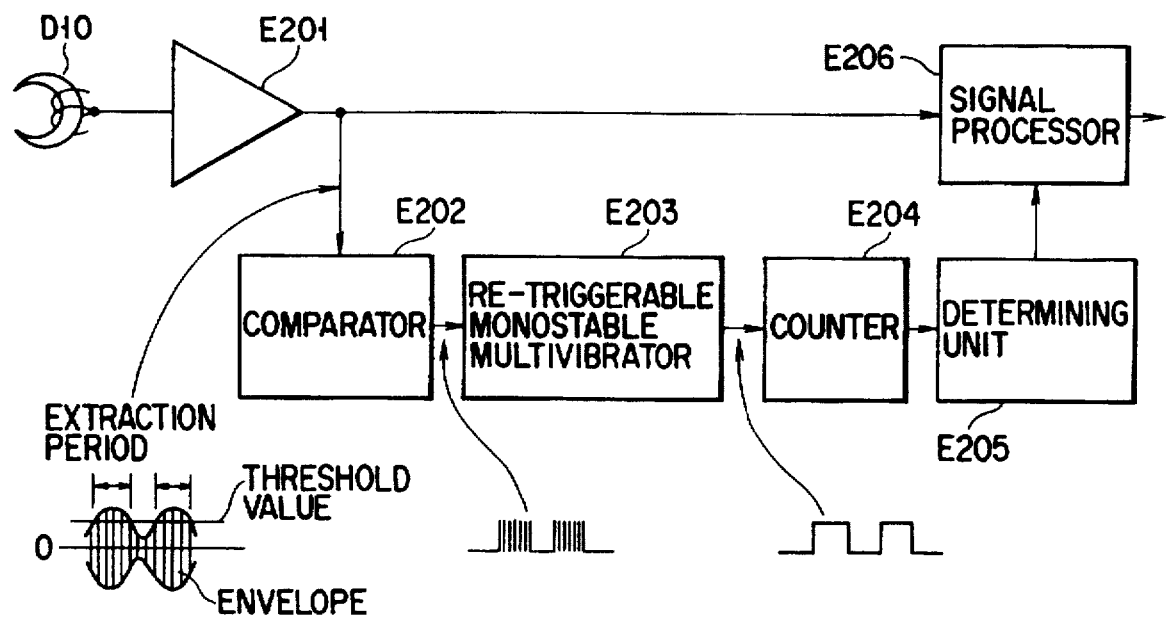
FIGS. 10A, 10B are block diagrams showing an example of a recording signal determining circuit.
Figure 10B:
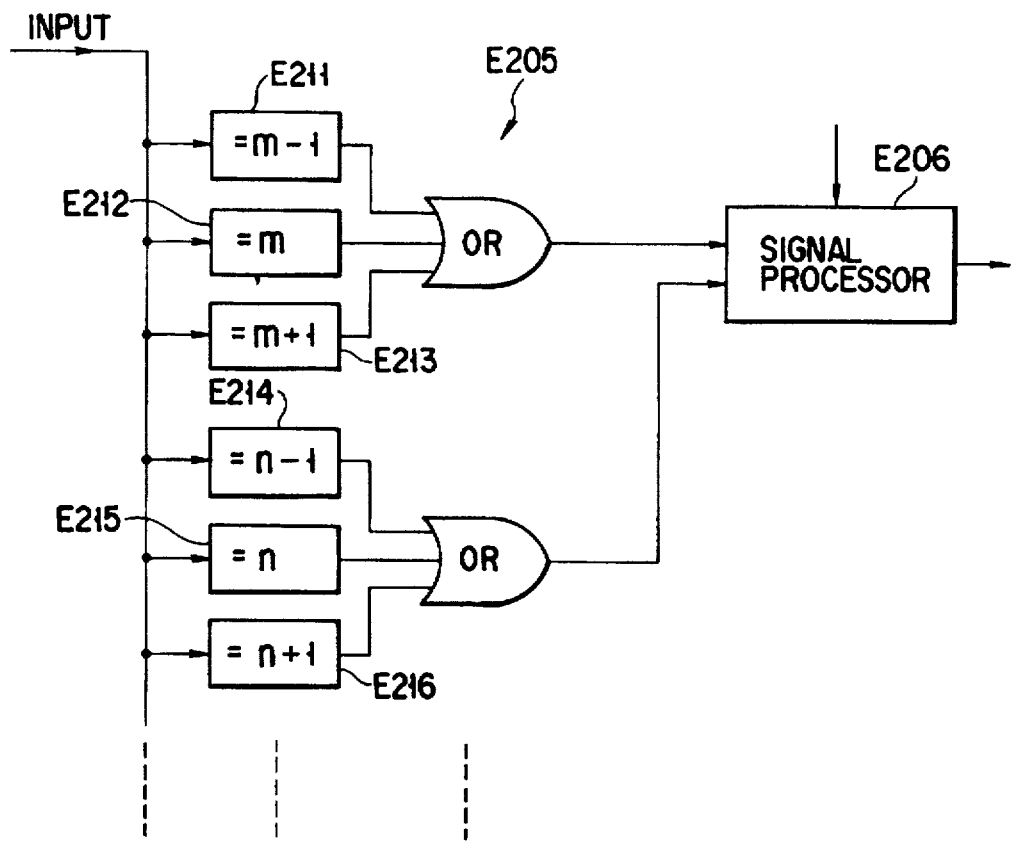

FIG. 10A is a schematic block diagram (corresponding to the signal determinating means E20, control signal creating means E30 in FIG. 1) of this embodiment together with waveforms obtained at preset portions. An output of the reproducing head D10 is input to a comparator E202 after amplified by an amplifier E201, a portion of the envelope which exceeds a threshold value is extracted, and a clean signal of "0" and "1" is created by a re-triggerable monostable multivibrator E203 according the extracted portion. At this stage, a portion of the envelope exceeding the threshold value is output as an "HH" (high) level signal. The signal is input to a counter E204 and counted in a preset period of time, and the count is input to a determining unit E205. The determining unit E205 is constructed as shown in FIG. 10B and has comparators E211 to E216 having various values stored therein. Outputs of the comparators for comparing the input value with a target value and approximately equal values are input to an OR circuit, and an output of the comparator which detects the coincidence of two inputs is supplied as a determination output to a signal processing section E206 via the OR circuit. In this case, if m and n are set to values for the VHS system and 8 mm system, a determination output corresponding to the recording system can be derived. Then, it is only necessary to control the signal processing section E206 to set an adequate mode of the system according to the determination signal. Thus, according to the above embodiment, the recording system of the tape to be reproduced can be determined by use of a simple construction.

The determination system is not limited to the above embodiment.

It is considered that VTRs will use new clock type digital recording formats or signals will be recorded in the analog recording mode and digital recording mode on the magnetic tape of the same cassette.

Therefore, in this embodiment, a flexible recording signal determination system is provided which is relatively simple in construction and which can cope with the new clock type digital recording format and can determine the digital recording mode and analog recording mode when signals are recorded in the analog recording mode and digital recording mode on the cassette of the same shape.

In order to serve the above purpose, there are provided means (comparator, for example) for binary-coding a reproduced signal, means for measuring time from the transition point (L→H, H→L) of the binary-coded signal to the next transition point, means for calculating the number of occurrences of the measured times and accumulating the same, means for specifying the time whose number of occurrences is large according to the result of the accumulation, means for previously storing preset formats and times which correspond to the respective formats and can be estimated to have respective large number of occurrences, means for determining the format which corresponds to the previously specified time based on the contents stored in the above means, and means for determining that the recording format is the analog recording format when the specified time having a large number of occurrences is not detected or a format to be specified is not stored.

That is, the reproduced signal is input to the comparator, a binary-coded output of the comparator is supplied to the means for measuring the time from the transition point of the signal to the next transition point, the measured time is supplied to the means for calculating and accumulating the number of occurrences, and the result of accumulation is input to the means for specifying the time whose number of occurrences is large. Then, an output of the specifying means is input to a circuit for determining the format. The format determining circuit is constructed to refer to the contents of the means for storing the number of occurrences for the preset formats. An output of the means for specifying the time whose number of occurrences is large is input to the analog recording determining means. An output of the analog recording determining means is input to the format determining circuit.

The "means for binary-coding the reproduced signal" has a function of dividing the reproduced signal from a preamplifier or equalizer (EQ) into two values of "HI" and "L" with respect to a threshold value by use of a comparator. The "means for measuring time from the transition point (L→H, H→L) of the binary-coded signal to the next transition point" has a function of sequentially measuring time intervals between the transition points of the binary-coded signal.

The "means for calculating the number of occurrences of the measured times and accumulating the same" has a function of classifying the time intervals between the transition points measured by the above means into groups, counting the number of occurrences for each group, and holding the result of counting. The "means for specifying the time whose number of occurrences is large according to the result of accumulation" has a function of selecting at least one time having a large number of occurrences from the result held by the above means. The "means for previously storing preset formats and times which correspond to the respective formats and can be estimated to have respective large number of occurrences" has a function of previously storing the preset formats and the time intervals (T, 2T, 3T, 4T, - - - ) between the transition points of pulses in the formats. It also has a function of newly storing a time interval between transition points of a pulse in a new format when the new format is additionally provided. The "means for determining the format which corresponds to the previously specified time based on the contents stored in the above means" has a function of determining which one of the stored contents in the above means coincides with the output of the "means for specifying the time whose number of occurrences is large according to the result of accumulation". The "means for determining that the recording format is the analog recording when the specified time having a large number of occurrences is not detected" has a function of determining that the recording format is the analog recording when time having a large number of occurrences is not detected by the "means for specifying the time whose number of occurrences is large according to the result of accumulation".

In the recording signal determining circuit, the reproduced signal is binary-coded by the "means for binary-coding the reproduced signal", time intervals between transition points are sequentially measured by the "means for measuring time from the transition point of the binary-coded signal to the next transition point", the number of occurrences of the respective times are calculated by the "means for calculating the number of occurrences of the measured times and accumulating the same", at least one time having a large number of occurrences is selected by the "means for specifying the time whose number of occurrences is large according to the result of accumulation", and then a corresponding format is selected from the "means for previously storing preset formats and times which correspond to the respective formats and can be estimated to have respective large numbers of occurrences based on the formats" based on the selected time by the "means for determining the format which corresponds to the previously specified time based on the contents stored in the above means". When time having a large number of occurrences is not detected, the recording format is determined to be the analog recording by the "means for determining that the recording format is the analog recording when time having a large number of occurrences is not detected" and the recording format is input to the "means for determining the format which corresponds to the previously specified time based on the stored contents".

As described above, in the recording signal determining circuit, various formats can be determined since the reproduced signal is binary-coded by utilizing the fact that the digital signal contains only pulses of specified widths, time intervals between the transition points are measured, times whose numbers of occurrences are large, and formats are determined based on the numbers of occurrences of times of previously stored various digital formats. Further, since the format is determined to be the analog recording when times having large numbers of occurrences are not detected, the digital recording or analog recording can be determined even when signals are recorded in the analog recording mode and digital recording mode on the cassette of the same shape. Further, when a new digital format is provided, the new format can be flexibly dealt with by storing the new format in addition to the previously stored contents.

Next, the embodiment is explained in detail.

Figure 12A:
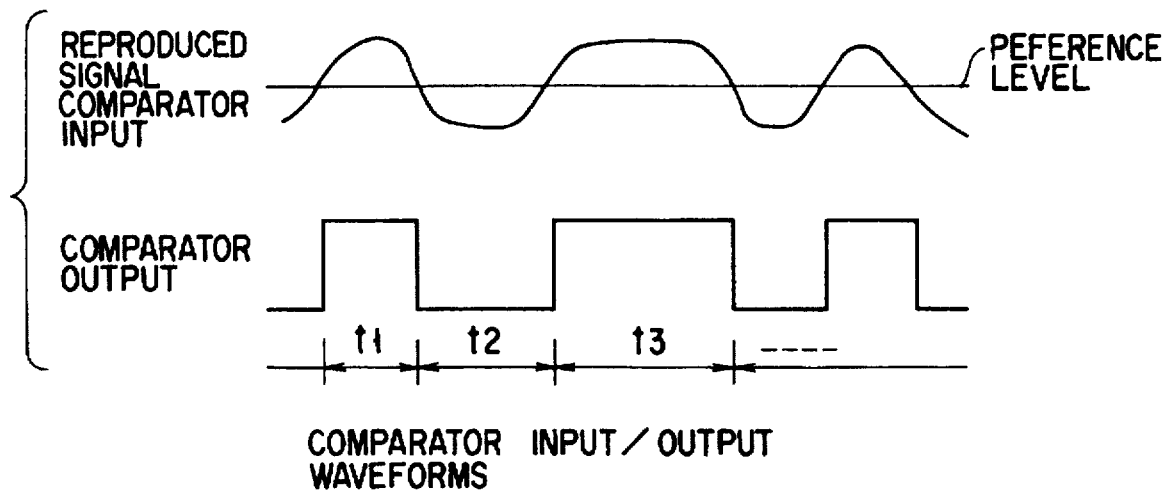
FIGS. 12A, 12B are a signal waveform diagram for illustrating the operation of the circuit shown in FIG. 11 and a block diagram specifically showing an example of a number-of-occurrences calculation/accumulation circuit of FIG. 11.
Figure 12B:
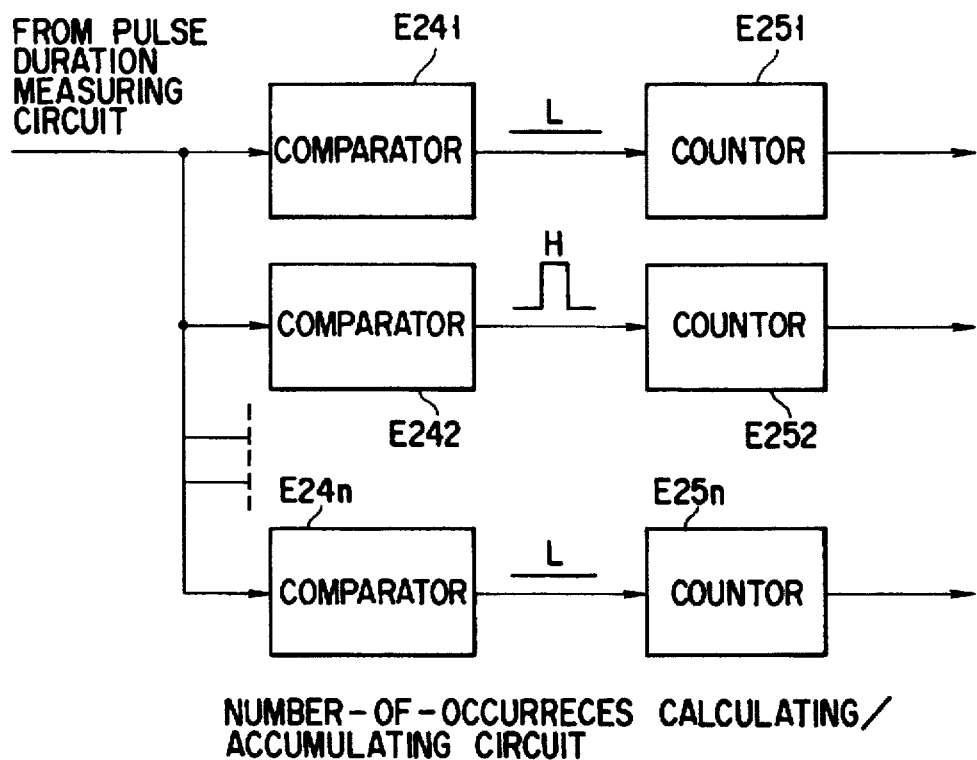

FIG. 11 is a block diagram of the recording signal determining means in this embodiment. FIG. 12A is a diagram showing waveforms at the input and output terminals of the comparator. A reproduced signal from the rotation head is supplied to a comparator E231 via a pre-amplifier and equalization circuit and binary-coded. The binary-coded comparator output is input to a pulse interval measuring circuit E232. The waveforms of input and output signals obtained at this time are shown in FIG. 12A. In the pulse interval measuring circuit E232, the pulse widths (t1, t2, t3, - - - ) of the comparator output waveform are sequentially measured. An output of the pulse interval measuring circuit E232 is input to a number-of-occurrences calculating/accumulating circuit E233. In FIG. 12B, an example of the number-of-occurrences calculating/accumulating circuit E233 is shown. Assume that an output of the pulse interval measuring circuit E232 is n-bit digital data. An output of the pulse interval measuring circuit E232 is input to comparators E241 to E24n which are divided for respective time intervals and a rank to which the output belongs is determined. For example, in the comparator E241, only t satisfying the expression $0 \leq t \leq a$ (or $0 < t < a$) is detected. In the comparator E242, only t satisfying the expression $a \leq t \leq b$ is detected. Likewise, in each of the remaining comparators, only t satisfying the corresponding expression is detected. Then, data starting from ti is sequentially input to the comparators. Assume now that $a < t1 < b$. In this case, since the input does not satisfy the input condition of the comparator E241, no output is obtained. Since the input satisfies the input condition of the comparator E242, a pulse is output from the comparator E242 as shown in FIG. 12B. Pulses output from the comparators are input to succeeding stage counters E251 to E25n. A pulse output from the comparator E242 is input to the counter E252. While t1, t2, t3, - - - and data are input to the comparators, pulses from the comparators whose input conditions are satisfied are input to the respective succeeding stage counters. In the counters E251 to E25n, input pulses are counted. Thus, the counts of the respective counters will become different from one another according to the number of occurrences. The counts are input to a next stage number-of-occurrences specifying circuit E234. In the number-of-occurrences specifying circuit E234, some of the counts which are large are selected and supplied to a format determination circuit E236. When there is no significant difference between the counts, the counts are supplied to an analog recording determination circuit E235, and the analog recording determination circuit E235 determines the input as an analog signal and supplies a control signal to a format determination circuit E236 if the counts are detected to be time-sequentially set. The format determination circuit E236 has a function of comparing the input counts with formats and pulse widths (time intervals) having a large number of occurrences previously stored in the preset format storing circuit E238 and memory E237 and selecting a corresponding one of the formats.

A determination result which indicates the type of the selected format in the case of the digital recording and which indicates the analog recording in the case of analog recording is output from the format determination circuit E236.

In this embodiment, since the stored contents are held in the memory E237, a new format can be flexibly dealt with without changing the hardware by additionally storing the pulse width (time interval) having the large number of occurrences of the new format even if the new format is additionally provided.

As described above, according to the above signal determining means, various digital formats can be dealt with and a newly added format can also be dealt with. Further, even when signals are recorded in the digital recording mode and analog recording mode on the cassette of the same size, the digital recording and analog recording can be determined.

As described above, according to this system, either the analog signal or the digital signal may be used as the reproduced signal. Therefore, it becomes necessary to prepare a reproducing means capable of reproducing either an analog signal or a digital signal. Conventionally, in order to deal with the analog signal and digital signal, the analog signal processing system and digital signal processing system are independently provided in a parallel arrangement. In order to make the circuit construction simple, it is preferable to commonly use as many portions of the systems as possible.

Therefore, in this embodiment, a reproduction processing means designed to have a large portion which can be commonly used is provided to reproduce an analog signal and digital signal.

In order to process color signals, a phase shifting (PS) circuit is necessary in the VHS system. In this case, the phase shifting circuit may also be designed to be commonly used for processing the analog signal and digital signal.

In FIG. 1, the analog processing system and digital processing system are shown as if they are completely independent circuits, portions of the digital reproduction signal processing means G10 and the analog reproduction signal processing means F10 can be commonly used as explained below.

Figure 13A:
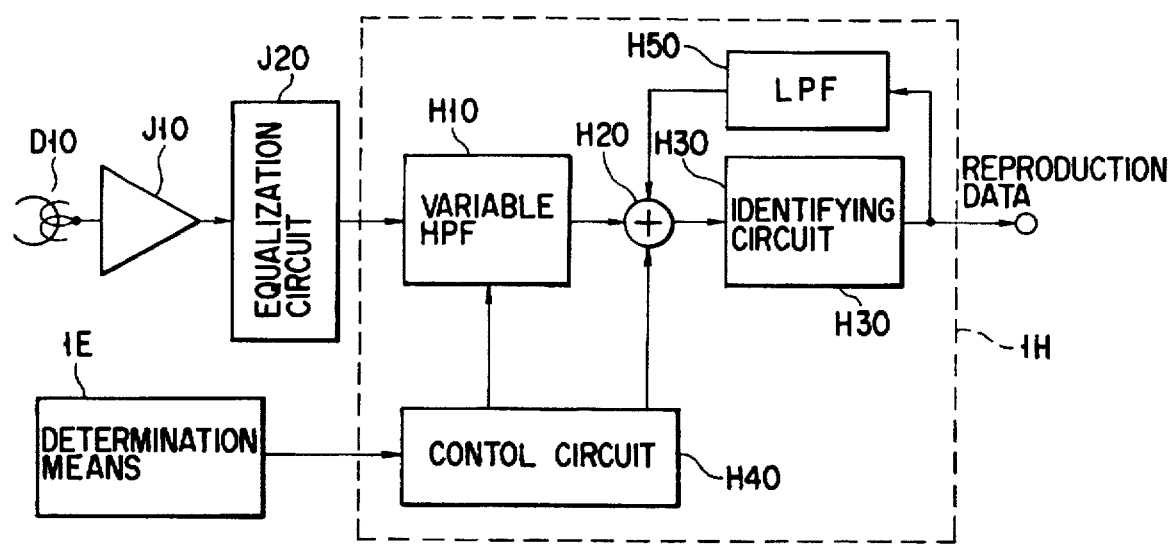
FIGS. 13A, 13B, 13C are diagrams showing an example of a common reproducing circuit of the analog signal processing system and digital signal processing system.
Figure 15A:
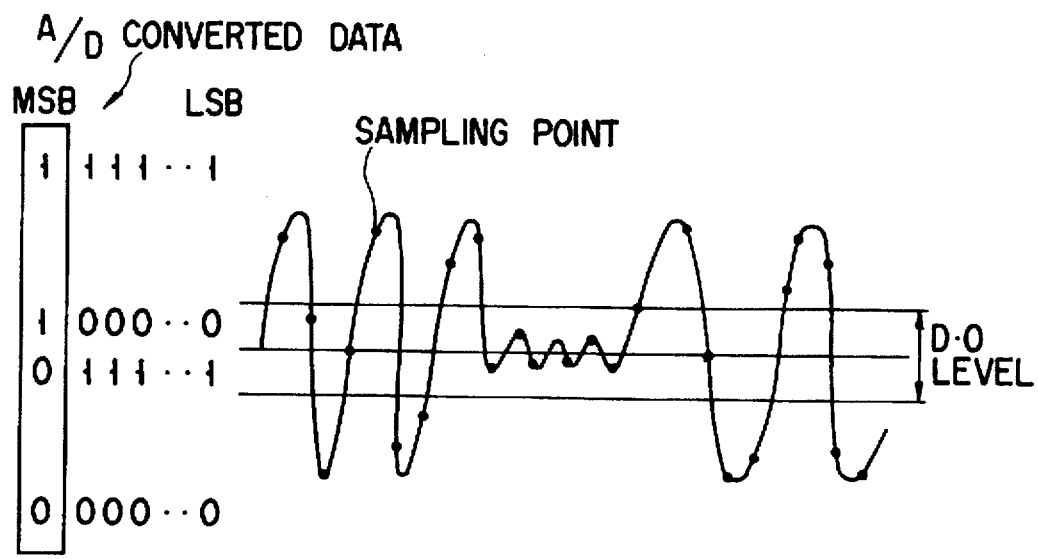
FIGS. 15A, 15B, 15, are timing diagrams for illustrating the operations of the circuits shown in FIGS. 14A, 14B.
Figure 15B:
Figure 15C:

FIG. 13 is a block diagram of a first common reproducing circuit. FIG. 14A is a block diagram of a second common reproducing circuit. FIG. 14B is a block diagram of a third common reproducing circuit. FIGS. 15A to 15C are diagrams showing the relation between the input signal level to an A/D converter explained later and digital data obtained after A/D conversion and showing output signals of the comparator and drop-out (D.O) determination circuit.

Next, an example of the first reproducing circuit of FIG. 13 is explained. A signal picked up by the reproducing head D10 is supplied to an equalizing circuit J20 via a pre-amplifier J10 so as to be equalized, and then input to a common reproducing circuit 1H. The common reproducing circuit 1H includes a variable highpass filter (variable HPF) H10, an adder H20 connected to receive an output of the variable HPF, and identifying circuit H30 connected to receive an output of the adder H20. The characteristic of the variable HPF H10 and the ON-OFF state of the adder H20 are controlled by a control circuit H40. A low-pass filter H50 which supplies an output of the identifying circuit H30 to the adder H20 is used to reproduce a D.C. component.

First, a case wherein a digital signal is reproduced is explained. If the digital recording is determined by the determination means 1E described before, the control circuit H40 causes the adder H20 to effect the adding operation and sets the cut-off frequency of the variable HPF (H10) to such a value for permitting reproduction of the D.C. component of the determined format. An output of the equalization circuit 120 is input to the variable HPF (H10). After the low frequency component is cut off by the variable HPF (H10), an output of the HPF is added to the low frequency component of an output of the LPF (H50) having the same cut-off frequency in an adder H20 which in turn supplies an output to the identifying circuit H30. A clock is extracted from the input signal in the identifying circuit H30 which in turn produces reproduced data. The reproduced data is supplied to a next-stage circuit and to the LPF (H50) which extracts a low frequency component of the data and supplies the same to the adder H20.

Figure 13B:
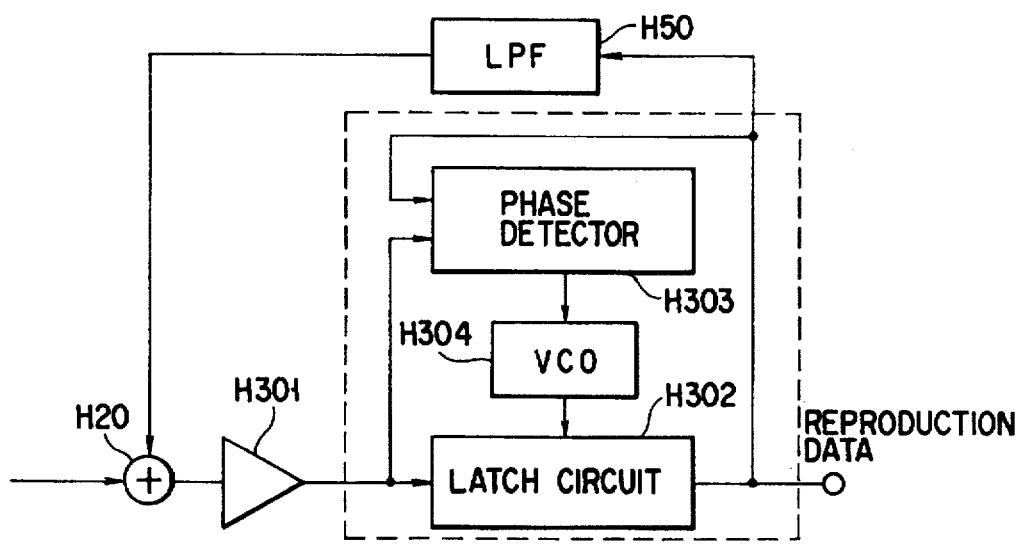

FIG. 13B is one example of the identification circuit H30. A reproduction signal from the adder H20 is input to a comparator H301. The input signal is binary-coded in the comparator H301 whose output is supplied to a latch circuit H302 and phase detector H303. In the latch circuit H302, an input signal is latched in response to an output of a voltage-controlled oscillator (VCO) (H304) used as a clock and reproduced data is output. The reproduced data is also supplied to the LPF (H50). In the phase detector H303, a difference voltage is derived from a phase difference between outputs of the latch circuit H302 and comparator H301 and used to control the oscillation frequency of the VCO (H304). An output of the VCO (H304) is supplied to the latch circuit H302. Thus, digital reproduced data can be obtained.

Next, when the analog recording is determined by the determination means 1E in a case wherein an analog signal is reproduced, the cut-off frequency of the variable HPF (H10) is raised to such a frequency as to permit the low frequency color signal to be eliminated by the control circuit H40 which has received an output of the determination means 1E in the case of a system for processing only the luminance (Y) signal in the later stage. In the case of a system for processing both of the luminance signal and color signal (Y C), the cut-off frequency is lowered to such a frequency as to permit the low frequency color signal to sufficiently pass. In this case, the adder H20 is deactivated so as to permit an output of the variable HPF to be input to the identification circuit as H30 it is. Since only the Y signal is processed in a case wherein the system is used together with a second embodiment as will be described later, the cut-off frequency may be raised to remove the color signal.

With the above construction, in the operation of reproducing a digital signal, the cut-off frequency of the variable HPF is set to a frequency which is the same as that of the LPF and is suitable for D.C. component reproduction, the adder H20 is activated, and thus it acts as a digital signal processing circuit. In the operation of reproducing analog signal, the adder H20 is de-activated so as to supply a Y signal of both of the Y and C signals to the identification circuit H30, and thus it acts as an analog signal processing circuit.

Figure 13C:
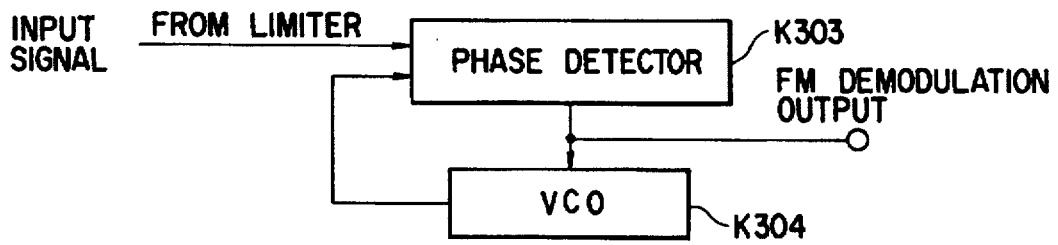

FIG. 13C shows an example of an FM demodulation circuit using the PLL demodulation system. A reproduction signal from a limiter and an output of a VCO (K304) are input to a phase detector K303. The phase detector K303 derives a phase difference between the signal from the limiter and the VCO output and supplies a difference voltage to the VCO K304 to control the oscillation frequency of the VCO K304. Since the difference voltage coincides with the FM-modulated signal in the PLL demodulation, the difference voltage can be used as a demodulated output. Thus, the luminance signal is returned to the baseband in the FM demodulation circuit and supplied to a next stage circuit.

The identification circuit H30 is constructed to partly include the above FM demodulation circuit and can be effectively used as described in the following embodiment.

Next, an example of a second common reproducing circuit shown in FIG. 14A is described. The common circuit is a circuit commonly used in the identification circuit portion of the former embodiment. Therefore, portions of FIG. 13 are denoted by the same reference numerals.

First, a case wherein a digital signal is reproduced is explained. When the digital recording is determined by the determination means 1E, the control circuit H40 selects an output of the latch circuit H302 as an input of the phase detector H303 by the switch H305. Further, the free-running frequency of he VCO (H304) is set according to the reproduction bit rate of the determined format. An output of the equalizing circuit or adder is input to the comparator H301 and binary-coded. An output of the comparator H301 is input to the latch circuit H302 and phase detector H303. An output of the latch circuit H302 is derived as reproduction data and input to the phase detector H303 via the switch H305. A difference voltage derived from a phase difference between the input signals is supplied from the phase detector H303 to the VCO (H304).

At the time of analog signal reproduction, the control circuit H40 having received an output of the determination means 1E selects an output of the VCO (H304) as an input to the phase detector H303 by the switch H305. When the output of the VCO (H304) is supplied as the input to the phase detector H303, the identification circuit H30 acts as a PLL demodulation circuit. Further, the free-running frequency of the VCO (H304) is controlled according to the Y-FM signal of the determined analog format.

Thus, by controlling the switch, the circuit functions as an identification circuit when a digital signal is input and functions as an demodulation circuit when an analog signal is input, thus portions of the circuit can be commonly used.

Next, an example of the third common reproducing circuit is explained with reference to FIG. 14B. The common circuit is obtained by adding a drop-out detection function to the second common circuit. In this circuit, a signal from the equalization circuit of adder is input to an analog/digital (A/D) converter H310 and converted into a digital form. The MSB of an output of the A/D converter H310 is supplied to a latch circuit H302. Further, the MSB to LSB are input to a comparator H311. The signal condition is detected by the comparator H311 and the detection output thereof is input to a drop-out determining circuit H312 which is used to determine the drop-out.

First, a case wherein a digital signal is reproduced is explained. The explanation for the same portion in the second embodiment is omitted. An output of the equalization circuit or adder is input to the A/D converter H310 and converted into digital data. The MSB of an output of the A/D converter H310 is input to the latch circuit H302 and phase detector H303. The relation between the envelope waveform obtained at this time and digital data obtained after A/D conversion is shown in FIG. 15A. As is clearly understood from FIG. 15A, the MSB of the A/D converter H310 is used as binary-coded data instead of binary-coding the same by use of the comparator. Further, an output of the A/D converter H310 is input to the comparator H311 which in turn detects a sampling value of the envelope smaller than a preset amplitude as shown in FIGS. 15A and 15B. However, a small sampling value may be taken at some sampling timings even when the envelope is large. Therefore, an output of the comparator H311 is input to the drop-out determining circuit H312 and the drop-out is determined only when sampling values smaller than a preset amplitude are detected for a preset period of time. The waveforms obtained at this time are shown in FIGS. 15B and 15C.

Since the digital VTR circuit includes a large number of multipliers in addition to the circuits described above, they can be used as constituents for various filters necessary for the signal processing of the analog VTR. Particularly, since the number of bits of the operation unit for quantization/ inverse quantization is large and the precision thereof is high, it can be used in a portion which requires a high precision such as an audio FM demodulation circuit. Further, since the DVTR has a memory of large capacity, it can be used as a TBC (time base correction) circuit or noise reduction circuit by using the memory.

Next, a method of converting the phase shifting (PS) circuit into a common circuit form is explained.

Figure 16:
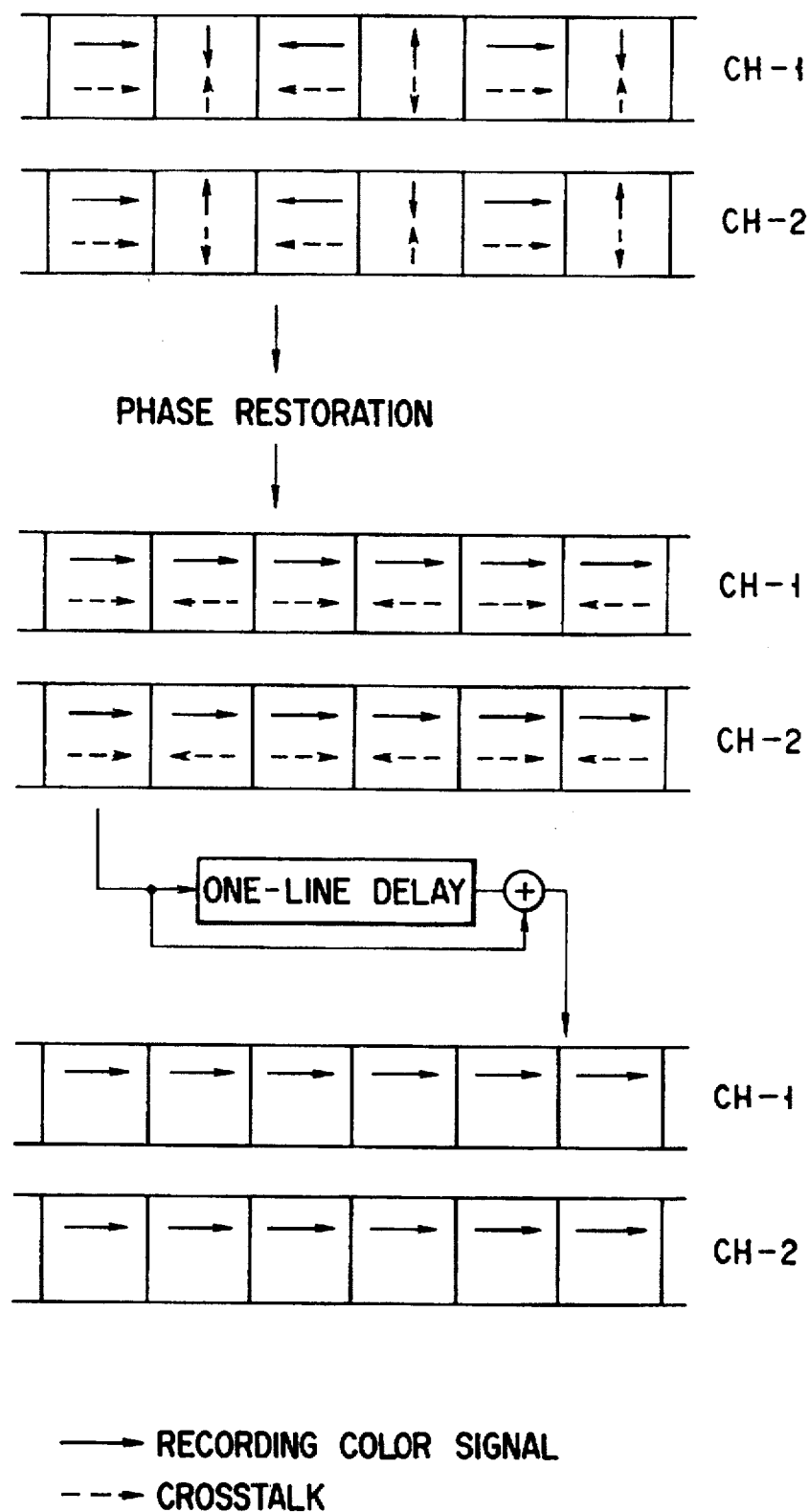
FIG. 16 is a diagram for illustrating the principle of the operation of a phase shifting circuit.

In the VTR of VHS system, a color signal is recorded after advancing the phase thereof by 90° for every 1H (H: horizontal period) on the track of channel (CH-1) in the recording operation and is recorded after delaying the phase thereof by 90° for every 1H on the track of channel (CH-2). In the reproducing mode, the phase of the signal is restored and added to a component thereof delayed by 1H, the crosstalk components mixed therein in the reproducing operation can cancel each other and can be removed as shown in FIG. 16. In FIG. 16, an arrow of solid line indicates an actual signal and an arrow of broken lines indicates a crosstalk component. The direction of the arrow indicates the phase. Since a large portion of a PS circuit for realizing the above function including a computer is an analog circuit, it is difficult to form the circuit which can be commonly used with the digital VTR.

In this embodiment, a PS circuit in which a circuit of the digital signal processing system can be commonly used with a circuit of the analog signal processing system is provided.

Figure 18:
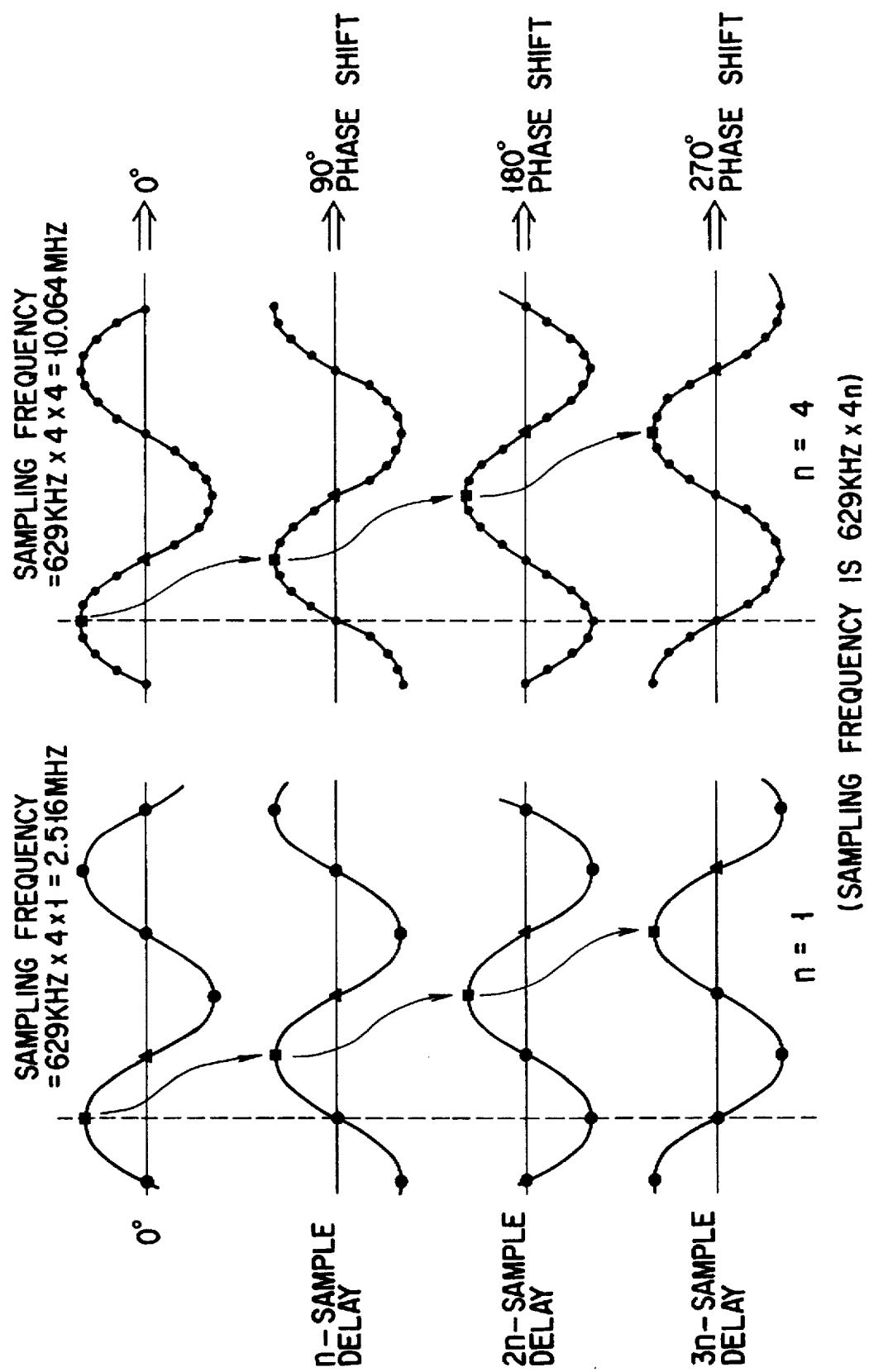
FIG. 18 is a signal waveform diagram for illustrating the operation of the phase shifting circuit of FIG. 17.

FIG. 17 is a block diagram of a first PS circuit L10 and FIG. 18 shows signal waveforms in respective portions of a phase shifting circuit of the first PS circuit.

An output of the equalization circuit or adder is input to an A/D converter L101 and converted into digital data after only the color signal is extracted by an LPF. At this time, the sampling frequency of the A/D converter L101 is defined by a clock supplied from an oscillator L102 whose oscillation frequency is 4 n times the frequency of the low-frequency conversion color signal. Therefore, the sampling points include points of 0°, 90°, 180° and 270° of the low-frequency conversion color signal. Sampling data is passed through three n-sample delay circuits L103, L104, L105 by 0 to 3 times, but it is possible to pass the signal through n-, 2n- and 3n-delay circuits by one time. As is clearly seen from FIG. 18, outputs of the delay circuits L103, L104, L105 are signals phase shifted by 90°, 180°, 270° with respect to the original signal and are selected by a switch L106. The switch L106 selects data at a sampling point whose phase is advanced (or delayed) by 90° for every 1H by a delay selection circuit L107.

By controlling the switch as described above, an output signal of the switch is obtained as a signal whose phase is restored. By adding the signal to an output of a 1H delay circuit L108 in an adder L109, only crosstalk components are cancelled. In FIG. 18, an output waveform of the phase shifting circuit and sampling data taken in cases where n=1 and n=4 are shown.

Figure 19:
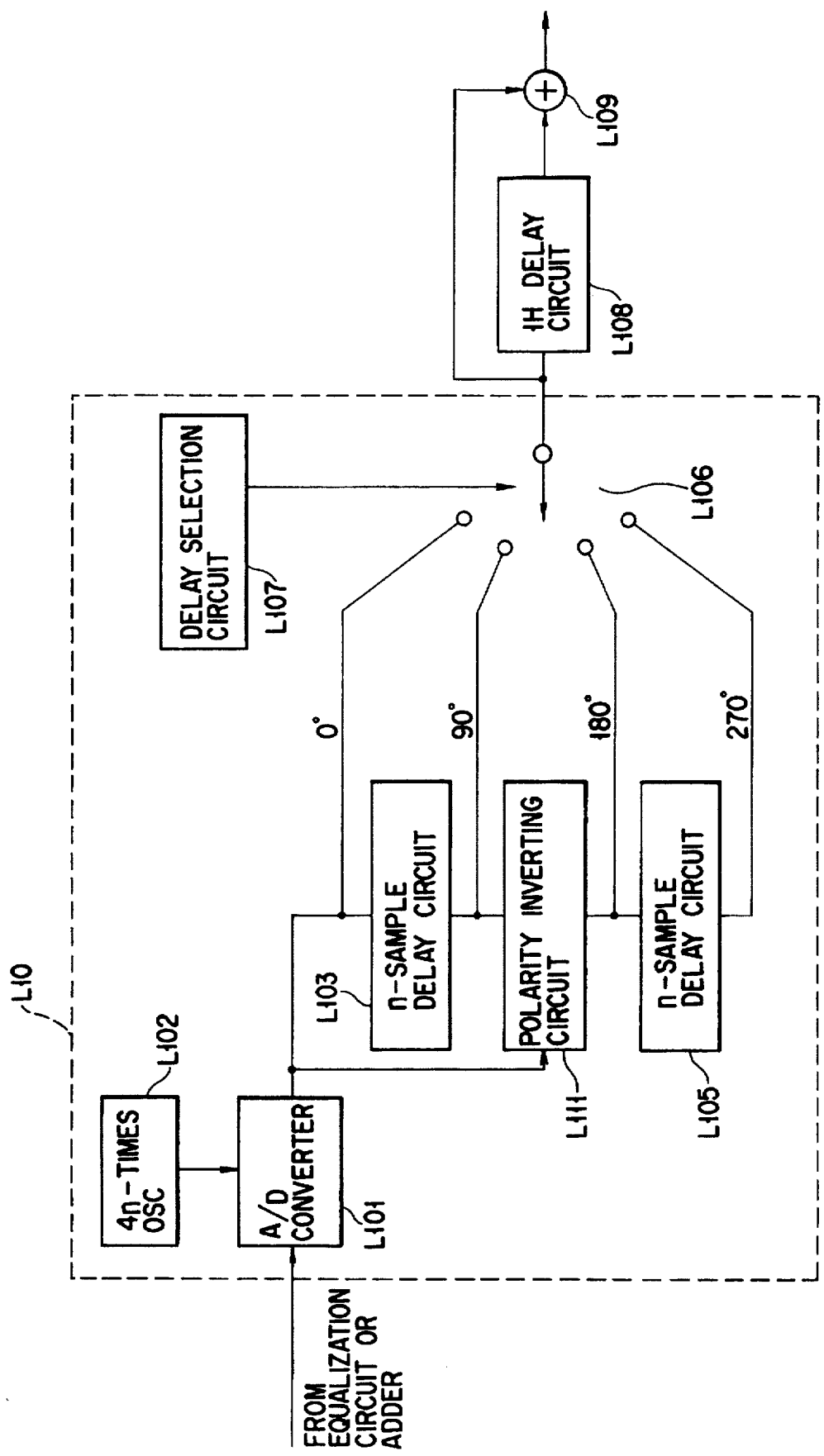
FIG. 19 is a block diagram showing another example of the phase shifting circuit.

The second PS circuit L20 is explained with reference to FIG. 19. In this case, only the portions different from those of the first PS circuit L10 are explained. FIG. 20 shows an output signal waveform of a phase shifting circuit of the second PS circuit L20.

In the first PS circuit L10, the three n-sample delay circuits are used to derive signals which are phase shifted by 0°, 90°, 180°, 270°. In contrast, in the second PS circuit L20, a signal which has an inverted sign and the same absolute value is created from the sampling data by using a polarity inverting circuit L111 and thus a signal which is phase shifted by 180° is obtained. Then, an n-sample delay circuit L105 is used to phase shift the signal of the circuit L111 by 90°, thus making it possible to derive signals which are phase shifted by 90°, 180°, 90°+180°=270°. In this example, a 270° phase-shifted signal is created by inverting a signal and then passing the signal through the n-sample delay circuit, it is also possible to invert the signal after passing the signal through the n-sample delay circuit.

As described above, since the sampling frequency is set to 4n (n is a natural number) times the frequency of the low frequency color signal in the above PS circuit and data of 0°, 90°, 180°, 270° is derived, signals phase shifted by 90°, 180°, 270° can be obtained by simply delaying the sampling data by a preset number or inverting the sampling data.

A time base correction (TBC) circuit is incorporated into the above system. The TBC circuit is used to compensate for a variation in the time base of a signal reproduced by the VTR and is important to derive a reproduced signal with high fidelity.

In this embodiment, when the time base is corrected, a memory is used, a reproduced signal is temporarily stored into the memory, and then the signal is read out by use of a clock having the correct time base. In this case, as a clock used for writing the reproduced signal into the memory, a write-in clock which follows the time base variation of the reproduced signal is necessary. In the prior art, the write-in clock is derived from a clock generator for separating the synchronization signal of the reproduced video signal and generating a clock which is in synchronism with the above synchronization signal. However, the reproduced synchronization signal is low in reliability when the drop-out occurs or the S/N ratio is low, and it may cause the phase of the output of the clock generator to fluctuate.

In order to solve the above problem, in this embodiment, a reproduction carrier used for reproducing the PCM audio signal recorded in the digital form is effectively used. In recent years, as the recording format of the VTR, an S-VHS format is used. The format is used to effect the digital audio recording by the deep bias recording system which is simply called S-PCM. The above system is a 2-layer recording system for recording a video signal and audio signal and a stereo HIFI signal (FM audio signal) and digital audio signal (PCM audio signal) are recorded in a multiplex form in the deep portion of a tape. As a disclosed reference, an article of DENPA SHTN BUN dated the ninth of Jan., 1990 is provided. This is realized by use of an FM audio signal recording/reproducing head.

The PCM audio signal is based on the bias recording format using a bias frequency of 11 MHz. An offset-QDPSK system (which is one type of digital phase modulation system) is used for modulation.

Basically, the PSK (Phase Shift Keying) system is used and a PCM signal of one bit is transmitted by use of orthogonally phased carriers (0-phase and π-phase). A modified QPSK system is a system for modulating an input 2-bit signal into four phases (0, π/2, π, 3π/2). Further, the offset system is a system for shifting the phases of the modulation signal by 90° in order to eliminate 180° deviation which is the defect of the QPSK system.

In the circuit operation, it is necessary to understand the concept of the difference calculation.

In the phase modulation, it is impossible to detect the absolute phase set at the time of transmission on the receiver side if a reference phase is not transmitted at the same time. That is, in the VTR, if a signal used as a reference phase is not recorded together with a modulated signal, the absolute phase cannot be detected at the time of reproduction. Therefore, a differential phase modulation system for recording information by the amount of variation in the phase and transmitting information by inversely converting at the time of reproduction is used. This is an offset-QDPSK system of PCM audio recording system. In this system, the addition is effected at the recording time and the subtraction is effected at the reproducing time.

At the recording time: addition: $Y_n = X_n + Y_{n-1}$

At the reproducing time: subtraction: $X_n = Y_n - Y_{n-1}$

In this system, actually recorded data series may be different for some initial values, but since the relative phase relation is kept unchanged, data can be reproduced without detecting the absolute phase. Further, even if an error occurs at the reproducing time, succeeding data can be correctly reproduced since data is reproduced based on the relative phase relation between data items which are adjacent on the time base.

When a signal phase-modulated as described above is reproduced, the carrier reproduction for reproducing the carrier becomes necessary. Then, the demodulation detection is effected by use of the reproduced carrier.

If the reproduced carrier is a signal reproduced by the VTR, the time base thereof will be varied according to the audio signal. The time base variation may be associated with the time base variation of the video signal since the audio signal and video signal are recorded on the same track. This embodiment utilizes this idea.

Therefore, in this system, the image quality improving means of the analog signal processing system includes a frequency multiplier circuit (PLL circuit) receiving a determination clock or carrier clock reproduced in the audio signal reproducing process and multiplying the clock by N, a delay circuit for delaying a signal by time corresponding to a gap between the video head and the audio head, and a TBC circuit for writing a reproduced signal using the output clock as a write-in clock and reproducing the signal by using a reference signal.

By using an output of the PLL circuit having a frequency N times that of the reproduced carrier signal, a signal having a frequency which is high enough to convert the reproduced RF signal into digital form and following the jitter (time base variation) of the VTR can be derived. Further, the time base variation can be compensated for by using a clock reproduced in a digital signal form of large S/N containing the time base variation. Contents of fine adjustment or compensation are a time difference caused by the positional relation between the video head and the audio head, and a time base variation of the video signal.

Next, the circuit is explained more in detail.

Figure 21:
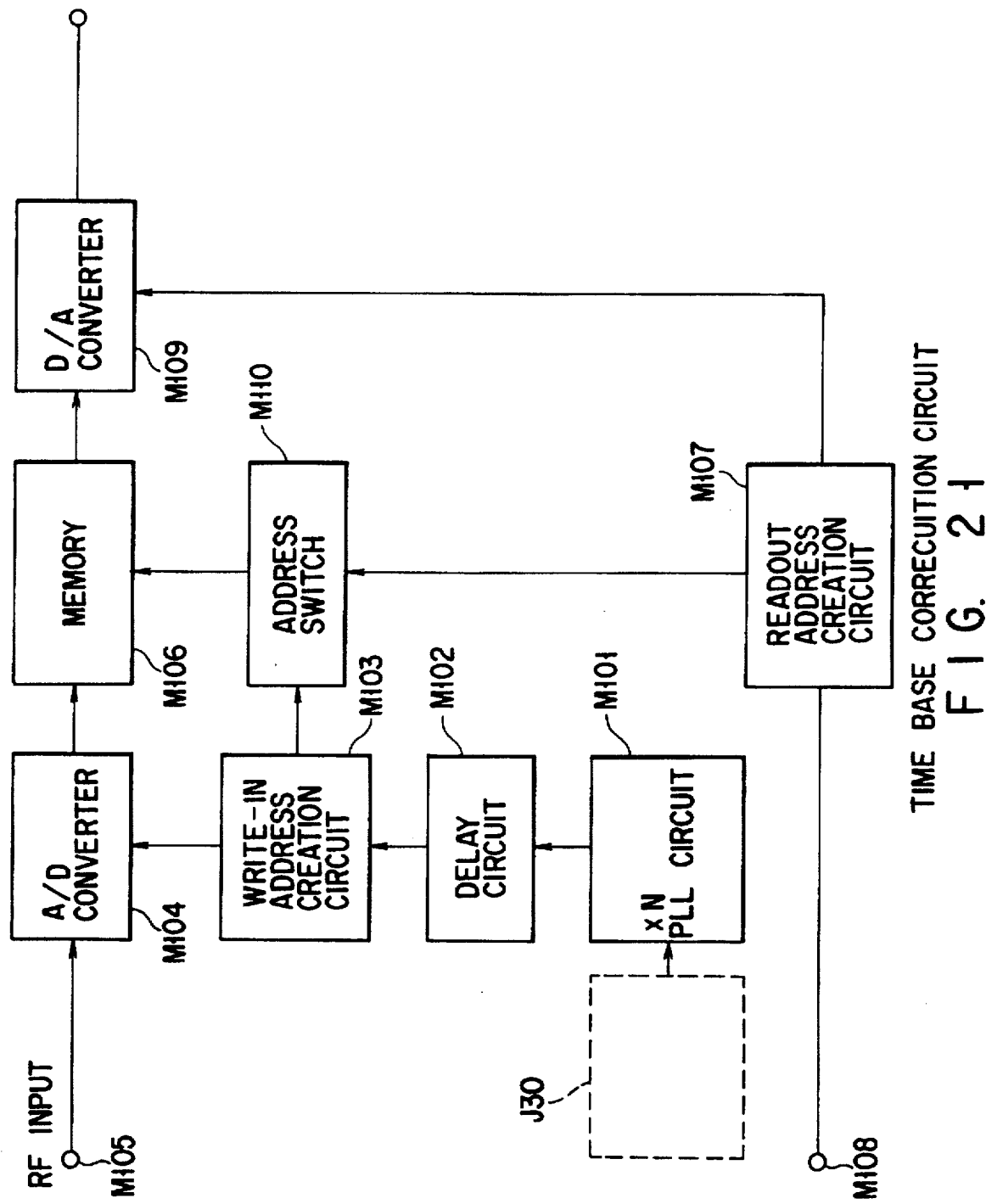
FIG. 21 is a block diagram showing an example of a time base correction circuit.

In FIG. 21, a carrier reproducing circuit is provided in a PCM audio signal processing circuit J30 containing a QPSK demodulating circuit. A xN PLL circuit M101 receives a determination clock or a reproduced carrier of an offset QDPSK (or QPSK) signal from the audio signal processing circuit and creates a clock. An out-put clock of the PLL circuit M101 is input to a write-in address creation circuit M103 via a delay circuit M102 for adjusting the time base based on the positional relation between the heads and used for address creation. Further, a reproduced signal from the reproduction head is input to an A/D converter M104 via an input terminal M105 and converted into a digital form by use of a clock from the delay circuit M102.

A write-in address output from the write-in address creation circuit M103 is selected by an address switch M110 and supplied to a memory M106. As a result, the memory M106 receives a digital signal from the A/D converter M104 according to the clock.

When a signal of the memory M106 is read out, the address switch M110 selects a readout address created by a readout address generation circuit M107 and supplies the address to the memory M106. The readout address generation circuit M107 creates a readout address according to a stable reference clock supplied from a terminal M108. Therefore, the time base for a digital signal read out from the memory M106 becomes stable. The digital signal is converted into an analog signal by a D/A converter M109 and output. In this case, the digital signal may be processed as it is without being converted into an analog signal.

Thus, a video signal which is completely free from the time base variation can be attained.

It should be noted that a digital signal which is a carrier signal for the digital modulation among the reproduced signal and is highly resistive to the S/N variation in the analog recording VTR is used as a write-in signal of the TBC circuit.

In the above system, an edge improving means is further provided. Conventionally, an edge improving means has been provided, but a sufficient effect cannot be obtained.

In the conventional VTR, a filter is constructed in an analog manner to remove the blur occurring in the edge portion of a color (C) signal. However, with this method, the signal band of the C signal itself is changed by the filter and a sufficient effect of improvement cannot be obtained.

Therefore, in this system, there are provided a first A/D converting means for converting a reproduced analog luminance signal (Y signal) into a digital Y signal, a second A/D converting means for converting a reproduced analog color signal (C signal) into a digital C signal, a first block converting means for dividing the digital Y signal into blocks (for example, 8 pixels in the horizontal direction×8 lines in the vertical direction), a second block converting means for dividing the digital Y signal into blocks (for example, 8 pixels in the horizontal direction×8 lines in the vertical direction), a first orthogonal transformation means for transforming the Y signal of each block into frequency base data, a second orthogonal transformation means for transforming the C signal of each block into frequency base data, a first quantization means for quantizing the Y signal which is transformed into frequency components by the first orthogonal transformation means by use of a desired quantization table, a second quantization means for quantizing the C signal which is transformed into frequency components by the second orthogonal transformation means by use of the same quantization table as that used in the case of the Y signal, a standardizing means for cutting off the frequency components of the C signal quantized by the first quantization means higher than the frequency of the Y signal quantized by the second quantization means, a first inverse quantization means for inverse-quantizing an output of the first quantization means by use of a quantization table having an inverted characteristic with respect to the quantization table used at the time of quantization, that is, inverse-quantizing the output by use of the same table used at the time of quantization, a second inverse quantization means for inverse-quantizing an output of the standardizing means by use of a quantization table having an inverted characteristic with respect to the quantization table used at the time of second quantization, that is, inverse-quantizing the output by use of the same table used at the time of quantization, a first inverse orthogonal transformation means for subjecting an output of the first inverse quantization means to the inverted process of the transformation by the first orthogonal transformation means, a second inverse orthogonal transformation means for subjecting an output of the second inverse quantization means to the inverted process of the transformation by the second orthogonal transformation means, a first D/A converting means for converting an output of the first inverse orthogonal transformation means into an analog Y signal, and a second D/A converting means for converting an output of the second inverse orthogonal transformation means into an analog C signal.

That is, there is a correlation between the Y signal and the C signal, and particularly, the edge portion by the Y signal and the edge portion by the C signal coincide with each other in a portion in which the blur becomes significant. Therefore, when the signals converted into the digital form are transformed into frequency base data, Y and C will have substantially the same spectral distribution. With the above property taken into consideration, Y and C are compared on the frequency base, and when the frequency component of the C signal is distributed in a frequency range higher than that of the Y signal, the frequency component is removed, then Y and C are inversely transformed on the time base and converted into corresponding analog signals. Thus, the blur occurring in the edge portion of the C signal can be improved by use of the correlation with respect to the Y signal. In this case, since it is necessary to limit the frequency band of the C signal before input, a threshold value is set which is used for selectively removing the C signal so that the limited band portion thereof with respect to the Y signal can be eliminated.

Figure 22:
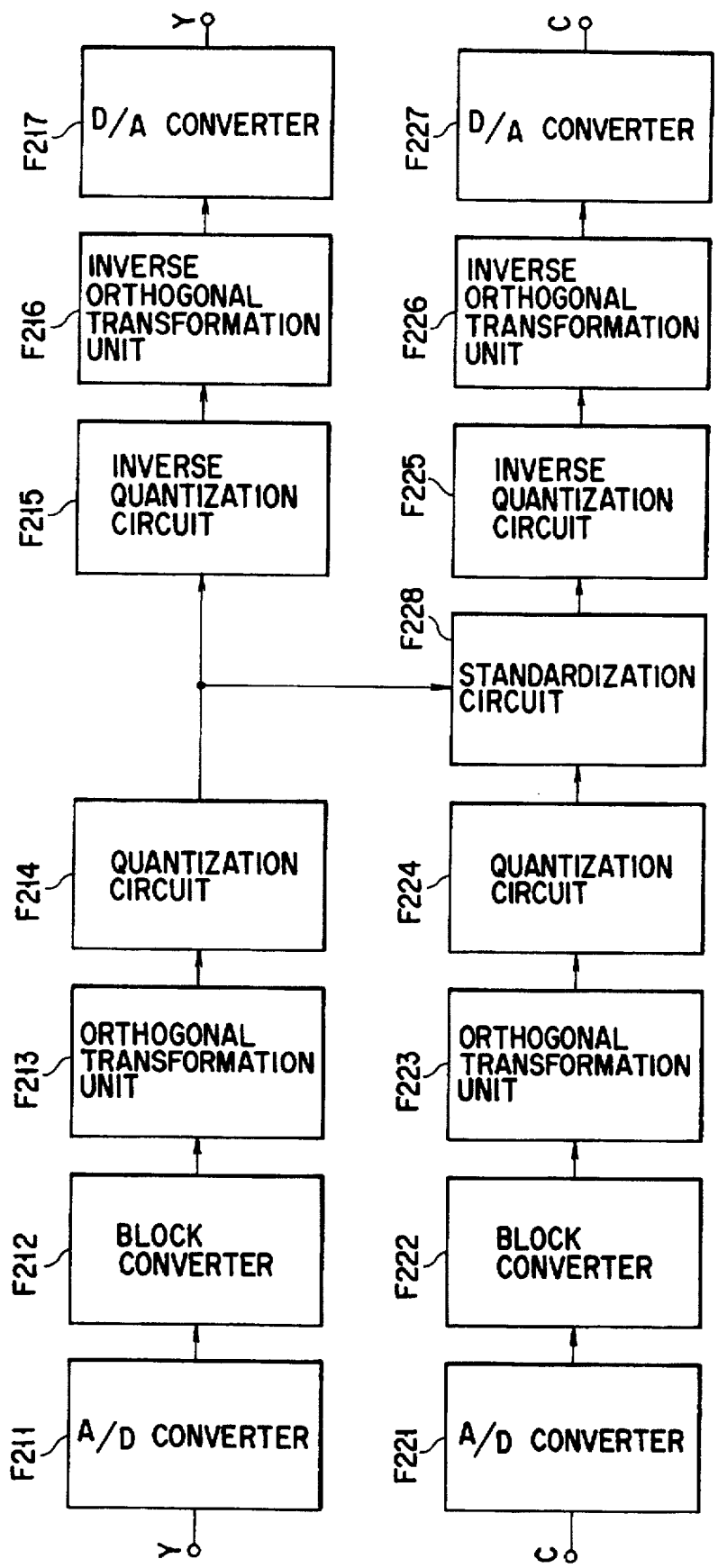
FIG. 22 is a block diagram showing an example of an image quality improving circuit.

Now, the embodiment is explained with reference to the accompanying drawings. FIG. 22 is a block diagram showing the construction of the embodiment.

A reproduced analog luminance signal (Y signal) is converted into a digital Y signal by a first A/D converter F211, divided into blocks (for example, 8 pixels in the horizontal direction×8 lines in the vertical direction) by a first block converter F212, transformed into frequency base data by a first orthogonal transformation unit F213, and then quantized by a first quantization circuit F214 by use of a desired quantization table. After this, an output of the first quantization circuit F214 is quantized again by use of a quantization table having an inverted characteristic with respect to the quantization table used at the time of quantization, that is, quantized by use of the same table used at the time of quantization by a first inverse quantization circuit F215, and restored to original time base data by a first inverse orthogonal transformation circuit F216 which effects the inverted process of the transformation by the first orthogonal transformation circuit F213. Then, the data is converted into an analog Y signal by a first D/A converter F217.

On the other hand, a reproduced analog color signal (C signal) converted into a digital C signal by a second A/D converter F221, divided into blocks (for example, 8 pixels in the horizontal direction×8 lines in the vertical direction) by a second block converter F222, transformed into frequency base data by a second orthogonal transformation unit F223, and then quantized by a second quantization circuit F224 by use of the same quantization table used by the first quantization circuit F214.

The C signal quantized by the second quantization circuit F224 is input to a standardizing circuit F228 which cuts off the frequency components of the C signal higher than the frequency of the Y signal quantized by the first quantization circuit F214 (when frequency band of the C signal is limited before input, it previously cuts off the limited portion thereof with respect to the Y signal and then effects the same operation) and processed therein. The standardized signal is supplied to a second inverse quantization circuit F225 which quantizes the signal again by use of a quantization table having an inverted characteristic with respect to the quantization table used by the second quantization circuit F224, that is, quantizes the signal by use of the same table used at the time of quantization, then supplied to and restored to original time base data by a second inverse orthogonal transformation circuit F226 which effects the inverted process of the transformation by the second orthogonal transformation circuit F223, and converted into an analog C signal by a second D/A converter F227.

The effect of the above construction is that the edge noise component of the C signal lying in the frequency range higher than the Y signal is cut off by the standardizing circuit F228 and the improvement for the color noise portion can be obtained.

FIG. 23 shows the principle. The Y signal and C signal are subjected to the orthogonal transformation and signals obtained as the result of arrangement on the frequency base are schematically indicated by 620 and 621, and the results of quantization of the signals 620 and 621 after the orthogonal transformation are schematically indicated by 622 and 623. Particularly, visually irritating edges are red-series color, but in this case, not the hue but the frequency thereof causes a problem. The frequencies of the Y signal and C signal have a correlation, and since the band width of the C signal is generally set narrower than that of the Y signal, the frequency of the C signal will not become higher than that of the Y signal. That is, the frequency component of the C signal higher than that of the Y signal is regarded as noise and eliminated to improve the C signal, thereby attaining the improvement of edges. This principle is explained with reference to the drawing. In FIG. 23, 620 and 621 indicate edge portions of the Y and C signals on the time base. These portions (blocks) are subjected to the orthogonal transformation (for example, DCT) so as to be transformed onto the frequency base and then quantized by use of the same table, thus obtaining signals 622 and 623. In general, the zero data area of 623 is extended to a lower frequency component in comparison with the zero data area of 622. However, if a blur occurs in an edge portion such as the edge portion 621, non-zero data lies in an area extended to a higher frequency portion in 623 than in 622. Therefore, the C signal can be improved by eliminating the corresponding portion. That is, the area of the C signal corresponding to zero data of the Y signal is forcedly standardized.

With the above construction, the final output of the Y signal may be obtained by delaying the input Y signal to have the same time base as the final output of the C signal.

With the above construction, the processing series of the Y signal can be constructed by commonly using various means in the processing series of the C signal by effecting a time divisional process. Specifically, each of the block converter, orthogonal transformation unit, quantization circuit, inverse quantization circuit, and inverse orthogonal transformation unit can be commonly used by effecting the time divisional process.

According to the edge improving circuit of this embodiment described above, a blur portion (high frequency component of the edge portion) in the edge portion of the C signal is eliminated and the effective edge improving effect can be obtained by effectively using the characteristic of a signal subjected to the orthogonal transformation and quantization process and effectively using the close correlation between the Y and C signals.

In the above system, the digital signal processing system 1G (FIG. 1) is provided.

It is required to develop a system which converts the systems of various input signals (reproduced or received signals) such as NTSC, HDTV, PAL/SECAM signals and permits any type of monitor (HDTV monitor, NTSC monitor) to adaptively display the signal. However, in the conventional system, a signal converting circuit for converting the respective signals must be independently provided. The circuit scale is large and the cost is high.

The digital signal processing means 1G is designed in a relatively simple construction to selectively output signals having various types of formats according to the requirements on the output side.

Therefore, the digital signal processing means includes a block size changing circuit for changing an input signal according to the pixel number ratio which is determined based on the relation between the input signal and the specified output signal according to the system conversion specifying signal, an inverse DCT circuit for the block size, prediction image creating means for changing motion vector information contained in the input signal according to the output signal size and creating a prediction image, masking means for replacing a portion in which no image signal is present by a fixed image, and time adjusting means for adjusting time for the frame frequency between two (plural) types of systems.

That is, in the block size changing circuit, the pixel number ratio is determined according to the relation of pixel construction between the pixels in the horizontal and vertical directions of the specified output signal and an input signal, each block size (in the horizontal and vertical directions) of the input variable length decoding signal is increased by interpolating "0" data or reduced by cutting off the high frequency component of input data. Further, the quantization is also effected. In a multi-IDCT circuit, the inverse DCT process for the block size changed as described above is effected. In the prediction image creating means, motion vector information contained in the input signal is converted into information of output signal size and a prediction image is created based on the signal which is obtained in the one-frame preceding period. In the masking means, a portion in which no image signal is present is replaced by a fixed image. In the time adjusting means, the time adjustment for the frame frequency between the two types of systems of the input and output signals is effected.

By effecting the above operations, the system of a low bit rate coding signal can be easily converted by using simple means such as block size changing means.

Next, a concrete embodiment is explained. This embodiment is closely related to the means for effecting the hierarchical process as described before and the difference therebetween is also described before.

In the circuit of FIG. 1, it is assumed that the low bit rate coding means A10 in the recording system decodes a signal which has been coded irrespective of the hierarchical coding/non-hierarchical coding.

In the following example, a case wherein a non-hierarchical coded signal is processed is explained. In the case of the hierarchical coding, since a signal is recorded by taking the conversion of systems into consideration, a reproduced signal is selected and supplied to the hierarchical decoding means G30 via the switch G20 of the digital signal processing system 1G. In the case of the non-hierarchical coding, a reproduced signal is supplied to and decoded by the non-hierarchical decoding means G50 and supplied to the system converting means G60.

Next, the system converting means G60 is explained.

First, the high-efficiency coding and decoding system is explained again. The system has a series of processes of input image DCT IDCT output image. In the DCT process, an image is extracted in the unit of two-dimensional block of 8 pixels in the horizontal direction and 8 pixels in the vertical direction and is subjected to the DCT transformation. Outputs obtained after the transformation are frequency converted coefficients and eight outputs are provided in each of the vertical and horizontal directions. The outputs are quantized and subjected to the variable length coding process to lower the transmission rate. On the decoding side, the variable length is changed to a fixed length, the inverse quantization is effected to restore the DCT coefficient state, the IDCT (inverse DCT) is effected, and the same number of pixels can be obtained when the data is restored if the number of coefficients is kept unchanged.

If the number of input pixels in the inverse DCT process is changed, the number of pixels obtained after the inverse DCT process is changed accordingly. In order to reduce the number of pixels, for example, 2×2 components among data subjected to the 8×8 DCT process are extracted and subjected to the 2×2 inverse DCT process, and in this case, the number of pixels becomes 2×2. That is, the height and width are reduced to ¼ times the original sizes.

When the size is increased, interpolation data is inserted into data of 8×8 block size to attain data of 16×16 block size. By subjecting the resultant data to the inverse DCT process, the image plane size is doubled in the vertical and horizontal directions (the other case is considered in the same manner when the interval between the scanning lines and the pixel pitch are the same). At this time, as the interpolation data, "0" data may be used on the assumption that no high frequency component is present.

The theoretical equations of the M×N DCT and m×n IDCT for realizing the above function were explained in the equation (3).

FIG. 24 schematically shows the contents of conversion from the NTSC system to the HDTV system.

Assume that, as shown by 24a, the block unit of the DCT process for the NTSC signal is 8×8 pixels and the number of pixels is 720 points in the horizontal direction×480 points in the vertical direction in the effective image plane. Next, when a signal of block unit (8×8) is subjected to the inverse DCT process in a case wherein the block unit at the time of signal conversion is set to be 16×16 pixels as shown by 24b, the HDTV signal of the system having 1050 vertical scanning lines will have 1440 pixels in the horizontal direction and 960 pixels in the vertical direction, thus providing a double-sized image plane. In this case, since there is a difference between the image plane sizes of NTSC and HDTV, 120 pixels of a signal after converted into the HDTV form on each side of the monitor is subjected to the masking process.

When it is required to further increase the number of vertical components (in the 1125-vertical scanning line system) and increase the number of pixels of the horizontal components at the time of signal conversion as shown by 24c and if the inverse DCT process is effected for each block unit (18×18), the masking area becomes 135 pixels on each side. Further, it is considered to effect the inverse DCT process for each block unit 16×17 in order to set the effective number of pixels closer to that of the 1125 line system as shown by 24d.

Figure 25:
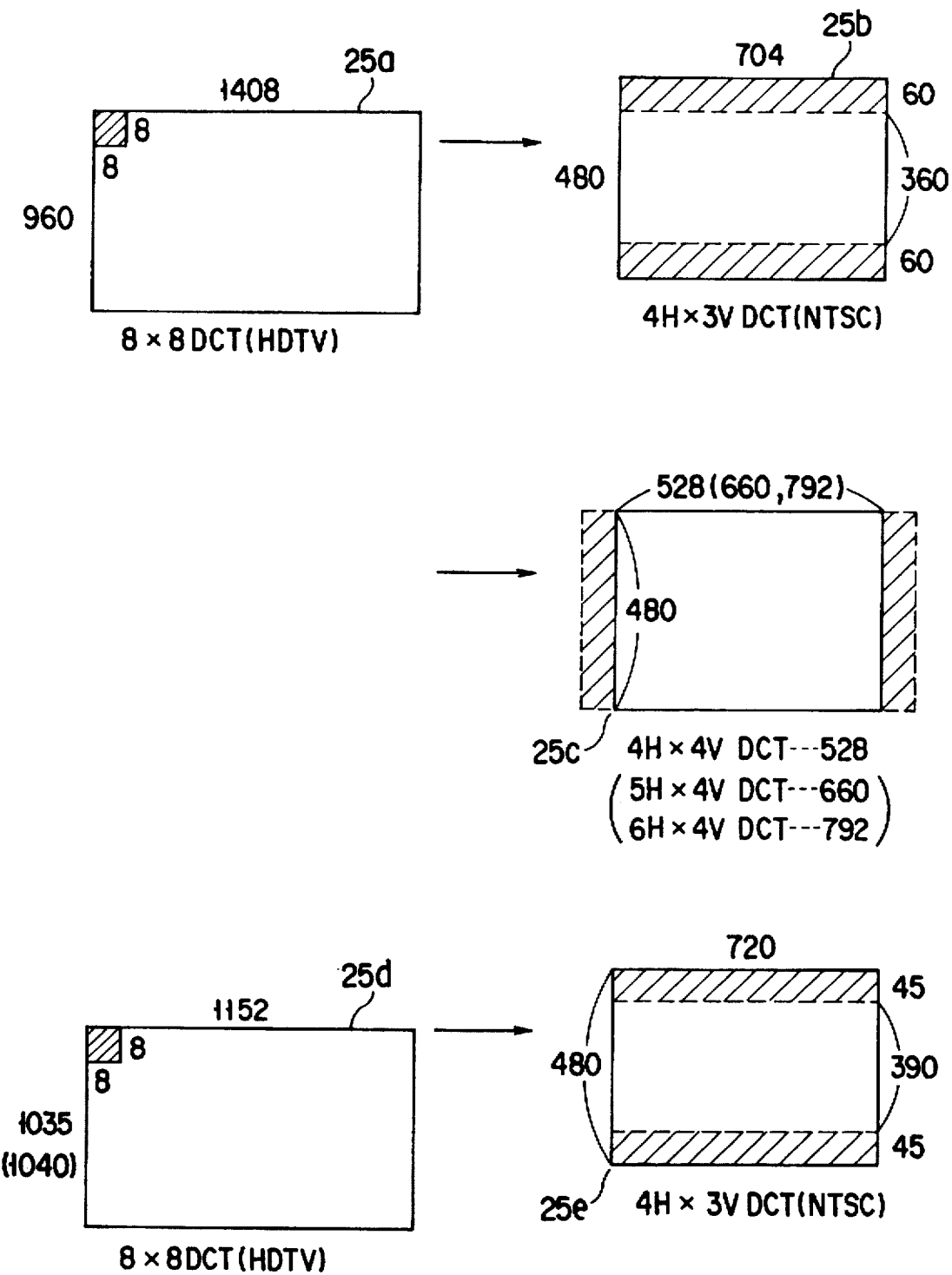
FIG. 25 is a diagram for illustrating another example of the system conversion of television signals.

FIG. 25 shows a method of converting the HDTV system to the NTSC system.

An HDTV signal can be displayed on the NTSC monitor with the aspect ratio (16:9) of the HDTV signal display area kept unchanged by converting the HDTV signal of 1050-vertical scanning line system for each DCT unit of block unit of 8×8 pixels as shown by 25a and sequentially subjecting only the DCT coefficient of 4×3 pixels among the DCT coefficients of the HDTV signal in an order from the low frequency component as shown by 25b. This is so-called letter box display. Upper and lower portions of the image plane are subjected to the masking process by using fixed data. When the side-cut system is used as the display system as shown by 25c and if 4×4 pixels among the coefficient of block unit 8×8 of the HDTV signal are used and subjected to the inverse DCT process with the remaining portion cut off, then a signal having effective pixels of 528×480 can be obtained as an NTSC signal. When 5×4 pixels are used and subjected to the inverse DCT process with the remaining portion cut off, then a signal having effective pixels of 660×480 can be obtained as an NTSC signal. When 6×4 pixels are used and subjected to the inverse DCT process with the remaining portion cut off, then a signal having effective pixels of 792×480 can be obtained as an NTSC signal. The precision becomes different as the number of pixels used is changed, and the number of pixels used may be determined according to the frequency band and pixel construction.

Further, in the case of 1125-vertical scanning line system as shown by 25d, the effective pixel construction is obtained as shown in the drawing. A signal which can be displayed on the NTSC monitor based on the letter box display can be obtained by using a coefficient of 4×3 pixels among the block unit as shown by 25e.

FIG. 26 shows a method of converting the NTSC system to a CCIR (PAL/SECAM) signal.

26a shows the block unit 8×8 of DCT process and the effective pixel construction obtained when an NTSC signal is sampled at a frequency of 13.5 MHz. 26b shows the effective pixel construction obtained when a CCIR(PAL/SECAM) signal is sampled at a frequency of 13.5 MHz. In order to attain the compatibility between the above two signals, the following process may be effected. Since 720 pixels (effective pixels) are provided in the horizontal direction in both cases, no consideration is necessary.

In the vertical direction, the NTSC signal of block unit 8×8 is converted into a CCIR signal as shown by 26c. This process is effected by alternately arranging a block line (which is so referred to because a block of 8 vertical scanning lines or the block unit of 8×8 is arranged on one line) formed by enlarging the block unit 8×8 of the NTSC signal to a block unit of 8×9 and subjected to the DCT process and a block line formed by enlarging the block unit 8×8 of the NTSC signal to a block unit of 8×10 and subjected to the DCT process and thus the number of scanning lines is changed from 525 to 625. The frame frequencies of the NTSC and CCIR are different from each other, but the frame frequencies thereof may be made equal to each other by removing one frame from approximately every six frames in the NTSC signal of 29.97 Hz.

Further, in the case of HDTV signal, various systems such as a vertical scanning line-1250 system, 1125 system, 1050 system and 787.5 system may be considered, but the respective elements at the time of signal conversion can be easily determined based on the contents described here.

Figure 27:
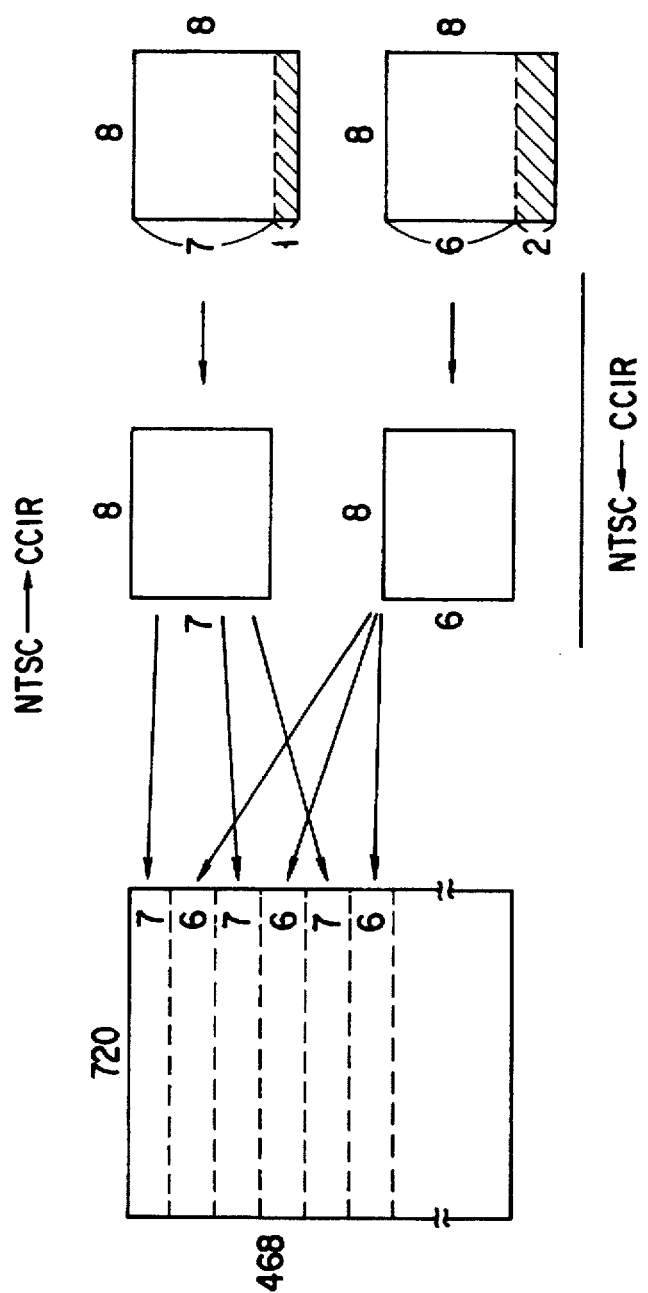
FIG. 27 is a diagram for illustrating another example of the system conversion of television signals.

FIG. 27 shows a method of converting a signal of CCIR (PAL/SECAM) standard to an NTSC signal. In this case, a process which has an inverted relation with respect to the conversion process explained by use of 26c of FIG. 26.

When an input of the pixel size of CCIR and effective vertical pixels of 572 (which becomes substantially 576 since the DCT size of 8×8 is used) is converted to an NTSC signal of effective vertical pixels of 480, pixels are restored by reducing the DCT coefficient of 8×8 of CCIR to 8×7 and 8×6 for each block line and subjecting the coefficients to the inverse DCT process. As a result, the pixel size of substantial NTSC can be obtained.

Figure 28:
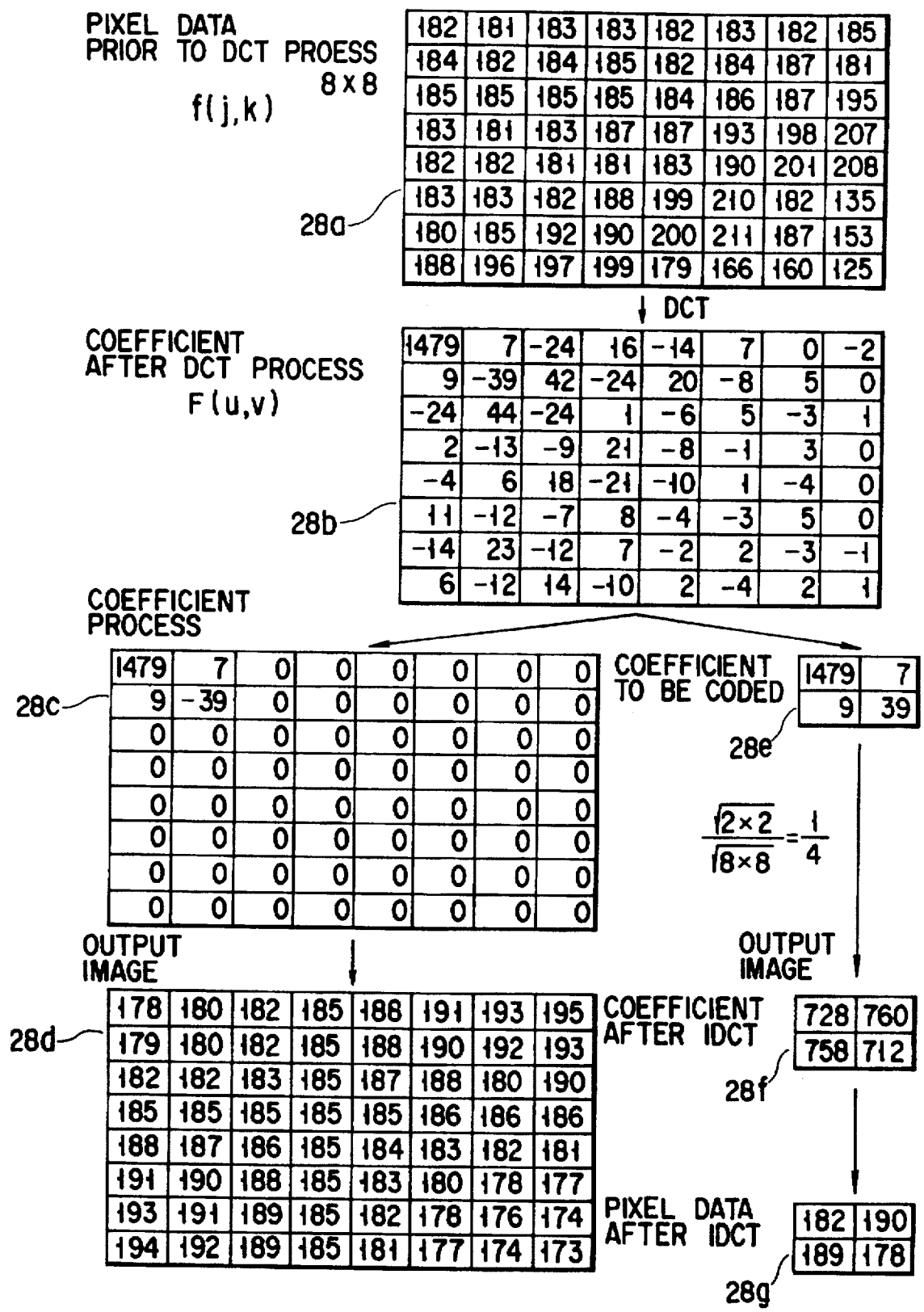
FIG. 28 is a diagram showing an example of blocks used for effecting the image enlargement and reduction process in a digital signal processing system.

FIG. 28 shows an example of calculation of enlargement or reduction (refer to theoretical equations (1) to (3)). 28a in FIG. 28 indicates pixel data of block unit 8×8 prior to the DCT process, 28b indicates DCT coefficients (arranged on the frequency base) after the DCT process, 28c indicates an example in which only 2×2 pixels are extracted from the coefficient obtained after the DCT process and the remaining portion is set to "0" to reduce the frequency band without changing the pixel size, and 28d indicates output image values obtained when subjecting 28c to the inverse orthogonal transformation (IDCT).

Further, 28e indicates values obtained when only 2×2 pixels are extracted from the coefficient obtained after the DCT process and the remaining portion is cut off to change the pixel size. 28f and 28g respectively indicate values obtained after the inverse DCT process in a case wherein the pixel size is reduced to ¼ times and final image values obtained by subjecting the converted values to the correction process.

FIG. 29 shows a concrete example of a decoding circuit (non-hierarchical decoding means G50 and system converting means G60) in this embodiment.

An input signal is subjected to the buffering in a code buffer memory G501 of the non-hierarchical decoding means G50 and the data is subjected to the data length fixing process in a variable-length decoding circuit G502. In the system conversion means G60, the block size is changed in a block size changing circuit G601 as described before (FIGS. 24 to 28). At the time of enlargement, the interpolation is effected, and at the time of reduction, coefficients are selectively cut off.

After this, the data is inversely quantized in an inverse quantization circuit G602. A multi-IDCT circuit G603 effects the IDCT calculation to derive coefficients of respective changed block sizes for each size. It is also possible to prepare a plurality of IDCT circuits and selectively activate the IDCT circuits according to the block size. An output of the multi-IDCT circuit G603 is supplied to a terminal a of a switch G608 and to an adder G607.

An output of the variable length decoding circuit G502 is also input to a motion vector extraction circuit G604 (in practice, the motion vector extraction circuit G402 of FIG. 7 is used). The motion vector detected here is input to a predictive decoding circuit G605. The predictive decoding circuit G605 must change the size of the motion vector according to the change of the block size. This is the same operation as that of the predictive decoding circuit G402 of FIG. 7, but the circuit G604 is described in a generalized manner and a different reference numeral is used therefor.

The predictive decoding circuit G605 corrects the movement of a preceding frame with respect to the present frame by using an output of the frame memory G606 and supplies the image signal to an adder G607. The adder G607 adds together the image signal from the circuit G605 and a difference between the preceding image and the present image (a signal subjected to the IDCT process) and supplies an output to a terminal b of a switch G608. The switch G608 selects one of signals of the terminals a (intra-frame) and b (interframe) according to the intra-frame/interframe and outputs a selected signal to an adder G610. The adder G610 is also supplied with a masking signal from a masking signal creation circuit G611 via a switch G612. An output of the adder G610 is input to a memory G613. In the memory G613, conversion of the frame frequency is effected under the control of a memory control circuit G614.

The memory control circuit G614 controls the memory G613 so as to remove one frame from every six frames in response to a reference signal, for example, when the frame frequency is reduced and read out the final one frame twice for every five frames when the frame frequency is increased. The memory G613 provided at the output stage of FIG. 29 is used when the signal is out-put without changing the frame frequency thereof if the frame frequencies of the input and output are substantially the same and the vertical synchronizing signal is set within a permitted range. The header signal detection circuit G614 detects data such as intra-frame/interframe process identification signal and block size necessary for the process from an output of the variable length decoding circuit G502.

A mode change controlling circuit G615 receives an output specifying signal as an input and creates a control signal for controlling the respective circuits so as to permit the system conversion to be effected.

Figure 30:
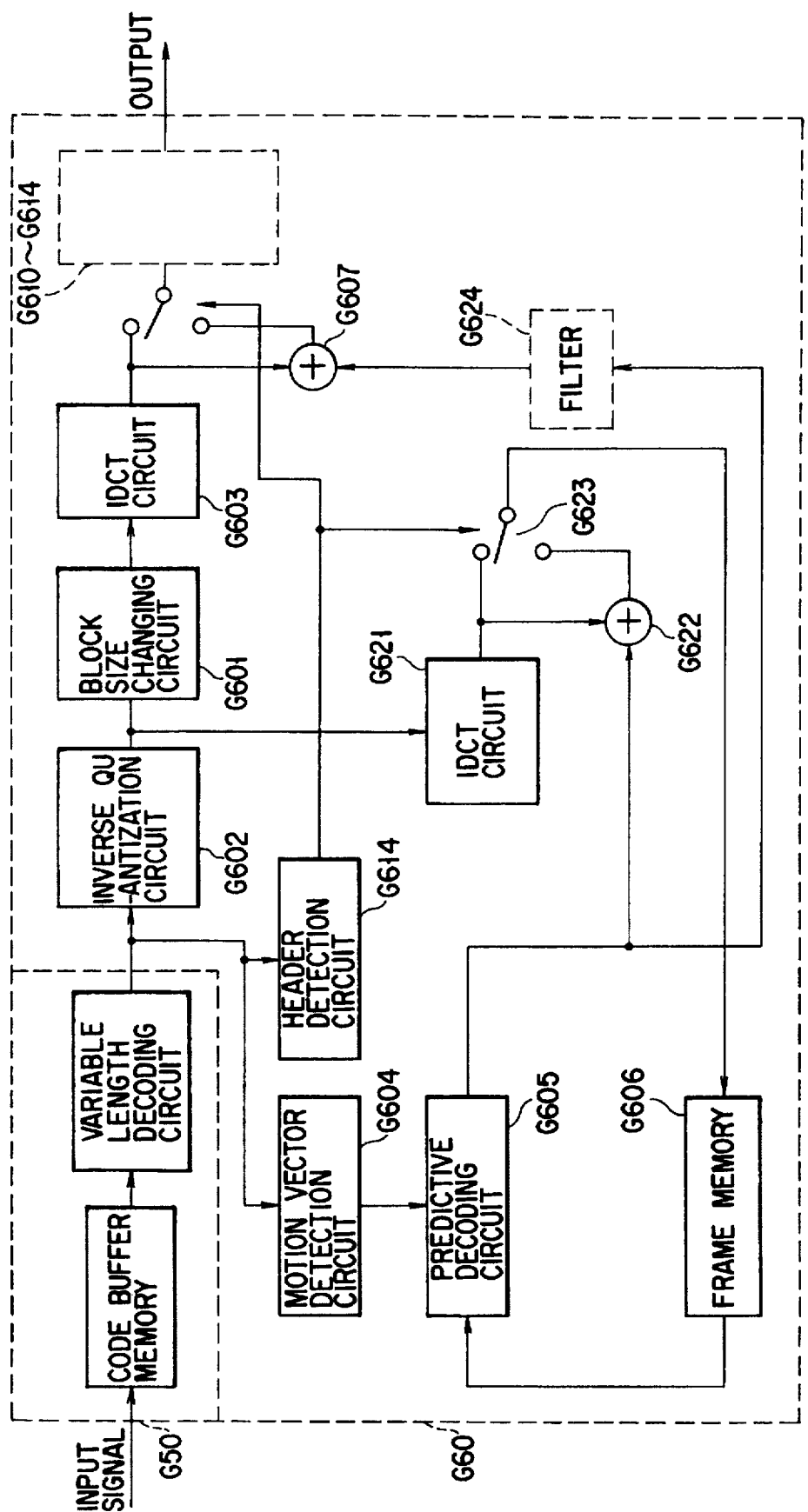
FIG. 30 is a block diagram showing another example of the system conversion circuit of television signals.

FIG. 30 shows another embodiment of the decoding circuit (non-hierarchical decoding means G50 and system converting means G60). Portions of the embodiment which are the same as those shown in FIG. 29 are denoted by the same reference numerals.

This embodiment is slightly different from the circuit of FIG. 29 in the construction of the system conversion means. No change is made for the non-hierarchical decoding means G50. In the system conversion means G60, unlike the construction of FIG. 29, an output of the variable length decoding circuit G502 is supplied to the inverse quantization circuit G602 and the block size changing circuit G601 is connected to the output of the inverse quantization circuit C602. Further, an output of the inverse quantization circuit G602 is supplied to an IDCT circuit G621. An output of the IDCT circuit G621 is supplied to an adder G622 and a terminal a of a switch G623. The adder G622 is also supplied with an output of the predictive decoding circuit G605. An output of the predictive decoding circuit G605 is input to the adder G607 via a filter G624. The other portion is the same as that of the circuit shown in FIG. 29.

The system conversion means G60 divides a signal path into a path for subjecting the signal to the IDCT process without changing the size of the input signal and a path for changing the block into output conversion size and then subjecting the signal to the IDCT process.

The former path is substantially the same as the basic IDCT system and the motion vector is used as it is. That is, the path is constructed by the inverse quantization circuit G602, IDCT circuit G621, adder G622, switch G623, filter G624, adder G607, and switch G608.

The latter path changes the block size in the block size changing circuit G601 and effects the inverse conversion according to the block size in the IDCT circuit G603. Like the former case, the switching operation by the switch G608 is effected according to the intra-frame/interframe. However, as the prediction image, a prediction image obtained in the path for effecting the inverse DCT by using the input block size is used and input to an adder G624 after selectively setting a frequency, using a characteristic so as not to generate an aliasing component and limiting the frequency band. This can be used when it is difficult to predict a motion vector.

Figure 31:
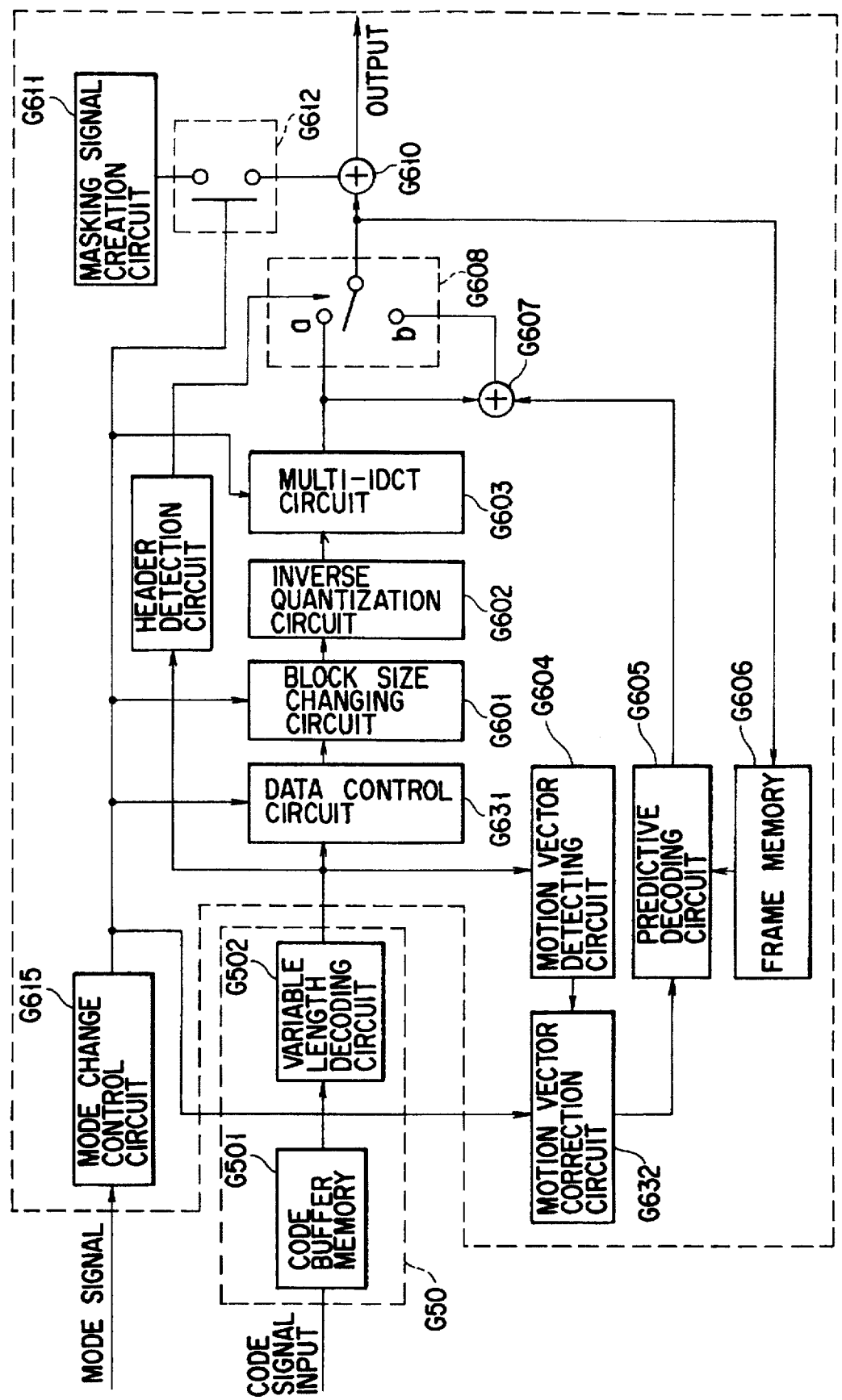
FIG. 31 is a block diagram showing still another example of the system conversion circuit of television signals.

FIG. 31 shows another example of the decoding means (non-hierarchical decoding means G50 and system converting means G60).

Also, in this block, part of the system converting means G60 is different. A different circuit is used instead of the memory G613 of the output stage shown in FIG. 29. The circuit is different from the circuit of FIG. 29 in that a data control circuit G631 is provided between the variable length decoding circuit G502 and the block size changing circuit G601. Further, a motion vector correction circuit G632 is newly provided and is used to correct the motion vector from the motion vector extraction circuit G604 according to mode information from the mode change control circuit G614 and supply the corrected motion vector to the predictive decoding circuit G605.

In this embodiment, the frame frequency is not changed after the system conversion, but the conversion of the frame frequency is effected at the same time of conversion of the pixel block size and data of a frame to be removed and a frame to be repeated is controlled by the data controlling circuit G631. There occurs a problem that if one frame of the image is removed for a prediction image in a case wherein the interframe compression is effected, a next prediction frame is deviated by one frame when a prediction image next to the frame removed image is created. Further, when the frame number is increased by repeatedly outputting the same frame, a succeeding prediction image will be advanced. In the latter case, the above problem may be solved by preventing the motion vector from being updated. However, in the former case, the problem may be solved by calculating motion vectors of preceding and succeeding two frames and correcting the same. This correction process is effected by the motion vector correction circuit G632.

According to the above embodiment, even when a signal of either system is received or reproduced, the signal can be converted to a signal of a desired system and output in a relatively simple construction by effecting the coding and decoding process and controlling the unit block size.

In the above system, means for processing a plurality of signals received or reproduced so as to be displayed on a multi-display image plane is further provided.

In order to serve the above purpose, an input means for inputting a plurality of high-efficiency coding signals according to a mode specifying signal, a block size changing means for changing the block size according to the pixel size of a specified output signal, an inverse DCT circuit for effecting the inverse DCT process according to the block size, and a prediction image creating means for converting motion vector information contained in the plurality of input signals to output signal size data to create a prediction image are provided.

The input means for a plurality of high-efficiency coding signals can simultaneously process a plurality of signals. Then, the signal is converted to have a necessary pixel number according to a specified output signal in the block size changing circuit and the pixel number is changed according to the block size in the multi-inverse DCT circuit. Further, in the prediction image creating means, motion vector information contained in the plurality of input signals is converted to have an output signal size to create a prediction image.

By the above-described operation, a signal of high-efficiency bit rate coding state can be easily displayed on a multi-display image plane by use of a simple means such as the block size changing means, and it is also possible to divide the image plane into a main image plane and sub-image plane. Further, it is possible to enlarge or reduce the entire portion of an image or freely enlarge or reduce only a selected portion of an image.

Next, a concrete embodiment is explained.

The content of this embodiment has a close relation with the content of the coding circuit portion described before. As described before, the output image size can be easily changed by changing the block size when subjecting the transformation coefficient of DCT to the IDCT process. This embodiment effectively utilizes the above process.

Figure 32:
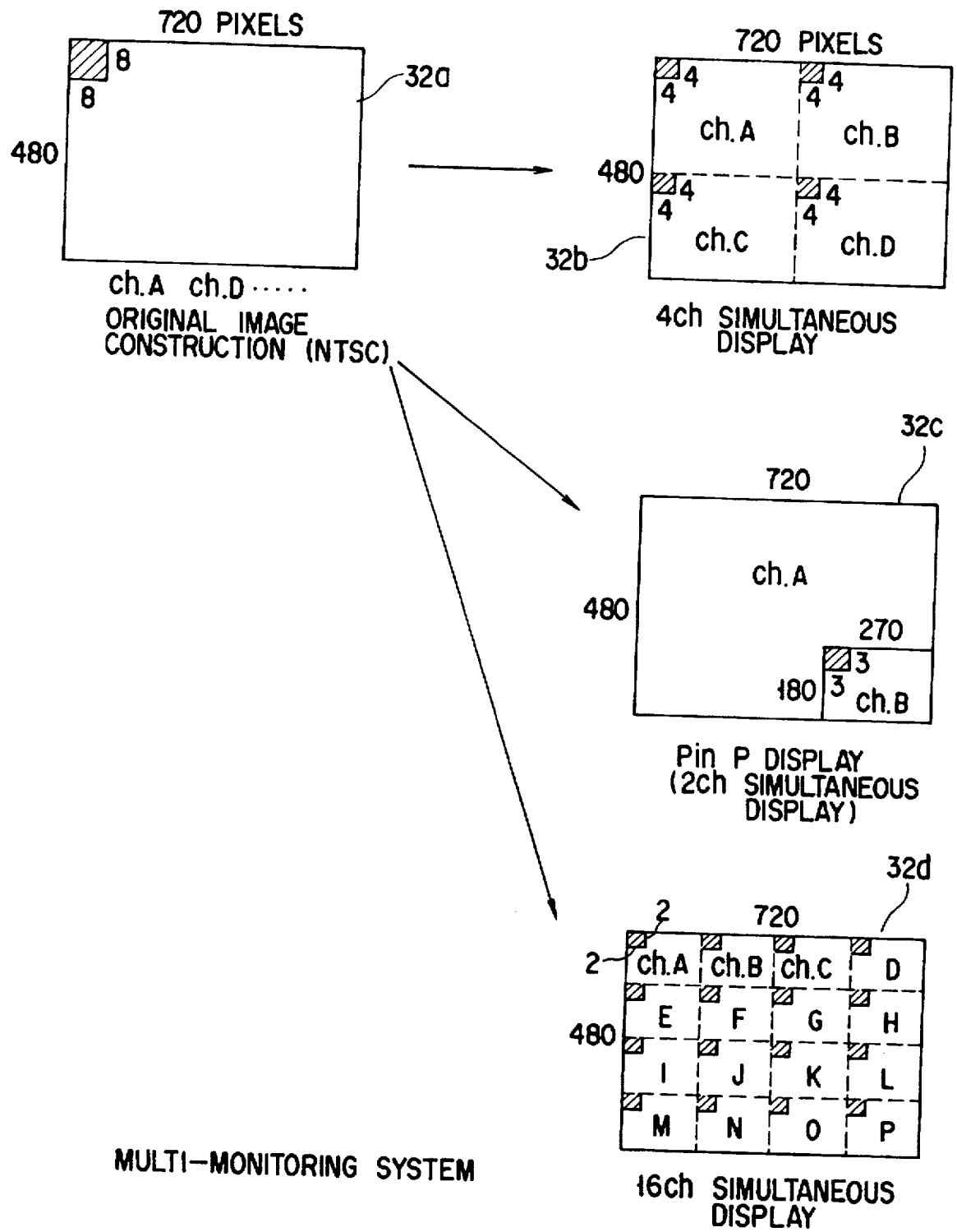
FIG. 32 is a diagram for illustrating the principle of a multiple image plane display process.

FIG. 32 is a diagram schematically showing a multi-monitoring system.

32a indicates a case wherein an NTSC signal is treated. In this case, the size of the block unit of DCT is 8×8. 32b indicates a case wherein four image planes are simultaneously displayed. In this case, the block size of IDCT in each of image planes A, B, C and D is set to 4×4 which is ½ times the original size. 32c indicates a case wherein the P in P (picture in picture: main image plane and sub-image plane are displayed) display is effected. In this case, if the sub-image plane has an IDCT block of 3×3, for example, a ⅑ sub-image plane which is reduced to ⅓ times the original size in the vertical and horizontal directions can be displayed. 32d indicates a case wherein 16 channels are simultaneously displayed by using an IDCT block of 2×2.

Figure 33:
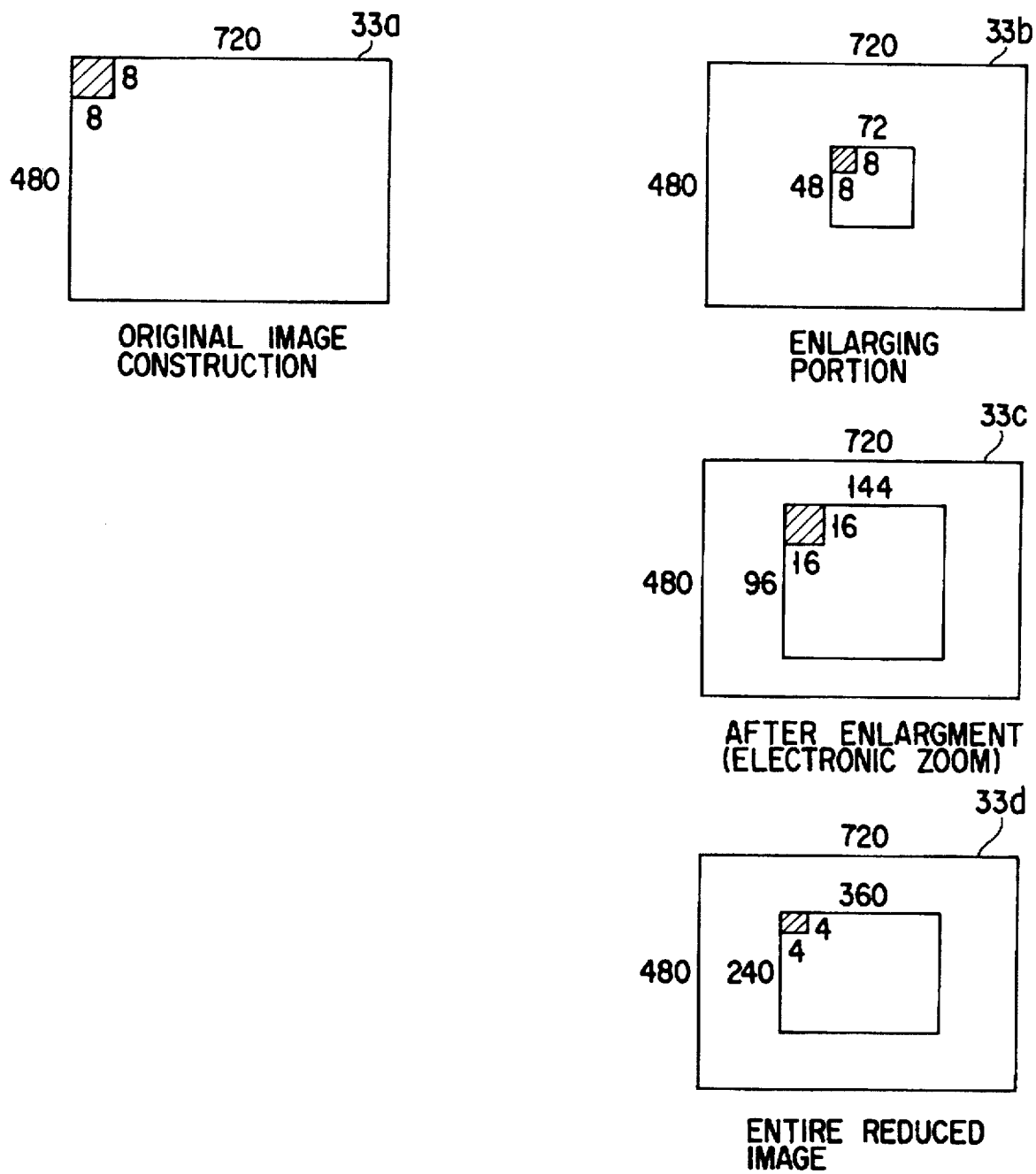
FIG. 33 is a diagram for illustrating the principle of an enlargement/reduction display process.

FIG. 33 is a diagram schematically showing a freely enlarging/reducing circuit. 33a shows an original image. Assume now that an enlarging portion whose height and width are respectively ⅒ of those of the original image is enlarged to two times in the height and width thereof. 33c schematically shows the image plane after the portion is enlarged and the enlarged portion is enlarged to two times in the height and width thereof. As a result, an area which lies around the original enlarging portion and corresponds in size to three times the original enlarging portion is masked with the enlarged image portion. 33d indicates a case wherein the entire portion of an image is reduced to half in the height and width, the reduced image is moved to the central portion of the image plane and the remaining portion is masked.

The above cases can be realized by changing the block size based on the methods described above and effecting the IDCT calculation according to the block size.

A concrete embodiment is explained below.

FIG. 34 shows a decoding circuit of a multi-monitoring circuit and indicates a case wherein four channels are simultaneously displayed. Inputs A, B, C and D are respectively supplied to coding circuits G51 to G54. The construction of the coding circuit G51 is shown in detail as a representative. An input A is sequentially processed by a coding buffer G511, variable length decoding circuit G512 and inverse quantization circuit G513 and restored to a DCT coefficient of 8×8. other coefficients B, C and D are also restored to respective DCT coefficients of 8×8. The respective inversely quantized coefficients are sequentially read out according to positions on the image plane as described before with reference to the schematic diagrams. First, upper halves A and B are sequentially selected, changed in a block size changing circuit G644, restored into an image in a multi-IDCT circuit G645, and supplied to a terminal a of a switch G647 and an adder G646. The intra-frame compression or interframe compression is determined for each of the inputs A, B, C and D by a header detection circuit G642 which in turn supplies an output to control a switch C647 so as to select the terminal a or terminal b to which an output of the adder G646 is supplied.

An output of the switch G647 is supplied to a frame memory G653 whose output is supplied to a predictive decoding circuit G652. The predictive decoding circuit G652 creates a prediction image based on a corrected motion vector from a motion vector correction circuit G651 and supplies the image to the adder G646. The motion vector correction circuit G651 detects motion vectors of the respective inputs and supplies the detected motion vectors to the motion vector correction circuit G651.

Since an image stored in the frame memory G653 is a multi-image, the motion vector thereof is corrected according to the processing method in the motion vector calculation related to each image. A circuit for effecting the correction process is the motion vector correction circuit G651. It is necessary to unite the four-series input signals into one-series signal. In order to meet this requirement, the switch G643, block size changing circuit G644, and multi-IDCT circuit G645 are required to be operated at a speed which is four times the normal operation speed (however, since the IDCT is formed with the simple construction of 4×4, only the switch G643 and circuit G644 are required to be operated at the high speed).

As described above, the multi-monitoring process can be effected.

FIG. 35 shows an embodiment of a decoding circuit (intra-frame compression signal) of P in P. The circuit can be realized by commonly using the function of the circuit of FIG. 34. Therefore, portions which are the same as those of FIG. 34 are denoted by the same reference numerals.

In the case of intra-frame compression, the inputs A and B are switched by the switch G643 and the input B is selected in a position of the sub-image plane displayed in the main image plane input A. The block size of the input B is changed and only the IDCT process for the size is effected. When changing the block size of the input B and effecting the multi-IDCT, the block number is increased by an amount corresponding to the input B, but since the substantial number of pixels is not changed, the purpose can be attained by partly enhancing the operation speed. Therefore, it is only necessary to control the switch G643 by the control signal creation circuit G661 and selectively set the flow of the signal and the processing modes of the respective portions. The control signal creation circuit G661 is supplied with a position specifying signal for specifying the position of the sub-image plane and a block pulse for synchronizing the switching timing.

FIG. 36 shows an embodiment of a picture in picture (P in P) decoding circuit (interframe compression signal). This circuit can also be realized by commonly using the function of the circuit of FIG. 34. Portions which are the same as those of the circuit of FIG. 334 are denoted by the same reference numerals.

In the case of intra-frame compression, no prediction image is provided, and therefore, the circuit can be made relatively simple in construction. However, in the case of interframe compression, an input signal A in a portion in which the sub-image plane is inserted may be used as a prediction image for the next frame as described before and cannot be cut off.

Therefore, it is necessary to further enhance the operation speed in comparison with the former case, and in this example, the main image plane A and sub-image plane B are separately stored in a frame memory G653 used for creating the prediction image. To serve the above purpose, the operation speed of the circuit portion succeeding a switch G654 must be set to twice the normal operation speed (for processing two image planes). Since the frame memory G653 is used in the above-described manner, the output of a motion vector detection circuit G641 (which is simply formed of a plurality of conventional motion vector detection circuits) is corrected according to the memory contents by a motion vector correction circuit G652 so as to decode a prediction image. The frame memory G653 serves as a 3-port memory and outputs an image of P in P structure, and an output of the frame memory is read out in the P in P structure irrespective of the prediction in response to a control signal from a memory readout circuit G662.

A header detection circuit G642 is also constructed to have header detection circuits so as to process headers of two series A and B. However, the switching operation of the switch G643 is effected to sequentially decode A and B.

It may be considered that the freely enlarging/reducing circuit effects the same process as the HDTV→NTSC conversion when the entire image plane is reduced. That is, the IDCT of 8×8 may be changed according to the size to be reduced. When the image plane is partly enlarged, the enlarged portion is stored into a portion B of the frame memory G653. All of the A image is decoded, and then the enlarged portion is processed as the B image when the process for the B image is effected.

As described above, according to the system of this invention, even when various types of input video signals are input, the signal can be recorded in a preset form, and even when various types of video signals are recorded, the signal can be reproduced and output in a desired form, thus providing a great diversity.

What is claimed is:

1. A multisystem adaptable type-signal processing apparatus for decoding a video signal in a hierarchical structure, comprising:

means for setting a frequency ratio and a block unit ratio for first and second video signals so as to define a relation between a high bit rate coding block unit corresponding to the pixel structure of the first video signal having a first frequency band and a low bit rate coding block unit corresponding to the pixel structure of the second video signal having a second frequency band that is narrower than the first frequency band in vertical and horizontal directions, means for setting a processing signal of the low bit rate coding block unit in a first hierarchical level in which the second video signal can be reproduced, and means for setting a second processing signal of the high bit rate coding block unit in a second hierarchical level in which the first video signal can be reproduced, wherein a frequency ratio is a relationship between the sampling rates associated with the first and second video signals, and the block unit ratio is a relationship between block units on the first and second hierarchical levels.

2. An apparatus for processing diverse signals according to claim 1, further comprising:

a first quantization circuit for quantizing the first hierarchical video signal;

a first inverse quantization circuit for executing inverse quantization with respect to an output of the first quantization circuit;

a subtracter for calculating a data value by subtracting an output of the first inverse quantization circuit from the second hierarchical video signal and for obtaining a third hierarchical video signal which is to be encoded based on the data value;

a second quantization circuit for quantizing an output of the subtracter; and transmitting means for transmitting outputs of the first and second quantization circuits after encoding said outputs in a variable format.

3. An apparatus according to claim 2, wherein said first hierarchical video signals are signals used in a television of a standard type, and said second hierarchical video signals are high-resolution television signals.

4. An apparatus according to claim 3, further comprising:

a magnetic recording/reproducing device of a helical scan type connected to the transmitting means, the magnetic recording/reproducing device including a rotating cylinder having a first SD head, a first HD head, a second SD head, and a second HD head, wherein a variable-format encoded signal corresponding to the output of the first quantization circuit is supplied to the first and second SD heads and a variable-format encoded signal corresponding to the output of the second quantization circuit is supplied to the first and second HD heads, the first SD head and the first HD head being positioned close to each other and being opposite in azimuth, the second SD head and the second HD head being positioned close to each other and being opposite in azimuth, the first SD head and second SD head being opposite in azimuth, and the first HD head and the second HD head being opposite in azimuth.

5. An apparatus according to claim 2, wherein a unit block of at least one of the first and second hierarchical video signals comprises 8×8 pixels.

6. An apparatus according to claim 2, wherein an amount of the first hierarchical video signal which is encoded and transmitted and an amount of the third hierarchical video signal which is encoded and transmitted are controlled to be constant.

7. An apparatus according to claim 2, wherein an amount of the first hierarchical video signal which is encoded and transmitted and an amount of the third hierarchical video signal which is encoded and transmitted are equal to each other.

* * * * *